(12) United States Patent
Johnson et al.

(10) Patent No.: US 10,692,035 B2
(45) Date of Patent: Jun. 23, 2020

(54) METHODS AND SYSTEMS FOR TRACKING LABOR EFFICIENCY

(71) Applicant: Mitchell Repair Information Company, LLC, Poway, CA (US)

(72) Inventors: Lester B. Johnson, Escondido, CA (US); John H. Dwulet, Lakeside, CA (US)

(73) Assignee: Mitchell Repair Information Company, LLC, San Diego, CA (US)

( * ) Notice: Subject to any disclaimer, the term of this patent is extended or adjusted under 35 U.S.C. 154(b) by 895 days.

(21) Appl. No.: 15/220,032

(22) Filed: Jul. 26, 2016

(65) Prior Publication Data

US 2018/0032942 A1 Feb. 1, 2018

(51) Int. Cl.
*G06Q 10/06* (2012.01)
*G06Q 30/02* (2012.01)

(52) U.S. Cl.
CPC ..... *G06Q 10/06398* (2013.01); *G06Q 10/067* (2013.01); *G06Q 30/0201* (2013.01)

(58) Field of Classification Search
CPC ............. G06Q 10/067; G06Q 30/0201; G06Q 10/06398; G06Q 10/06393; G06Q 10/0639; G06Q 10/06395; H04M 2203/051
See application file for complete search history.

(56) References Cited

U.S. PATENT DOCUMENTS 4,258,421 A * 3/1981 Juhasz .................. G07C 5/085
340/870.16
5,299,550 A * 4/1994 Inoue ...................... F02D 41/22
123/674
5,317,503 A * 5/1994 Inoue .................. G06Q 10/0875
700/90
5,520,160 A * 5/1996 Aota .................... F02D 41/0032
123/520
6,263,322 B1 * 7/2001 Kirkevold .......... G06Q 30/0283
705/400

(Continued)

OTHER PUBLICATIONS

"Increasing Shop Profitability (Part VI): Technician Wages, Incentives, Commission," by Jim Yount, Outdoor Power Equipment, Nov. 2012.*

(Continued)

*Primary Examiner* — Tyler W Knox
(74) *Attorney, Agent, or Firm* — McDonnell Boehnen Hulbert & Berghoff LLP

(57) ABSTRACT

A processor may receive input data indicative of information about a particular vehicle repair shop (VRS). Based on that input data, the processor may determine a potential total extent of sales by the particular VRS over a particular time period. Also, the processor may refer to a data storage device containing computer-readable vehicle repair orders (ROs) each specifying a respective extent of sales by the particular VRS. Based on such ROs, the processor may determine an actual total extent of sales by the particular VRS over the particular time period. Further, based on the potential and actual total extents of sales, the processor may determine a sales efficiency of the particular VRS over the particular time period. Then, the processor may direct a display device to display a visual indication representative of the determined sales efficiency, the potential total extent of sales, and/or the actual total extent of sales.

27 Claims, 10 Drawing Sheets

(56) References Cited

U.S. PATENT DOCUMENTS

| | | | | |
|---|---|---|---|---|
| 6,370,454 B1* | 4/2002 | Moore | G06Q 10/109 | 340/438 |
| 6,768,935 B1* | 7/2004 | Morgan | G06Q 10/10 | 701/29.6 |
| 6,823,258 B2* | 11/2004 | Ukai | G01S 5/0027 | 340/436 |
| 6,850,071 B1* | 2/2005 | Pederson | F02P 17/12 | 123/198 DC |
| 7,092,937 B2* | 8/2006 | Morgan | G06Q 10/06 | 707/736 |
| 7,127,455 B2* | 10/2006 | Carson | G06Q 50/10 | |
| 7,487,035 B2* | 2/2009 | Nozawa | F02D 41/1438 | 123/198 F |
| 7,536,457 B2* | 5/2009 | Miller | G07C 5/008 | 709/224 |
| 7,542,832 B2* | 6/2009 | Nou | G07C 5/008 | 340/425.5 |
| 7,801,671 B1* | 9/2010 | Pederson | G01M 15/11 | 701/111 |
| 7,973,653 B2* | 7/2011 | Adachi | B60R 25/102 | 340/438 |
| 8,015,042 B2* | 9/2011 | Seetharaman | G06Q 10/06 | 705/7.12 |
| 8,095,261 B2* | 1/2012 | Howell | G05B 19/0428 | 340/438 |
| 8,108,250 B1* | 1/2012 | Moore | G06Q 10/0639 | 705/7.42 |
| 8,140,358 B1* | 3/2012 | Ling | G06Q 40/08 | 705/4 |
| 8,160,907 B2* | 4/2012 | Smith | G06Q 10/02 | 705/5 |
| 8,266,066 B1* | 9/2012 | Wezter | G06Q 10/10 | 705/78 |
| 8,285,439 B2* | 10/2012 | Hodges | G07C 5/0808 | 701/31.5 |
| 8,868,288 B2* | 10/2014 | Plante | B60K 35/00 | 701/32.2 |
| 9,139,091 B1* | 9/2015 | Penilla | G06Q 20/18 | |
| 9,355,549 B2* | 5/2016 | McClintic | G06Q 10/06 | |
| 10,168,691 B2* | 1/2019 | Zornio | G05B 19/41855 | |
| 10,318,904 B2* | 6/2019 | Johnson | G06Q 10/06315 | |
| 2002/0007237 A1* | 1/2002 | Phung | G05B 23/0216 | 701/31.4 |
| 2002/0059156 A1* | 5/2002 | Hwang | G01M 17/007 | 706/45 |
| 2002/0138185 A1* | 9/2002 | Trsar | G07C 5/085 | 701/29.1 |
| 2002/0152115 A1* | 10/2002 | Morita | G08G 1/096741 | 705/13 |
| 2003/0004624 A1* | 1/2003 | Wilson | G01D 9/005 | 701/29.3 |
| 2003/0050830 A1* | 3/2003 | Troyer | G06Q 10/0639 | 705/7.38 |
| 2003/0171981 A1* | 9/2003 | Bargnes | G06Q 10/06312 | 705/7.16 |
| 2003/0195681 A1* | 10/2003 | Rother | G07C 5/0808 | 701/29.6 |
| 2004/0176885 A1* | 9/2004 | Quinn | B60R 16/0234 | 701/33.4 |
| 2005/0085964 A1* | 4/2005 | Knapp | G05B 23/0283 | 701/31.4 |
| 2005/0149566 A1* | 7/2005 | Baek | G06Q 10/06313 | |
| 2005/0171661 A1* | 8/2005 | Abdel-Malek | G07C 5/008 | 701/31.4 |
| 2005/0251450 A1* | 11/2005 | Koether | H04M 11/002 | 705/15 |
| 2005/0273218 A1* | 12/2005 | Breed | B60R 21/20 | 701/2 |
| 2006/0095230 A1* | 5/2006 | Grier | G05B 23/0216 | 702/183 |
| 2006/0101074 A1* | 5/2006 | Cancilla | G07C 5/0808 | |
| 2006/0106797 A1* | 5/2006 | Srinivasa | G06F 16/2465 | |
| 2007/0043487 A1* | 2/2007 | Krzystofczyk | G06Q 10/06 | 701/29.5 |
| 2007/0124040 A1* | 5/2007 | Chen | G07C 5/006 | 701/31.4 |
| 2007/0203777 A1* | 8/2007 | Berkey | G06Q 10/06 | 705/7.29 |
| 2008/0004764 A1* | 1/2008 | Chinnadurai | G05B 23/0235 | 701/31.4 |
| 2008/0040268 A1* | 2/2008 | Corn | G06Q 30/04 | 705/305 |
| 2008/0059279 A1* | 3/2008 | Goldschneider | G06Q 10/10 | 705/7.37 |
| 2008/0110239 A1* | 5/2008 | Maegawa | F02D 41/221 | 73/23.32 |
| 2008/0312988 A1* | 12/2008 | Trapp | G06Q 10/06395 | 705/7.29 |
| 2009/0055045 A1* | 2/2009 | Biswas | G07C 5/0808 | 701/31.4 |
| 2009/0062977 A1* | 3/2009 | Brighenti | G01M 13/022 | 701/32.9 |
| 2009/0295559 A1* | 12/2009 | Howell | B60Q 11/00 | 340/459 |
| 2010/0023203 A1* | 1/2010 | Shibi | G07C 5/0808 | 701/31.4 |
| 2010/0063668 A1* | 3/2010 | Zhang | G06Q 10/04 | 701/29.5 |
| 2010/0152962 A1* | 6/2010 | Bennett | G07C 5/0808 | 701/31.4 |
| 2011/0118905 A1* | 5/2011 | Mylaraswamy | G07C 5/085 | 701/3 |
| 2011/0118934 A1* | 5/2011 | Lowrey | G07C 5/0808 | 701/31.5 |
| 2011/0172874 A1* | 7/2011 | Patnaik | G06F 11/008 | 701/31.4 |
| 2011/0238258 A1* | 9/2011 | Singh | G07C 5/0808 | 701/31.4 |
| 2011/0270706 A1* | 11/2011 | Anspach | G06Q 30/06 | 705/26.61 |
| 2011/0279283 A1* | 11/2011 | Corn | G08B 13/2417 | 340/686.6 |
| 2012/0203580 A1* | 8/2012 | Smith | G06Q 40/12 | 705/5 |
| 2012/0215491 A1* | 8/2012 | Theriot | G06F 11/30 | 702/183 |
| 2012/0245791 A1* | 9/2012 | Yun | B60W 50/0205 | 701/31.9 |
| 2012/0303205 A1* | 11/2012 | Subramania | G05B 23/0278 | 701/29.8 |
| 2013/0304306 A1* | 11/2013 | Selkirk | G07C 5/0808 | 701/31.4 |
| 2013/0325541 A1* | 12/2013 | Capriotti | G06Q 10/087 | 705/7.21 |
| 2014/0121888 A1* | 5/2014 | Guo | G07C 5/008 | 701/31.4 |
| 2014/0207771 A1* | 7/2014 | Merg | G06F 16/316 | 707/731 |
| 2015/0324363 A1* | 11/2015 | Merg | G06F 16/248 | 707/730 |
| 2016/0162817 A1* | 6/2016 | Grimaldi | G06Q 10/20 | 705/7.27 |
| 2016/0260107 A1* | 9/2016 | Seth | G06Q 30/0201 | |
| 2017/0352011 A1* | 12/2017 | Sells | G06Q 10/20 | |

OTHER PUBLICATIONS

Pending U.S. Appl. No. 14/270,994, filed May 6, 2014 (Inventor Patrick S. Merg).

* cited by examiner

RTR Car Repair, Tuscaloosa, Alabama    February 18, 2009

Customer: C. N. Saban    VIN: 1GYSP74WXVR123456

Vehicle: 1997 Ford Crown Vic. 4.6L, V8, (W), Auto Trans.

Complaint: Failed emissions test. Check engine light on. Change oil and filter.

Service procedure:

| | Time | Rate | Cost | Part Description | Part # | Price |
|---|---|---|---|---|---|---|
| Check DTC – P0171 and P0174. (C45) | 0.3 | $100 | $30 | MAF sensor | 6012980 | $89.99 |
| Check system vacuum and fuel pressures 30/40 PSI. (C117, C245) MAF readings bad. (C772) | 0.5 | $100 | $50 | Oil Filter | 6043011 | $19.99 |
| Cleaned MAF, retested, recalibrated MAF. Verify repair. (C415, R550) | 1.0 | $100 | $100 | ECT sensor | 6563772 | $73.99 |
| Change engine oil and filter. (C085) | 0.2 | $100 | $20 | Sub-total | | $183.97 |
| Lubricate chassis. (C086) | 0.5 | $50 | $25 | Labor | | $335.00 |
| Check DTC. Diagnose DTC 117. (C100) | 0.2 | $50 | $10 | Tax | | $51.90 |
| Coolant sensor short. R/R coolant sensor. (R199) | 0.4 | $100 | $40 | Total | | $570.87 |
| | 0.4 | $100 | $40 | | | |
| Verify repair. (V18) | 0.2 | $100 | $20 | | | |

Technicians:
- Josh A. (#4)
- James C. (#6)

Mileage: 23,411

FIG. 4

| | |
|---|---|
| RO ID: 3915   Repair year 2009 Y/M/M/E: 1997/Ford/Crown Victoria/4.6L, V8, VIN (W) | |
| Work Requested: Customer states the vehicle has failed state emissions certification. Please diagnose and advise. Customer states please replace the MAF sensor. | 508 |
| Work Performed: Technician scan tested and verified the DTC P0171 and DTC P0174. Tested for vacuum leaks and found none at the time. Tested the fuel pump pressure found [[30]] PSI and [[40]] PSI unregulated. Checked the scan data. Found the MAF sensor readings incorrectly. Removed the MAF sensor and cleaned. Found the MAF sensor is not damaged. Recommend recalibration of MAF sensor. Recalibrated MAF sensor. Found the MAF sensor readings correctly. | 510 |
| Meta-data: Customer complaint: failed state emissions certification<br>Pcode: P0171, P0174<br>Component: mass airflow sensor (MAF) (MAF sensor)<br>Technicians: Josh A. (#4) and James C. (#6) | 512 |
| Usage indicator: Distance = 23,411 miles | 514 |

FIG. 5

```
┌─────────────────────────────────────────────────────────────────┐
│ RECEIVING, BY AT LEAST ONE PROCESSOR, INPUT DATA INDICATIVE OF: │
│ AN OPERATING DURATION OF A PARTICULAR VEHICLE REPAIR SHOP       │
│ (VRS), A COUNT OF VEHICLE REPAIR TECHNICIANS ASSOCIATED WITH    │
│ THE PARTICULAR VRS, A WORKING DURATION RESPECTIVELY OF EACH     │
│ VEHICLE REPAIR TECHNICIAN ASSOCIATED WITH THE PARTICULAR VRS,   │
│ AND AT LEAST ONE LABOR RATE ASSOCIATED WITH THE PARTICULAR      │
│ VRS, WHEREIN THE AT LEAST ONE PROCESSER IS CONFIGURED TO        │
│ REFER TO A DATA STORAGE DEVICE CONTAINING A PLURALITY OF        │
│ COMPUTER-READABLE VEHICLE REPAIR ORDERS (ROs) EACH              │
│ SPECIFYING A RESPECTIVE EXTENT OF SALES BY THE PARTICULAR VRS   │
└─────────────────────────────────────────────────────────────────┘
                                  │
                                  ▼  ⤷ 602
┌─────────────────────────────────────────────────────────────────┐
│ BASED ON THE INPUT DATA, DETERMINING, BY THE AT LEAST ONE       │
│ PROCESSOR, A POTENTIAL TOTAL EXTENT OF SALES BY THE             │
│ PARTICULAR VRS OVER A PARTICULAR TIME PERIOD                    │
└─────────────────────────────────────────────────────────────────┘
                                  │
                                  ▼  ⤷ 604
┌─────────────────────────────────────────────────────────────────┐
│ BASED ON THE PLURALITY OF ROs, DETERMINING, BY THE AT LEAST ONE │
│ PROCESSOR, AN ACTUAL TOTAL EXTENT OF SALES BY THE PARTICULAR    │
│ VRS OVER THE PARTICULAR TIME PERIOD                             │
└─────────────────────────────────────────────────────────────────┘
                                  │
                                  ▼  ⤷ 606
┌─────────────────────────────────────────────────────────────────┐
│ BASED ON THE POTENTIAL TOTAL EXTENT OF SALES AND ON THE         │
│ ACTUAL TOTAL EXTENT OF SALES, DETERMINING, BY THE AT LEAST ONE  │
│ PROCESSOR, A SALES EFFICIENCY OF THE PARTICULAR VRS OVER THE    │
│ PARTICULAR TIME PERIOD                                          │
└─────────────────────────────────────────────────────────────────┘
                                  │
                                  ▼  ⤷ 608
┌─────────────────────────────────────────────────────────────────┐
│ DIRECTING, BY THE AT LEAST ONE PROCESSOR, A DISPLAY DEVICE TO   │
│ DISPLAY AT LEAST ONE VISUAL INDICATION REPRESENTATIVE OF ONE    │
│ OR MORE OF: THE DETERMINED SALES EFFICIENCY, THE POTENTIAL      │
│ TOTAL EXTENT OF SALES, AND THE ACTUAL TOTAL EXTENT OF SALES     │
└─────────────────────────────────────────────────────────────────┘
                                                        ⤷ 610
                         ↑
                        600
```

FIG. 6

How many hours are you open each day?

| Mon. | Tue. | Wed. | Thu. | Fri. | Sat. | Sun. |
|------|------|------|------|------|------|------|
| 9 | 9 | 9 | 9 | 9 | 4 | 0 |

← 702

Which holidays are you closed?

| New Year's Eve | X | Columbus Day | |
| New Year's Day | X | Veteran's Day | |
| Martin Luther King Day | | Thanksgiving | X |
| Washington's Birthday | | Christmas Eve | X |
| Memorial Day | X | Christmas Day | X |
| Independence Day | X | Other | |
| Labor Day | | | |

← 704

How many technicians do you employ? [3] ← 706

Tech 1 working hours (typical)

| Mon. | Tue. | Wed. | Thu. | Fri. | Sat. | Sun. |
|------|------|------|------|------|------|------|
| 8 | 8 | 8 | 8 | 8 | 4 | 0 |

Tech 1 planned vacation hours off/year [44] ← 708A

Tech 2 working hours (typical)

| Mon. | Tue. | Wed. | Thu. | Fri. | Sat. | Sun. |
|------|------|------|------|------|------|------|
| 8 | 8 | 8 | 8 | 8 | 4 | 0 |

Tech 2 planned vacation hours off/year [88] ← 708B

Tech 3 working hours (typical)

| Mon. | Tue. | Wed. | Thu. | Fri. | Sat. | Sun. |
|------|------|------|------|------|------|------|
| 8 | 8 | 8 | 8 | 8 | 4 | 0 |

Tech 3 planned vacation hours off/year [88] ← 708C

Shop labor rate? [$85.00] ← 710

INPUT SCREEN 700

FIG. 7

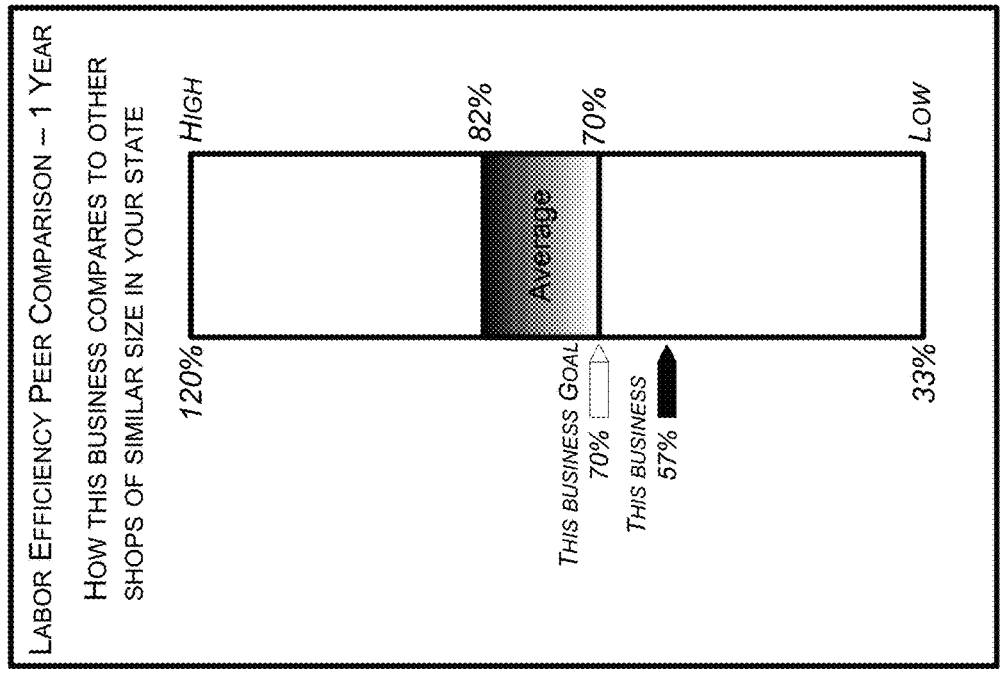
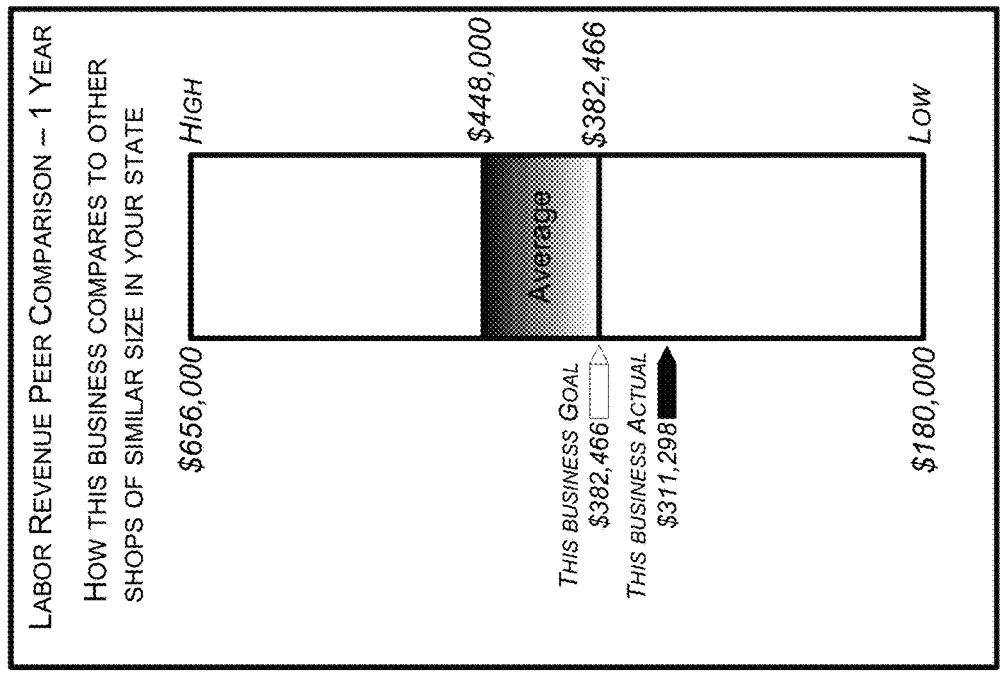
FIG. 8

METHODS AND SYSTEMS FOR TRACKING LABOR EFFICIENCY

INCORPORATION BY REFERENCE

U.S. patent application Ser. No. 14/270,994, filed on May 6, 2014, is incorporated herein by reference, as if fully set forth in this description.

BACKGROUND

Many products produced by manufacturers occasionally have to be repaired. Many owners are unequipped or otherwise unable to repair certain products. Such owners may depend on professional repair technicians to service or repair the owner's product.

The repair technicians typically repair products at a product repair shop (e.g., a vehicle repair shop). A repair shop has traditionally produced a repair order (RO) to capture a variety of information regarding a request for servicing or repairing a product. As an example, the captured information can include information identifying the product, the product's owner, the repair shop, the date of repair, the type of repair or service needed or performed, and/or cost of repair, among others. The RO can exist in various formats such as a paper format or an electronic format.

Generally, repair shops use a significant amount of resources to evaluate performance (e.g., efficiency) of the repair shop as a whole and/or of individual repair technicians that repair products at the repair shop. Thus, it may be beneficial to repair shops if the repair information can be used by a computing device to automatically generate report(s) indicative of such repair shop and/or repair technician performance.

OVERVIEW

Example implementations are described herein. In one aspect, a method is disclosed. The method involves receiving, by at least one processor, input data indicative of: an operating duration of a particular vehicle repair shop (VRS), a count of vehicle repair technicians associated with the particular VRS, a working duration respectively of each vehicle repair technician associated with the particular VRS, and at least one labor rate associated with the particular VRS. Also, the at least one processer is configured to refer to a data storage device containing a plurality of computer-readable vehicle repair orders (ROs) each specifying a respective extent of sales by the particular VRS. The method also involves, based on the input data, determining, by the at least one processor, a potential total extent of sales by the particular VRS over a particular time period. The method additionally involves, based on the plurality of ROs, determining, by the at least one processor, an actual total extent of sales by the particular VRS over the particular time period. The method further involves, based on the potential total extent of sales and on the actual total extent of sales, determining, by the at least one processor, a sales efficiency of the particular VRS over the particular time period. The method yet further involves directing, by the at least one processor, a display device to display at least one visual indication representative of one or more of: the determined sales efficiency, the potential total extent of sales, and the actual total extent of sales.

In another aspect, a computing system is disclosed. The computing system include a data storage device having stored thereon a plurality of computer-readable vehicle repair orders (ROs) each specifying a respective extent of sales by a particular vehicle repair shop (VRS). The computing system also includes at least one processor configured to refer to the data storage device and programmed to receive input data indicative of: an operating duration of the particular VRS, a count of vehicle repair technicians associated with the particular VRS, a working duration respectively of each vehicle repair technician associated with the particular VRS, and at least one labor rate associated with the particular VRS. The at least one processor is also programmed to, based on the input data, determine a potential total extent of sales by the particular VRS over a particular time period. The at least one processor is additionally programmed to, based on the plurality of ROs, determine actual total extent of sales by the particular VRS over the particular time period. The at least one processor is further programmed to, based on the potential total extent of sales and on the actual total extent of sales, determine a sales efficiency of the particular VRS over the particular time period. The at least one processor is yet further programmed to direct a display device to display at least one visual indication representative of one or more of: the determined sales efficiency, the potential total extent of sales, and the actual total extent of sales.

In yet another aspect, a computer readable medium is disclosed. The computer readable medium has stored thereon instructions executable by at least one processor to cause a computing system to perform operations. The operations involve receiving input data indicative of: an operating duration of a particular vehicle repair shop (VRS), a count of vehicle repair technicians associated with the particular VRS, a working duration respectively of each vehicle repair technician associated with the particular VRS, and at least one labor rate associated with the particular VRS. Also, the at least one processer is configured to refer to a data storage device containing a plurality of computer-readable vehicle repair orders (ROs) each specifying a respective extent of sales by the particular VRS. The operations also involve, based on the input data, determining a potential total extent of sales by the particular VRS over a particular time period. The operations additionally involve, based on the plurality of ROs, determining an actual total extent of sales by the particular VRS over the particular time period. The operations further involve, based on the potential total extent of sales and on the actual total extent of sales, determining a sales efficiency of the particular VRS over the particular time period. The operations yet further involve directing a display device to display at least one visual indication representative of one or more of: the determined sales efficiency, the potential total extent of sales, and the actual total extent of sales.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 4 shows a repair order in accordance with one or more example embodiments.

FIG. 5 shows a repair order including auto-generated repair-hint and meta-data.

FIG. 6 is a flowchart depicting a set of operations that can be carried out in accordance with one or more example embodiments.

FIG. 7 shows an input screen in accordance with one or more example embodiments.

FIG. 8 shows visual indications representative of performance of a vehicle repair shop.

DETAILED DESCRIPTION

I. Introduction

Figure 1:
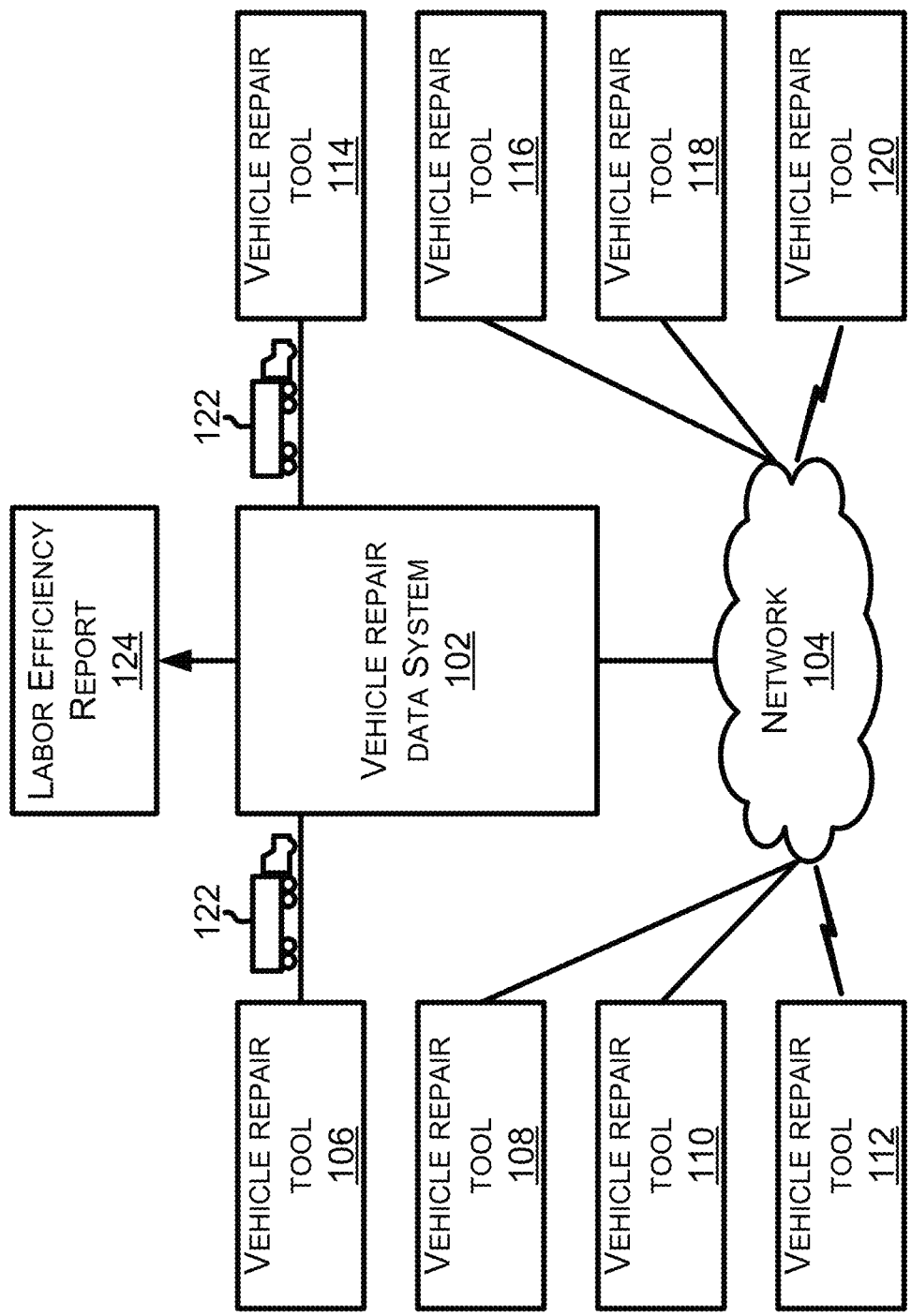
FIG. 1 is a block diagram of a system in accordance with one or more example embodiments.

This description describes several example embodiments including example embodiments regarding labor efficiency tracking. At least some of the example embodiments include, but are not limited to include, one or more of the following features: (i) receiving input data indicative of: an operating duration of a particular vehicle repair shop (VRS), a count of vehicle repair technicians associated with the particular VRS, a working duration respectively of each vehicle repair technician associated with the particular VRS, and at least one labor rate associated with the particular VRS, where the at least one processor is configured to refer to a data storage device containing a plurality of computer-readable vehicle repair orders (ROs) each specifying a respective extent of sales by the particular VRS, (ii) based on the input data, determining a potential total extent of sales by the particular VRS over a particular time period, (iii) based on the plurality of ROs, determining an actual total extent of sales by the particular VRS over the particular time period, (iv) based on the potential total extent of sales and on the actual total extent of sales, determining a sales efficiency of the particular VRS over the particular time period, and (v) directing a display device to display at least one visual indication representative of one or more of: the determined sales efficiency, the potential total extent of sales, and the actual total extent of sales.

A vehicle repair tool can include any of a variety of repair tools a repair technician, a product owner, a person working at a repair shop, or some other person can use to repair a vehicle. Repairing a vehicle can include, but is not limited to include, diagnosing a vehicle, servicing a vehicle, performing maintenance (e.g., preventive maintenance) on a vehicle, or verifying a repair performed on a vehicle to correct a vehicle malfunction. Accordingly, a vehicle repair tool can be referred to as one or more of the following terms: a vehicle diagnostic tool, a vehicle service tool, a vehicle maintenance tool, and a vehicle repair verification tool, or more generally, a machine.

A vehicle is a mobile machine that may be used to transport a person, people, and/or cargo. As an example, any vehicle described herein may be driven or otherwise guided along a path (e.g., a paved road or otherwise) on land, in water, or in the air or outer space. Any vehicle described herein can be wheeled, tracked, railed, and/or skied. Any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, and/or a farm machine. As an example, a vehicle guided along a path can include a van (such as a dry or refrigerated van), a tank trailer, a platform trailer, or an automobile carrier. Any vehicle described herein can include and/or use any appropriate voltage and/or current source, such as a battery, an alternator, a fuel cell, and the like, providing any appropriate current and/or voltage, such as about 12 volts, about 42 volts, and the like. Any vehicle described herein can include and/or use any desired system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. Any vehicle described herein can include an electronic control unit (ECU), a data link connector (DLC), and a vehicle communication link that connects the DLC to the ECU.

Although many of the example embodiments are described with respect to a vehicle, the example embodiments can be applicable to products or repairable items other than a vehicle. As an example, the other products or repairable items can include home appliances, such as a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a," "an," and "the" are used to introduce elements and/or functions of the example embodiments. The intent of using those articles is that there is one or more of the introduced elements and/or functions. In this description, the intent of using the term "and/or" within a list of at least two elements or functions and the intent of using the terms "at least one of" and "one or more of" immediately preceding a list of at least two elements or functions is to cover each embodiment including a listed element or function independently and each embodiment comprising a combination of the listed elements or functions. For example, an embodiment described as comprising "A, B, and/or C," or "at least one of A, B, and C," or "one or more of A, B, and C" is intended to cover each of the following possible embodiments: (i) an embodiment comprising A, but not B and C, (ii) an embodiment comprising B, but not A and C, (iii) an embodiment comprising C, but not A and B, (iv) an embodiment comprising A and B, but not C, (v) an embodiment comprising A and C, but not B, (v) an embodiment comprising B and C, but not A, and (vi) an embodiment comprising A, B, and C. For the embodiments comprising element or function A, the embodiments can comprise one A or multiple A. For the embodiments comprising element or function B, the embodiments can comprise one B or multiple B. For the embodiments comprising element or function C, the embodiments can comprise one C or multiple C. In this description, the use of ordinal numbers such as "first," "second," "third" and so on is to distinguish respective elements rather than to denote a particular order of those elements unless the context of using those terms explicitly indicates otherwise. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements or a machine described herein can be carried out by a processor executing computer-readable program instructions or by any combination of hardware, firmware, or software.

II. Example Architecture

FIG. 1 is a block diagram of a system 100 in accordance with one or more example embodiments. Various combinations of the elements shown in FIG. 1 can be arranged as other systems or as a sub-system to carry out example embodiments described herein. System 100 includes a vehicle repair data (VRD) system 102 and a network 104. Network 104 can include a wide area network (WAN), such as the Internet or a portion thereof. Additionally or alternatively, network 104 can include a wireless network, a wired network, a local area network (LAN), or some other type of network. Network 104 can include two or more of the aforementioned example networks.

System 100 includes a vehicle repair tool (VRT) 106, and VRT 108, 110, 112, 114, 116, 118, and 120. Each VRT or a combination of multiple VRT can include or be arranged as a machine. Any VRT described herein can be, but is not required to be, configured to generate or transmit an original repair order (RO) to VRD system 102. An RO generated by a VRT can be provided to an operator of VRD system 102 by a courier 122, such as the United States Postal Service or the Federal Express Corporation. The operator of VRD system 102 can enter an original RO into VRD system 102 using an RO manual entry device, such as an RO manual entry device 202 shown in FIG. 2. The manually-entered RO can be stored in a data storage device, such as a data storage device 210 shown in FIG. 2.

VRT 114, 116, 118, and 120 represent vehicle repair tools that are configured to perform at least one of the following functions: request a repair-hint (e.g., an auto-generated repair hint) stored at VRD system 102, receive a repair-hint transmitted from VRD system 102 using network 104 or otherwise provided or generated by VRD system 102, and present a repair-hint by a user interface. A repair-hint generated by VRD system 102 can be provided to an operator of a VRT, such as VRT 114, by courier 122. As an example, courier 122 can provide the repair-hint by providing the VRT operator with a computer-readable medium, such as a CD-ROM, including a repair-hint generated by VRD system 102. VRT 116, 118, and 120 can receive a repair-hint generated by VRD system 102 and transmitted to the VRT using wireless or wired communications and network 104.

A VRT can include a code reader, such as a one-dimensional bar code reader or a two-dimensional bar coder reader. The code reader can read and decode a code on a vehicle, such as a VIN bar code, a code on a replacement part, such as a bar code or quick-response code on packaging of a replacement part, or some other type of code. Data encoded from a code can be entered onto an original RO, such as original RO 400 shown in FIG. 4.

Figure 2:
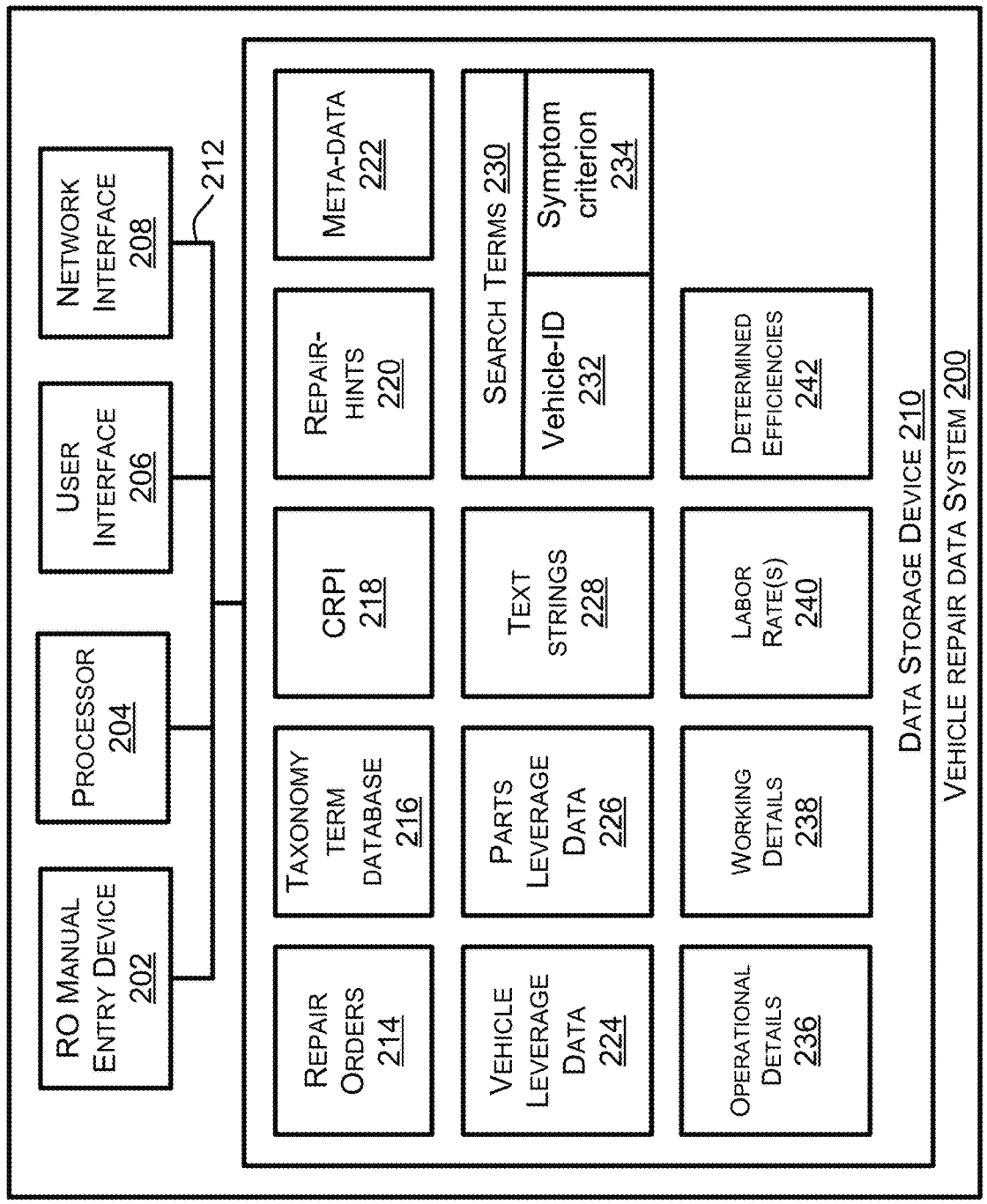
FIG. 2 is a block diagram of a vehicle repair data (VRD) system in accordance with one or more example embodiments.

Next, FIG. 2 is a block diagram showing details of a vehicle repair data (VRD) system 200. VRD system 102, shown in FIG. 1, can be configured similar to VRD system 200. VRD system 200 can be configured like VRD system 102 shown in FIG. 1. VRD system 200 can include or be arranged as a machine. VRD system 200 or one or more components thereof can be arranged or referred to as a computing system or a computer system. VRD system 200 can comprise, be configured as, or be referred to as a server system, a server device, or more simply, a server. In accordance with embodiments in which VRD system 200 operates as a server, VRD system 200 can serve one or more vehicle repair tools (VRT) operating as a client device to the server.

VRD system 200 includes the RO manual entry device 202, a processor 204, a user interface 206, a network interface 208, and a data storage device 210, all of which can be linked together via a system bus, network, or other connection mechanism 212.

RO manual entry device 202 can include one or more devices for inputting data shown on a printed RO into VRD system 200 for storage as an original RO within repair orders (RO) 214. As an example, RO manual entry device 202 can include a scanner device with or without an optical character recognition software application. As another example, RO manual entry device 202 can include a keyboard for keying in (e.g., typing) the data shown on the printed RO and sending the keyed in (e.g., typed or otherwise entered) data to processor 204 for storage as an original RO within RO 214. As yet another example, RO manual entry device 202 can include a device that accepts data storage devices, such as a CD-ROM including data representing an original RO generated by a VRT. As yet another example, RO manual entry device 202 can include a laptop or desktop computing device with or connected to a display.

An original RO can be displayed by RO manual entry device 202 or user interface 206. For any of a variety of reasons, such as security of information located on an original RO, VRD system 102 can be configured such that an original RO generated by a first VRT, such as VRT 106, is not provided to a second VRT, such as VRT 116. VRD system 102 can generate a presentable RO based, at least in part, on information on the original RO generated by the VRT 106, and provide the presentable RO to VRT 116.

A processor, such as processor 204, can include one or more general purpose processors (e.g., INTEL single core microprocessors or INTEL multicore microprocessors) or one or more special purpose processors (e.g., digital signal processors). A processor, such as processor 204, can be configured to execute computer-readable program instructions, such as computer-readable program instructions (CRPI) 218. For purposes of this description, processor 204 executing CRPI 218 to perform some function described herein can include executing a portion of CRPI 218 or the entirety of CRPI 218. Executing a portion or the entirety of CRPI 218 can include executing some of the computer-readable program instructions multiple times. Processor 204 can be programmed to perform any one or any combination of functions performed by execution of a program instruction of CRPI 218.

User interface 206 can include an interface to components operable to enter data or information into VRD system 200 or to components that can present data or information output by VRD system 200. Those components can be referred to as user interface components. User interface 206 can include one or more audio/visual ports or communication ports that connect to a user interface component by a wired or wireless user interface communication link.

User interface 206 can include one or more of the user interface components. As an example, the user interface components can include an infrared remote control device, a display device, a loud speaker configured to convert electrical signals to audible sounds, a keyboard, a touch screen, a pointing device, such as a computer mouse, or some other component for generating signals to enter data or information into VRD system 200 or to present data or information output by user interface 206.

User interface 206 can include a transmitter or transceiver to provide the data or information to another user interface component or to another element of VRD system 200. The data or information provided by user interface 206 can include, but is not limited to include, a repair-hint of repair-hints 220.

Network interface 208 can include an interface to one or more communication networks, such as network 104. For use with wireless communication networks, network interface 208 can include one or more antennas for transmitting or receiving wireless communications. Network interface 208 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 208 can include a network controller including a transmitter, a receiver, or a transceiver. The transmitter or transceiver can provide data or information to a communication port for transmission as network communications over the connected network. The receiver or transceiver can receive data or information received at a communication port from the connected network.

A data storage device, such as such as data storage device 210 or any other data storage device discussed in this description or included within a device or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 104. The communication link may include a digital or analog communication link. The communication link may include a wired communication link or a wireless communication link.

A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

Data storage device 210 can store a variety of data. The data stored by data storage device 210 can be data that was provided to data storage device 210 for storage from RO manual entry device 202, processor 204, user interface 206 or network interface 208. As shown in FIG. 2, data storage device 210 can store repair orders (RO) 214, a taxonomy term database 216, computer-readable program instructions (CRPI) 218, repair hints 220, meta-data 222, vehicle leverage data 224, parts leverage data 226, text strings 228, and search terms 230. Search terms 230 can include, but is not limited to, vehicle-identification (i.e., vehicle-ID) search terms 232, such as year/make/model/engine (Y/M/M/E) attributes, and symptom criterion 234.

RO 214 can include computer-readable RO. The computer-readable RO can be arranged as a structured query language (SQL) file, an extensible markup language (XML) file, or some other type of computer-readable file or data structure. The RO within RO 214 can be received from RO manual entry device 202, from network interface 208 by way of network 104, or from another device. The RO within RO 214 can be an original RO, such as RO generated by a VRT shown in FIG. 1 or entered using RO manual entry device 202, or a presentable RO generated by VRD system 200.

FIG. 4 shows an example original RO 400. Original RO 400 can be generated by a VRT, such as any VRT shown in FIG. 1. Original RO 400 can include a computer-readable-data RO (or more simply, computer-readable RO) transmitted over network 104. Original RO 400 can include a paper-copy RO, such as carbonless multi-sheet RO or some other type of paper-copy RO. Original RO 400 can include both a computer-readable-data version and a paper-copy version. A paper-copy RO can be generated without using a VRT. A computer-readable RO generated from a paper-copy RO can be an original RO.

Original RO 400 includes a service provider identifier 402, a date of service identifier 404, a customer indicator 406 that indicates a customer seeking service of a given vehicle, vehicle information 408 that indicates the given vehicle, vehicle service requests 410, 412, and 414 indicating the complaint(s) or service(s) requested by the customer, parts information 416 indicating parts obtained for servicing the given vehicle, service procedure information 418, 420, and 422 carried out on the given vehicle, and a vehicle-usage indicator 430 (e.g., vehicle mileage data that indicates a number of miles the given vehicle has been driven). The vehicle-usage indicator 430 on original RO 400 can indicate a driven distance using kilometers or some other units as an alternative or in addition to vehicle mileage data. In addition to or as an alternative to indicating a distance, the vehicle-usage indicator 430 can include a time-used indicator such as an hours indicator indicating, for example, how long a vehicle or an engine has been used.

Service provider identifier 402 can include information that indicates a name and geographic location of the service provider. Vehicle information 408 can include a vehicle identification number (VIN) 432 associated with the given vehicle and a description of the given vehicle. Service procedure information 418, 420, and 422 can include information within distinct RO sections 424, 426, and 428, respectively, of original RO 400. The service procedure information within any one distinct RO section 424, 426, and 428 can be unrelated to the service procedure information with any other distinct section. Alternatively, two or more distinct sections including service procedure information can pertain to related service operations performed on the given vehicle.

Original RO 400 includes labor operation codes (LOCs). The LOCs can conform to those defined by a vehicle manufacturer, a service provider that generates an RO, a service information provider, such as Mitchell Repair Information, LLC, Poway, Calif., or some other entity. For simplicity of FIG. 4, the LOCs are shown within parenthesis, such as (C45) and (C117, C245). Distinct LOC within parenthesis are separate by a comma. Each labor operation code (LOC) can refer to a particular operation performed to the given vehicle. Processor 204, executing CRPI 218, can use a LOC to determine what type of service or repair operation was performed to the given vehicle. Using the LOC in that manner is helpful if other information regarding that operation is incomplete or described using non-standard phrases or terms. Processor 204 can also use LOC to determine context for the service procedure information on or within the RO.

Multiple portions of text on an RO, such as original RO 400, can be grouped as phrases. When comparing contents of an RO to various terms of taxonomy term database 216, such as mapping terms, standard terms, or context terms, words within a given proximity to one or more other words on original RO 400 can be grouped as a phrase to be compared to the mapping, standard, or context terms. The given proximity can be within X words, where X equals 1, 2, 3, 4, 5, or some other number of words. As an example, service procedure information 418 states "Check starter/ignition system." The words "Check" and "ignition system" are within 3 words of one another. In accordance with an embodiment in which the given proximity is 4 words, the words "Check" and "ignition system" can be grouped as the phrase "Check ignition system" for comparison to mapping, standard, context terms, or labor operation codes.

The mapping, standard, context terms, or labor operation codes can be stored as part of taxonomy term database 216. Taxonomy term database 216 can include data that identifies words or phrases that are associated with one another. The association can be based on the words or phrases having a common meaning. The words or phrases identified as being associated with one another can be referred to a "taxonomy database group" or, more simply, a "taxonomy group."

Taxonomy term database 216 can include one or more taxonomy groups, and each taxonomy group can include one or more taxonomy terms (e.g., words or phrases). As an example, taxonomy term database 216 can include data that identifies the following phrases as a taxonomy group: (i) stalls when cold, (i) engine quits when temperature is low, (iii) engine dies in the morning, (iv) dies in the morning, (v) dies in the AM, and (vi) engine stalls on cold mornings.

Each taxonomy group can be associated with a standard term, which could be a first word or first phrase added to the taxonomy group. Alternatively, a word or phrase subsequently added to the taxonomy group can be the standard term for the taxonomy group. The words or phrases other than the standard term within a taxonomy group can be mapping terms. The words or phrases within each taxonomy group can be obtained from an RO. An administrator can approve adding or modifying any taxonomy group by, for example, processor 204 executing CRPI 218. Terms within taxonomy term database 216 can be compared to terms on a computer-readable RO. A mapping term on an original RO and found within a given taxonomy group can be represented on a presentable RO by a standard term for the given taxonomy group.

RO 214 can include original RO 400 as a computer-readable version of original RO 400. RO 214 can include one or more other computer-readable RO arranged like original RO 400 and one or more other computer-readable RO arranged in an RO configuration that differs from original RO 400. The other RO configurations typically include at least one of the types of information described above as being a part of original RO 400.

An RO stored within RO 214, such as original RO 400 or another RO, can include searchable text or symbols (e.g., text, symbols, or text and symbols). As an example, a symbol on an RO can include an empty check box or a checkbox and a checkmark inside the checkbox. Original RO 400 can be modified to include a presentable RO 500 (shown in FIG. 5) that represents original RO 400 or data thereon. Additionally or alternatively, presentable RO 500 can be distinct and separate from original RO 400.

Processor 204 can search the text, symbols or other content on an RO of RO 214 or the meta-data associated with an RO to associate an RO within a cluster of RO (or more simply, an RO cluster). Each cluster of RO can be associated with defined RO attributes, such as a diagnostic trouble code (DTC), action, or component listed on the RO. Other attributes of the information recorded on an RO can be associated with an RO cluster. Table 1 shows data identifying twenty-five clusters identified with ID 1 through 25, inclusive. The cluster size indicates how many RO have been associated with the respective cluster. The cluster size can be modified as or after additional RO are added to RO 214 or after an RO is transferred from one cluster to a different cluster. Table 1 shows examples of DTC, Action, and component attributes associated with each respective RO cluster.

TABLE 1

| Cluster ID | Cluster Size | DTC | Action | Component(s) |
|---|---|---|---|---|
| 1 | 3,101 | P0303 | Replaced | Ignition Coil |
| 2 | 3,086 | P0303 | Replaced | Spark Plug |
| 3 | 2,982 | P0302 | Replaced | Ignition Coil |
| 4 | 2,957 | P0304 | Replaced | Spark Plug |
| 5 | 2,831 | P0171 | Replaced | Oxygen Sensor |
| 6 | 2,813 | P0325 | Replaced | Knock Sensor |
| 7 | 2,762 | P0301 | Replaced | Spark Plug |
| 8 | 2,713 | P0320 | Replaced | Crankshaft Position Sensor |
| 9 | 2,624 | P0404 | Replaced | Exhaust Gas Recirculation Valve |
| 10 | 2,609 | P0302 | Replaced | Spark Plug |
| 11 | 2,603 | P0303 | Replaced | Spark Plug Wire, Spark Plug |
| 12 | 2,328 | P0161 | Replaced | Oxygen Sensor |
| 13 | 2,324 | C1500 | Replaced | Fuel Filter, Fuel Tank Module |
| 14 | 2,232 | P0301 | Replaced | Spark Plug Wire, Spark Plug |
| 15 | 2,225 | P0302 | Replaced | Spark Plug Wire, Spark Plug |
| 16 | 2,107 | P0300 | Replaced | Ignition Coil |
| 17 | 2,104 | P0305 | Replaced | Ignition Coil |
| 18 | 2,088 | P0171, P0174 | Replaced | Mass Airflow Sensor |
| 19 | 2,007 | P0134 | Replaced | Oxygen Sensor |
| 20 | 1,991 | P0304 | Replaced | Spark Plug Wire, Spark Plug |
| 21 | 1,963 | P0171, P0174 | Replaced | Fuel Filter |
| 22 | 1,952 | P0306 | Replaced | Ignition Coil |
| 23 | 1,899 | P0128 | Replaced | Thermostat Housing, Engine Coolant Thermostat |
| 24 | 1,824 | P0125 | Replaced | Engine Coolant Thermostat |
| 25 | 1,783 | P0031 | Replaced | Oxygen Sensor |

Table 1 can be modified to include a separate column for other attributes as well. The other attributes can identify RO attributes such as, but not limited to, a customer complaint, a date, or a labor operation code (LOC). As an example, the customer complaint can include, but is not limited to, terms such as rattles, won't start, and vibrates. Auto-generated repair-hints for those example customer complaint terms can include repair hints identifying a way to stop a vehicle from rattling, a way to fix a vehicle that does not start, and a way to stop a vehicle from vibrating, respectively.

Table 2 below shows an example of data included on 25 of the 2,088 RO associated with the RO cluster ID 18 shown in Table 1. The RO data in Table 2 includes an RO identifier that can, for example, be assigned by a VRT or VRD system 102. The RO data in Table 2 also includes year/make/model/engine attributes associated with each RO.

TABLE 2

| RO ID | Year | Make | Model | Engine |
|---|---|---|---|---|
| 2197 | 1999 | Cadillac | Catera | 3.0 L V6, VIN (R) |
| 9277 | 1998 | Mercury | Grand Marquis GS | 4.6 L V8, VIN (W) |
| 1156 | 2002 | Ford | Pickup F150 | 4.2 L, V6 VIN (2) |
| 6978 | 2003 | Ford | Taurus SE | 3.0 L V6, VIN (U) |
| 7923 | 1999 | Ford | Pickup F150 | 4.6 L V8, VIN (W) |
| 5074 | 2000 | Infiniti | I30 | 3.0 L V6, VIN (C) |
| 5640 | 1997 | Ford | Cutaway E350 | 6.8 L, V10, VIN (S) |
| 1037 | 2002 | Land Rover | Range Rover HSE | 4.6 L, V8, VIN (4) |
| 1509 | 2002 | Ford | Explorer | 4.0 L, V6-245, SOHC |
| 1673 | 2006 | Ford | Explorer | 4.0 L, V6-245, SOHC |
| 2088 | 1998 | Ford | Cutaway E350 | 6.8 L, V10, VIN (S) |
| 4692 | 2006 | Ford | Pickup F250 Super Duty | 5.4 L, V8 VIN (5) |
| 5183 | 1996 | Mercury | Grand Marquis GS | 4.6 L, V8, VIN (W) MFI |
| 6825 | 2000 | Saturn | LS2 | 3.0 L, V6, VIN (R) |
| 8203 | 2001 | Hyundai | XG300 | 3.0 L V6, VIN (D) |
| 3915 | 1997 | Ford | Crown Victoria LX | 4.6 L, V8, VIN (W) |
| 7481 | 2001 | Nissan | Pathfinder SE | 3.5 L, V6-3498, DOHC |
| 7833 | 2007 | Chevrolet | Silverado Classic | 6.0 L, V8, VIN (U) |
| 7976 | 1997 | Ford | Thunderbird LX | 4.6 L, V8, VIN (W) |
| 9892 | 2000 | Nissan | Maxima GLE | 3.0 L V6, VIN (C) |
| 0156 | 1999 | Ford | Econoline E150 | 4.6 L, V8, VIN (6) |
| 1194 | 2002 | Ford | Pickup F150 | 4.2 L V6 VIN (2) |
| 8797 | 2006 | Ford | Crown Victoria LX | 4.6 L V8, VIN (W) |
| 6321 | 2000 | Ford | Explorer | 4.0 L V6, VIN (X) |
| 6924 | 1998 | Ford | Ranger | 4.0 L V6, VIN (X) |

Some vehicle models are associated with a sub-model attribute. Some vehicle models are not associated with a sub-model attribute. Table 2 can be modified to include a separate column to include sub-model attributes for vehicles that are associated with a sub-model attribute. As an example, RO ID 7923 pertains to a Ford Pickup F150 make and model. The term "F150" can be referred to as a sub-model attribute. Other sub-model attributes for Ford Pickup models can include the "F250" and "F350" sub-model attributes. A sub-model attribute can be included on an RO. Searching for RO or repair-hints based on a sub-model in addition to Y/M/M/E attributes can lead to search results having RO or repair-hints associated with a particular sub-model, but not the other sub-model(s) of a particular vehicle having particular Y/M/M/E attributes. The "S" within Y/M/M/S/E can represent a sub-model attribute.

Table 2 can be modified to include a separate column for other attributes as well. The other attributes can identify system (Sys) attributes such as, but not limited to, a transmission attribute, a suspension attribute, and an audio system attribute. A set of attributes including a system attribute can be referred to as Y/M/M/E/Sys attributes.

Vehicle leverage data 224 can include computer-readable data that identifies different vehicle models built on a common vehicle platform. Vehicles built on a common vehicle platform can have many similarities including the use of common parts or part numbers. Vehicles built on a common platform can experience similar vehicle symptoms that arise for similar reasons, such as failure of a part common to vehicles built on the common vehicle platform. Table 3 shows an example of data that can be stored as vehicle leverage data 224.

Processor 204 can generate an RO cluster that covers multiple vehicle models, such as the three vehicle models of VLD-3 shown in Table 3. If RO 214 includes 100 RO for the Chevrolet Lumina APV model between 1990-1996 and a given repair condition, 150 RO for the Pontiac Tran Sport models between 1990-1996 and the given problem, and 40 RO for the Oldsmobile Silhouette model between 1990-1196 and the given problem, processor 204 can generate three separate RO clusters for the 290 RO or a single RO cluster for the 290 RO. A greater quantity of RO can indicate a greater likelihood of a successful repair of the given problem.

TABLE 3

| Vehicle Leverage Data Identifier (VLD ID) | Vehicle Models | Model Year(s) | Exceptions |
|---|---|---|---|
| VLD-1 | Cadillac Escalade, Chevrolet Tahoe, Chevrolet Suburban, GMC Yukon | 2011-2013 | GMC Yukon uses hi-capacity radiator |
| VLD-2 | Chevrolet Lumina APV, Pontiac Trans Sport, Oldsmobile Silhouette | 1990-1996 | N.A. |
| VLD-3 | Buick Regal, Oldsmobile Intrigue | 1998-2002 | N.A. |
| VLD-4 | Ford Expedition, Lincoln Navigator | 2008-2014 | Lincoln Navigator uses aluminum cylinder heads |

Processor 204 can use the exception data within vehicle leverage data 224 to exclude RO pertaining to certain vehicle models from an RO cluster associated with a group of vehicles built on a common platform. For the exception data in Table 3, since the GMC Yukon uses a different radiator than the Cadillac Escalade, the Chevrolet Tahoe, and the Chevrolet Suburban, an RO cluster pertaining to a radiator for a GMC Yukon may not be grouped with an RO cluster pertaining to a radiator on Cadillac Escalades, Chevrolet Tahoes, and Chevrolet Suburbans.

Parts leverage data 226 can include data that identifies different vehicle models that use a common part produced by one or more part(s) manufacturer. For purposes of this description, a common part is a part that can be used in either of two or more vehicle models without altering the part or any of the two or more vehicles to use the common part. Various references to a common part, such as a part number or part name, used by any or all of the part(s) manufacturer and the manufacturer(s) of the different vehicle models can be used. Vehicle models using a common part can experience similar vehicle symptoms that arise for similar reasons, such as failure of the common part. Table 4 shows an example of data that can be stored as parts leverage data 226.

TABLE 4

| Common Vehicle Part Identifier | Common Vehicle Part | Vehicle Models | Model Year(s) | Part(s) manufacturer |
|---|---|---|---|---|
| PLD-1 | Coolant temperature sensor | Cadillac Escalade | 2012 | Delco Parts, Inc. |
| PLD-1 | Coolant temperature sensor | Chevrolet Tahoe | 2012 | Delco Parts, Inc. |
| PLD-1 | Coolant temperature sensor | Chevrolet Suburban | 2012 | Delco Parts, Inc. |
| PLD-2 | Fuel injector(s) | Honda Accord | 2013 | ACME, Inc. |
| PLD-2 | Fuel injector(s) | Honda Civic | 2013 | ACME, Inc. |

Processor 204 can generate an RO cluster that covers a common vehicle part and multiple vehicle models, such as the coolant temperature sensor and three vehicle models of PLD-1 shown in Table 4. If RO 214 includes 30 RO for the 2012 Cadillac Escalade model and the coolant temperature sensor, 40 RO for the 2012 Chevrolet Tahoe model and the coolant temperature sensor, and 20 RO for the 2012 Chevrolet Suburban model and the coolant temperature sensor, processor 204 can generate three separate RO clusters for the 70 RO or a single RO cluster for the 70 RO. A greater quantity of RO can indicate a greater likelihood of occurrence of a successful repair of a given problem arising from the coolant temperature sensor.

CRPI 218 can include program instructions executable by processor 204 to carry out functions described herein or performable by VRD system 200. CRPI 218 can include program instructions that are executable to parse data from an original RO stored within RO 214 and to identify the service procedure information, vehicle identification, and parts usage information from the original RO for use in generating a presentable RO or to increment a count of a cluster size if a presentable RO pertaining to the original RO has already been generated, or to decrement a cluster size if processor 204 transfers an RO from one cluster to a different cluster.

CRPI 218 can include program instructions executable by processor 204 to generate, for each auto-generated repair-hint and based on the RO stored in RO 214, meta-data associated with at least one set of search terms. Meta-data 222 can include meta-data generated by processor 204 based the information listed on original RO 400 including, but not limited to the LOC and a definition of the LOC.

CRPI 218 can include program instructions executable by processor 204 to determine that words or phrases within service procedure information, such as service procedure information 418, 420, or 422, are within one or more taxonomy groups of taxonomy term database 216, and to associate (e.g., relate) that service procedure information with the one or more taxonomy groups. The service procedure information associated with any given taxonomy group can be part of a new RO cluster or additional service procedure information to be added to an RO cluster or to modify an RO cluster.

CRPI 218 can include program instructions executable by processor 204 to perform any one or more of the operations, functions, or actions illustrated in blocks 602-610 in FIG. 6 and as described below in this description.

Text strings 228 can include strings of text (e.g., two or more words, numbers or symbols). A text string can include one or more gaps for inserting meta-data to complete the text string. A text string can include a complete text string without any gaps. Processor 204 can select one or more text strings to associate with a set of terms (e.g., search terms) that can be entered or received to search for a repair hint of repair hints 220. Processor 204 can select the meta-data to insert into the gap(s) of a text string. Text strings 228 can include text strings entered by user interface 206. Text strings 228 can include text strings received by network interface 208.

Search terms 230 can include various sets of search terms. A set of search terms can include vehicle-ID search terms 232 or a symptom criterion 234. A first example set of search terms can include search terms received by network interface 208 as part of a request for a repair hint. The first example set of search terms can include search terms that are non-standard terms in taxonomy terms database 216 and can be referred to as non-standard search terms (NSST). Processor 204 can identify, within taxonomy term database 216, standard terms that match the search terms received by network interface 208 and then use any standard terms included within the received search terms or identified from taxonomy term database 216 to search for a repair hint. The non-standard search terms stored as part of search terms 230 can subsequently be reviewed by processor 204 or a human using RO manual entry device 202 or user interface 206 for inclusion as part of taxonomy term database 216.

A second example set of search terms can include standard sets of search terms and can be referred to as standard search terms (SST). A standard set of search terms can include standard vehicle-ID search terms, such as Y/M/M/E attributes, defined in taxonomy term database 216 and standard symptom criterion defined in taxonomy term database 216. Processor 204 can associate one or more standard sets of search terms with a repair hint or a repair order. A set of search terms associated with a repair hint or repair order can be stored as meta-data associated with that repair hint or repair order. Taxonomy term database 216 can include search terms 230. The second example set of search terms 230 can be associated with one more sets of search terms like the first example set of search terms.

Table 5 shows an example of search terms that can be stored in search terms 230. NSST-227 is associated with SST-15. SST-15 is associated with RO ID 3915. Repair hint 510 on RO ID 3915 can be identified in response to receiving NSST-227, determining that SST-15 is associated with NSST-227, and determining RO ID 3915 is associated with SST-15. SST-1456 is a set of standard search terms having symptom criterion common to SST-15 and SST-1456, and a Y/M/M/E attribute that differs from the Y/M/M/E for SST-15 only by the model years (i.e., 2000 instead of 1999). SST-15 and SST-1456 are both associated with RO ID 3915. This association can be determined based on vehicle leverage data 224 or parts leverage data 226.

TABLE 5

| Search Terms | Y/M/M/E | Symptom Criterion | Associations |
|---|---|---|---|
| NSST-227 | 97 Ford Crown Vic. 8 cyl. | Emissions and MAF failed. DTC P171 P174. | SST-15 |
| SST-15 | 1999/Ford/Crown Victoria/4.6 L V8 (W) | Pcode: P0171, P0174 Component: MAF sensor Work Requested: failed state emissions certification | RO ID 3915 NSST-227 |
| SST-1456 | 2000/Ford/Crown Victoria/4.6 L V8 (W) | Pcode: P0171, P0174 Component: MAF sensor Work Requested: failed state emissions certification | RO ID 3915 |

The vehicle-ID search terms 232 is one example of search terms that can be included within search terms 230. Vehicle- ID search terms 232 can include various selectable attributes. For example, the attributes of vehicle-ID search terms 232 can include Y attributes. As another example, the attributes of vehicle-ID search terms 232 can include Year/Make/Model/Sub-model/Engine (Y/M/M/S/E) attributes as discussed with respect to Table 2. As another example, the attributes of vehicle-ID search terms 232 can include Year/Make/Model/Engine/System (Y/M/M/E/Sys) attributes. As another example, the attributes of vehicle-ID search terms 232 can include Year/Make/Model/Sub-model/Engine/System (Y/M/M/S/E/Sys) attributes.

The system (Sys) attribute vehicle-ID search terms 232 can indicate or represent a system (e.g., one or more systems) or a component (e.g., one or more components) within a vehicle. As an example, the system or component within the vehicle can identify (i) a powertrain transmission within the vehicle (e.g., a 4-speed automatic transmission with over-drive), (ii) a rear differential within the vehicle (e.g., a rear differential with a 4.11:1 gear ratio), (iii) an electric alternator within the vehicle (e.g., a 100 ampere alternator), (iv) a heater, ventilation, and air-conditioning (HVAC) system installed within the vehicle (e.g., a dual-zone (e.g., a driver side and passenger side) HVAC system), or some other system or component installed within, attached to, or other otherwise operating on or in the vehicle.

The order of any of the vehicle-ID search terms 232 described herein can be rearranged as desired. For example, the order of the Y/M/M/E attributes could be rearranged as Make/Model/Engine/Year (M/M/E/Y) attributes or in another arrangement.

FIG. 5 shows an example content of a presentable RO 500 including an RO identifier 502, RO timing information 504, RO vehicle identifier 506, a vehicle service request 508, an auto-generated repair-hint 510, meta-data 512, and a usage indicator 514. Presentable RO 500 is based on service procedure information 418 an original RO 400. RO identifier 502 is "3915," which is also shown in the seventeenth row of Table 2. RO timing information 504 includes a year designator (i.e., 2009) to indicate a time that pertains to RO ID 3915. That time can indicate, for example, when original RO 400 was written, completed, or submitted to VRD system 102. RO timing information could include other or different time information such as a day, month, or hour-of-a-day. RO vehicle identifier 506 includes the year/make/model/engine attributes shown in the seventeenth row of Table 2 for RO ID 3915. Additional or other attributes of the given vehicle identified on original RO 400 can be included on presentable RO 500.

Presentable RO 500 includes elements in or based on original RO 400. Presentable RO 500 can be stored within data storage device 210 with or as part of original RO 400. Additionally or alternatively, presentable RO 500 can be stored separately and distinctly from original RO 400.

Vehicle service request 508 includes information pertaining to a vehicle service request on an RO within RO 214. Vehicle service request 508 can include one or more text strings from text strings 228. As an example, each sentence within vehicle service request 508 can be a separate text string. For example, a text string can include the text "Customer states the vehicle has [insert customer complaint]." The text within the square brackets (i.e., [ ]) identifies meta-data or a taxonomy term to be inserted to complete the text string. The portion of a text string within the square brackets can be referred to as a "text string gap" or more simply, "a gap." Processor 204 can select the meta-data or the taxonomy term based on information included on an original RO pertaining to RO ID 3915 received at VRD system 102. The text string "Please diagnose and advise" is an example of a text string without any gaps in which text is to be inserted to complete the text string. The term "MAF sensor" in the text string "Customer states please replace the MAF sensor" can be selected by processor to insert into the text string from meta-data 512.

Auto-generated repair-hint 510 can include one or more text strings from text strings 228. As an example, each sentence within auto-generated repair-hint 510 can be a separate text string. For example, a text string can include the text "Technician scan tested and verified the DTC [insert first Pcode] and DTC [insert second Pcode]." Processor 204 can select the DTC (e.g., Pcode) identifiers "P0171" and "P0174" from meta-data 512 to complete the text string by inserting those DTC (e.g., Pcode) identifiers into the text string gaps. Processor 204 can select the meta-data based on information, such as a LOC, included on an original RO pertaining to RO ID 3915 received at VRD system 102.

As another example, a text string can include multiple sentences within auto-generated repair-hint 510, such as all of the sentences, but the first sentence, within auto-generated repair-hint 510. Processor 204 can select fuel pump pressure readings (e.g., 30 and 40) to insert within the second sentence of that text string, and to select a component name (e.g., MAF sensor) from meta-data 512 or taxonomy term database 216 to insert in the $4^{th}$ through $9^{th}$ sentences of the multiple-sentence text string. Those inserted terms are underlined within FIG. 5.

Meta-data 512 can be stored with presentable RO 500 within RO 214. Additionally or alternatively, meta-data 512 can be stored within meta-data 222 along with a tag or reference to presentable RO 500.

Usage indicator 514 indicates a distance in miles associated with RO 500. Usage indicator 514 can be used by processor 204 to determine whether to select auto-generated repair-hint 510 when searching for a repair-hint based on a set of search terms.

Figure 3:
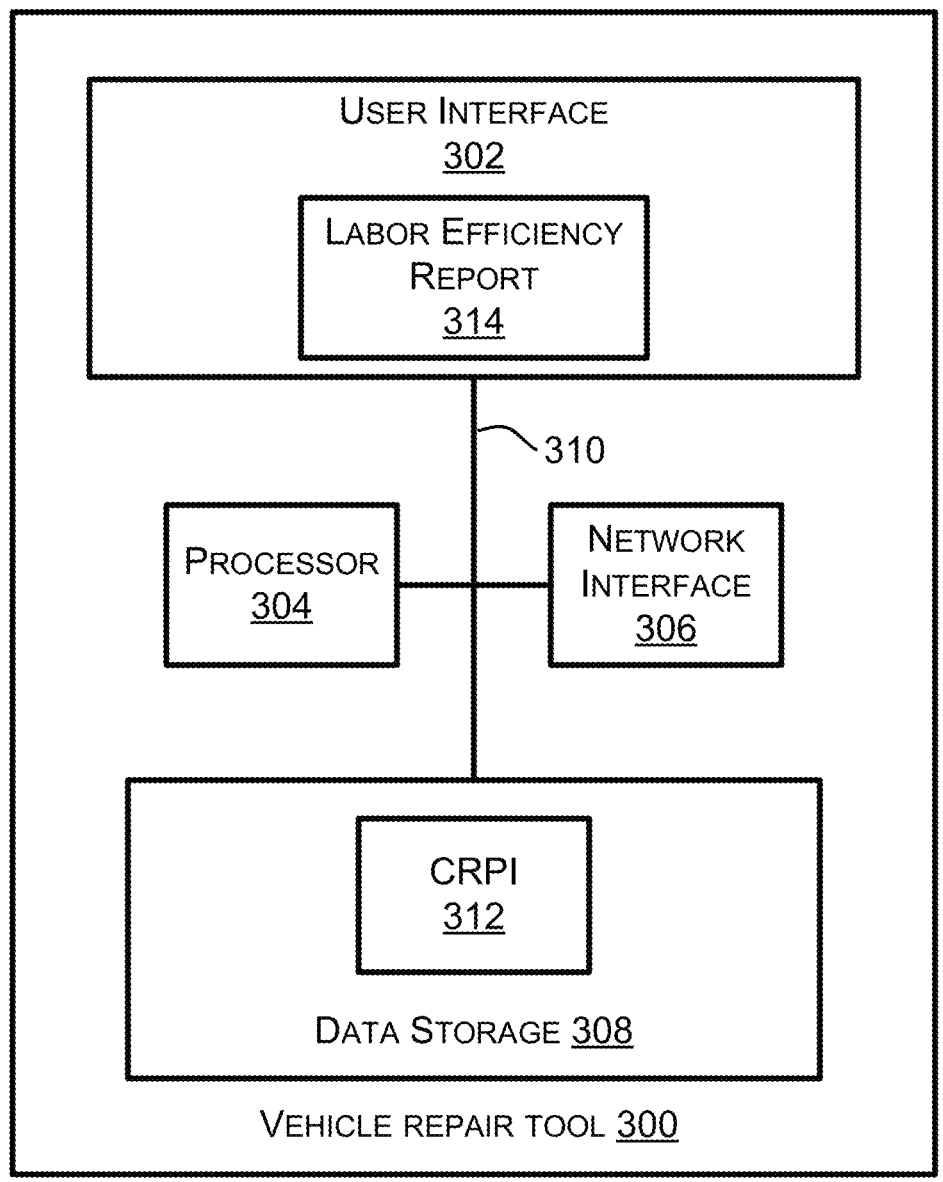
FIG. 3 is a block diagram showing a vehicle repair tool in accordance with one or more example embodiments.

Next, FIG. 3 is a block diagram showing details of example a vehicle repair tool (VRT) 300. VRT 300 can include or be arranged as a machine. VRT 300 includes a user interface 302, a processor 304, a network interface 306, and a data storage device 308, all of which can be linked together via a system bus, network, or other connection mechanism 310. One or more of the VRT shown in FIG. 1 can be arranged like VRT 300. VRT 300 can be used within system 100 like any of the VRT shown in FIG. 1.

Processor 304 can be configured to execute computer-readable program instructions, such as computer-readable program instructions (CRPI) 312 stored within data storage device 308. For purposes of this description, processor 304 executing CRPI 312 to perform some function described herein can include executing a portion of CRPI 312 or the entirety of CRPI 312. Executing a portion or the entirety of CRPI 312 can include executing some of the computer-readable program instructions multiple times.

Data storage device 308 can include a non-transitory computer-readable storage medium (i.e., two or more computer-readable storage mediums) readable by processor 304. The or each non-transitory computer-readable storage medium can include volatile or non-volatile storage components, such as optical, magnetic, organic or other memory or disc storage, which can be integrated in whole or in part with a processor 304.

User interface 302 can include an interface to components that are configured to enter data or information into VRT 300 or to components that are configured to present data or information output by VRT 300. Any of those components can be referred to as a VRT user interface component. User interface 302 can include one or more audio/visual ports or communication ports that connect to a VRT user interface component by a wired or wireless user interface communication link. Data or information entered into VRT 300 by user interface 302 can include data or information for preparing an RO, such as original RO 400.

User interface 302 can include one or more of the VRT user interface components. As an example, the VRT user interface components can include an infrared remote control device, a display device, a loud speaker configured to convert electrical signals to audible sounds, a keyboard, a touch screen, a pointing device, such as a computer mouse, or some other component for generating signals to enter data or information into VRT 300 or to present data or information output by user interface 302. User interface 302 can include a transmitter or transceiver to provide the data or information to another VRT user interface component.

Network interface 306 can include an interface to one or more communication networks, such as network 104. For use with wireless communication networks, network interface 306 can include one or more antennas for transmitting or receiving wireless communications. Network interface 306 can include one or more communication ports configured to connect to a wired communication link of a network. Examples of the wired communication link are listed elsewhere herein. Network interface 306 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 306 to the network can include an RO.

CRPI 312 can include program instructions for generating an RO, such as original RO 400, based on data input by user interface 302 or a user interface component thereof. CRPI 312 can include program instructions for performing diagnostic functions for diagnosing a vehicle identified on an RO. As an example, performing the diagnostic functions can include checking a diagnostic trouble code (DTC), such as a DTC 117, as identified in section 428 of original RO 400. CRPI 312 can include program instructions for (i) displaying, by user interface 302, vehicle-ID attributes selectable to form a set of search terms, symptom criterion selectable to form part of the set of search terms, and a field for entering a usage indicator. (ii) receiving a selection of the set of search terms, (iii) providing the selected set of search terms to network interface 306 for transmission of the selected search terms to VRD system 102, (iv) receiving, by network interface 306, a repair hint, such as an auto-generated repair-hint, from VRD system 102, and (v) displaying the received repair hint using user interface 302.

A VRT, such as VRT 300 or any of the VRT shown in FIG. 1, can include, or be configured as, a smartphone, a tablet device, a laptop computer, a desktop computer, or an embedded computing device, such as the VERDICT™ Diagnostic and Information System and the VERSUS® PRO Integrated Diagnostic and Information System, both of which are available from Snap-on Incorporated, Kenosha, Wis. Accordingly, a VRT can also include computer-readable program instructions to perform features such as, but not limited to, guided component tests, an online expert forum, electrical measurements, waveform capture, displaying vehicle records, etc.

III. Evaluating Performance of a Vehicle Repair Shop (Vrs)

A. Example Operations for Determining Efficiency of a VRS

FIG. 6 is a flowchart illustrating a method 600, according to an example implementation. Method 600 shown in FIG. 6 (and other processes and methods disclosed herein) presents a method that can be implemented within an arrangement including, for example, system 100, VRD system 200, and/or VRT 300 (or more particularly by one or more components or subsystems thereof, such as by a processor and a (e.g., non-transitory or transitory) computer-readable medium having instructions that are executable to cause the device to perform functions described herein). Additionally or alternatively, method 600 may be implemented within any other arrangements and systems.

Method 600 and other processes and methods disclosed herein may include one or more operations, functions, or actions as illustrated by one or more of blocks 602-610. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves receiving, by at least one processor (e.g., processor 204 and/or processor 304), input data indicative of: an operating duration of a particular vehicle repair shop (VRS), a count of vehicle repair technicians associated with the particular VRS, a working duration respectively of each vehicle repair technician associated with the particular VRS, and at least one labor rate associated with the particular VRS, where the at least one processor is configured to refer to a data storage device (e.g., data storage device 210 and/or data storage 308) containing a plurality of computer-readable vehicle repair orders (ROs) each specifying a respective extent of sales by the particular VRS.

In practice, a VRS may define at least one physical location at which one or more individuals, such as vehicle repair technicians for instance, work to repair one or more vehicles. In this regard, a particular VRS may thus refer to a single repair shop at a particular location and/or may refer multiple repair shops that are distributed at various locations and are of the same chain store (e.g., under the same ownership and/or the same central management), among other possibilities. Moreover, the particular VRS may employ one or more vehicle repair technicians that respectively carry out vehicle repair work over time for that particular VRS. As a result, the performance of the particular VRS may be based on the collective work carried out by these technicians and possibly on other factors as well.

In accordance with the present disclosure, a vehicle repair data system 200 and/or a vehicle repair tool 300 may be equipped to carry out operations that help evaluate performance of a particular VRS. In practice, the vehicle repair data system 200 and/or the vehicle repair tool 300 may be equipped in this manner via manual engineering input and/or via installable software, among other possibilities. Moreover, the vehicle repair data system 200 and/or the vehicle repair tool 300 could display a graphical user interface (GUI) or the like with which a user may interact so as to cause the vehicle repair data system 200 and/or the vehicle repair tool 300 to carry out the operations.

In one case, the vehicle repair tool 300 may display the GUI (e.g., via user interface 302) and may receive input data via that GUI. Based on that received input data, the processor 304 of the vehicle repair tool 300 may itself carry out at least a portion the various operations discussed herein. And following such operations, the vehicle repair tool 300 may output results of the operations, such as by displaying a report via the GUI for instance. Additionally or alternatively, the processor 304 may engage in communication with the vehicle repair data system 200 so as to cause the vehicle repair data system 200 to carry out at least a portion the various operations discussed herein and/or so as to receive information from the vehicle repair data system 200, among other options. In doing so, the processor 304 could send to the vehicle repair data system 200 at least a portion of the received input data. As such, following operations carried out by one or both of the vehicle repair data system 200 and the vehicle repair tool 300, the vehicle repair tool 300 may output results of the operations.

In another case, the vehicle repair data system 200 may display the GUI (e.g., via user interface 206) and may receive input data via that GUI. Based on that received input data, the processor 204 of the vehicle repair data system 200 may itself carry out at least a portion the various operations discussed herein. And following such operations, the vehicle repair data system 200 may output results of the operations, such as by displaying a report via the GUI for instance. Additionally or alternatively, the processor 204 may engage in communication with the vehicle repair tool 300 so as to cause the vehicle repair tool 300 to carry out at least a portion the various operations discussed herein and/or so as to receive information from the vehicle repair tool 300, among other options. In doing so, the processor 204 could send to the vehicle repair tool 300 at least a portion of the received input data. As such, following operations carried out by one or both of the vehicle repair data system 200 and the vehicle repair tool 300, the vehicle repair data system 200 may output results of the operations. Other cases are also possible.

In either case, the received input data may take on various forms and may be indicative of various types of information. For instance, as noted, input data may be indicative of an operating duration of a particular VRS, of a count of vehicle repair technicians associated with (e.g., employed by) the particular VRS, of a working duration respectively of each vehicle repair technician associated with the particular VRS, and/or of at least one labor rate associated with the particular VRS. Moreover, the input data may be received at any time (e.g., simultaneously or over time).

More specifically, receiving input data indicative of an operating duration of the particular VRS may involve receiving one or more of various types of operational details.

In one example, these details may include a number of operational days per week, which may define a count of days per week that the particular VRS is open for providing vehicle repair services. In another example, these details may include a number of non-operational days per week, which may define a count of days per week that the particular VRS is not open for providing vehicle repair services (e.g., count of weekend days). In yet another example, these details may include a number of operational days per year, which may define a count of days per year that the particular VRS is open for providing vehicle repair services. In yet another example, these details may include a number of non-operational days per year, which may define a count of days per year that the particular VRS is not open for providing vehicle repair services (e.g., count of weekend days plus holidays). In yet another example, these details may include a number of operational hours per day, which may define a count of hours per day that the particular VRS is open for providing vehicle repair services. In yet another example, these details may include a number of non-operational hours per day, which may define a count of hours per day that the particular VRS is not open for providing vehicle repair services. In yet another example, these details may include a number of operational hours per week, which may define a count of hours per week that the particular VRS is open for providing vehicle repair services. In yet another example, these details may include a number of non-operational hours per week, which may define a count of hours per week that the particular VRS is not open for providing vehicle repair services. In yet another example, these details may include a number of operational hours per year, which may define a count of hours per year that the particular VRS is open for providing vehicle repair services. In yet another example, these details may include a number of non-operational hours per year, which may define a count of hours per year that the particular VRS is not open for providing vehicle repair services. In yet another example, these details may include particular operational days of the week, which may define specific days of the week that the particular VRS is open for providing vehicle repair services. In yet another example, these details may include particular operational hours respectively during one or more days of the week, which may define specific hours respectively for each of one or more week days during which the particular VRS is open for providing vehicle repair services. In yet another example, these details may include particular non-operational days of the year, which may define specific days of the year (e.g., holidays dates) during which the particular VRS is not open for providing vehicle repair services. Various other examples are also possible.

Given such operational details, the at least one processor may use one or more such operational details to determine the operating duration of the particular VRS over a particular time period, which may define an extent of time that the particular VRS is open over that particular time for providing vehicle repair services. In particular, the at least one processor may determine the operating duration by deriving from operational details information that is relevant to the particular time period. Moreover, the at least one processor may specify the operating duration in any feasible manner, such as in the context of hours, days, or weeks, among other possibilities. Nonetheless, the at least one processor may be configured to cause a display device (e.g., via user interface 206 and/or via user interface 302) to display the determined operation duration and/or any one of the above-described operational details, such via the GUI. Moreover, one or more such operational details may be stored in a data storage device, as illustrated by the operational details 236 stored in data storage device 210 of FIG. 2 for instance.

Further, as noted, the at least one processor may receive input data indicative of a count of vehicle repair technicians associated with the particular VRS. In practice, that count may simply be provided via the GUI. Alternatively, the at least one processor may receive that count from another system, such as the particular VRS's employment management system, among other options. Nonetheless, the at least one processor may be configured to cause a display device to display the count, such via the GUI.

Yet further, as noted, the at least one processor may receive input data indicative of a working duration respectively of each vehicle repair technician associated with the particular VRS, which may involve receiving, respectively for each vehicle repair technician, one or more of various working details.

In one example, these details may include a number of working days per week, which may define a number of days per week (or for a particular week) that a repair technician is available to work. In another example, these details may include a number of non-working days per week, which may define a number of days per week (or for a particular week) that a repair technician is not available to work. In yet another example, these details may include a number of working days per year, which may define a number of days per year (or for a particular year) that a repair technician is available to work. In yet another example, these details may include a number of non-working days per year, which may define a number of days per year (or for a particular year) that a repair technician is not available to work. In yet another example, these details may include a number of working hours per day, which may define a number of hours per day (or for a particular day) that a repair technician is available to work. In yet another example, these details may include a number of non-working hours per day, which may define a number of hours per day (or for a particular day) that a repair technician is not available to work. In yet another example, these details may include a number of working hours per week, which may define a number of hours per week (or for a particular week) that a repair technician is available to work. In yet another example, these details may include a number of non-working hours per week, which may define a number of hours per week (or for a particular week) that a repair technician is not available to work. In yet another example, these details may include a number of working hours per year, which may define a number of hours per year (or for a particular year) that a repair technician is available to work. In yet another example, these details may include a number of non-working hours per year, which may define a number of hours per year (or for a particular year) that a repair technician is not available to work. In yet another example, these details may include particular working days of the week, which may define specific days of the week that a repair technician is available to work. In yet another example, these details may include particular working hours respectively during one or more days of the week, which may define specific hours respectively for one or more days of the week that a repair technician is available to work. In yet another example, these details may include particular non-working days of the year, which may define specific days of the year that a repair technician is not available to work (e.g., vacation days). Other examples are also possible.

Given such working details, the at least one processor may use one or more such working details to determine the working duration of at least one vehicle repair technician over a particular time period, which may define an extent of time that at least one vehicle repair technician is available to work over that particular time period. In particular, the at least one processor may determine the working duration by deriving from working details information that is relevant to the particular time period. Moreover, the at least one processor may specify the working duration in any feasible manner, such as in the context of hours, days, or weeks, among other possibilities. Nonetheless, the at least one processor may be configured to cause a display device to display the determined working duration and/or any one of the above-described working details, such via the GUI. Moreover, one or more such working details may be stored in a data storage device, as illustrated by the working details 238 stored in data storage device 210 of FIG. 2 for instance.

Yet further, as noted, the at least one processor may receive input data indicative of at least one labor rate associated with the particular VRS. In practice, a labor rate may define a rate charged to customer(s) for services performed by a vehicle repair technician. For example, a labor rate may take the form of cost (e.g., $85.00) per time range (one hour of work). Moreover, each vehicle repair technician of the particular VRS may have the same associated labor rate. Alternatively, at least one vehicle repair technician of the particular VRS may have an associated labor rate that is different from a labor rate associated with at least one other vehicle repair technician of the particular VRS. Nonetheless, the at least one processor may be configured to cause a display device to display the at least one labor rate, such via the GUI. As further discussed below, other forms of input data are also possible. Moreover, one or more such labor rates may be stored in a data storage device, as illustrated by the labor rate(s) 240 stored in data storage device 210 of FIG. 2 for instance.

FIG. 7 illustrates an input screen 700 through which a user may provide various forms of input data to the at least one processor. In particular, at section 702 a user may specify the specific number of operating hours for the particular VRS and do so for each day of the week. As shown, the particular VRS operates on Monday through Friday for nine hours each day and then on Saturday for four hours. Thus, based on the input data provided at section 702, the at least one processor may determine that the particular VRS operates for an operating duration of forty nine hours per week, among other relevant information.

Additionally, at section 704 a user may specify the specific days of the year (i.e., holidays) during which the particular VRS does not operate. As shown, the particular VRS does not operate on several holidays yet does operate on several other holidays (e.g., "X" in FIG. 7 represents that the VRS is closed). Thus, based on the input data provided at sections 702 and 704, the at least one processor may determine the number of days and/or hours per year that the particular VRS operates (i.e., yearly operating duration), among other relevant information.

Further, at section 706 a user may specify a count of vehicle repair technicians employed by the particular VRS. As shown, the particular VRS employs three vehicle repair technicians. In this regard, at sections 708A-708C a user may then specify additional information respectively for each technician. In particular, the user may specify working details for a technician, such as the specific number of hours that a technician is available to work in a given day (and do so for each day of the week) and/or a number of planned hours per year that the technician does is not available to work (e.g., vacation hours).

For example, section 708A shows that a first technician is available to work on Monday through Friday for eight hours each day and then also available to work on Saturday for four hours. Moreover, section 708A shows that the first technician plans to take forty four hours of vacation for the year. Thus, based on the information in section 708A, the at least one processor may determine a working duration for the first technician, such as the total number of available work hours per week or the total number of available work hours for the year, among others. Similar examples may also apply in the context of section 708B and 708C.

Yet further, at section 710 a user may specify a labor rate. As shown, the labor rate for the particular VRS is eighty five dollars ($85) per hour. Thus, the labor rate for each vehicle repair technician of the particular VRS may also be eighty five dollars ($85) per hour. However, in some cases, the input screen 700 may also provide the option of specifying a labor rate respectively for each vehicle repair technician. Other illustrations are possible as well.

In a further aspect, as noted above, the at least one processor may be configured to refer to a data storage device containing a plurality of ROs each specifying a respective extent of sales by the particular VRS. More specifically, as an initial matter, the at least one processor may be configured to determine the particular VRS associated with a given RO. In practice, the at least one processor may do so by referring to meta-data associated with an RO and/or by referring to information (e.g., text) specified within an RO, among other options. As an example, original RO 400 specifies a service provider identifier 402 including information that indicates a name and geographic location of the service provider.

Furthermore, the at least one processor may also be configured to determine respective extent of sales associated with a given RO. As with the particular VRS, the at least one processor may do so by referring to meta-data associated with an RO and/or by referring to information (e.g., text) specified within an RO, among other options. Moreover, the extent of sales may be the total labor costs charged to a customer, may be labor costs charged to a customer for a particular service procedure, may be total costs charged to a customer for vehicle parts replacement, may be a cost charged to a customer for replacement of a particular vehicle part and/or may be the total charges to a customer. As an example, the extent of sales may be the total labor costs (e.g., $335) specified in the original RO 400. Other aspects are possible as well.

At block 604, method 600 involves, based on the input data, determining, by the at least one processor, a potential total extent of sales by the particular VRS over a particular time period.

In accordance with an example implementation, the at least one processor may be configured to evaluate performance of the particular VRS over a particular time period. In practice, the particular time period may be defined as a range of time from a starting time to an ending time and thus may take various forms. As an example, the particular time period may be a one month period from a first day of a certain month to the last day of that certain month. And as another example, the particular time period may be a one year period from a first day of a certain year to the last day of that certain year.

Moreover, the at least one processor may determine the particular time period in various ways. In one case, the at least one processor may receive input data specifying the particular time period. For instance, the at least one processor may receive input data specifying the starting time of the particular time period, such as by specifying a particular start date and/or start time for example, and also specifying the ending time of the particular time period, such as by specifying a particular end date and/or end time for example. In another case, the at least one processor may receive input data specifying a periodic duration based on which the particular time period is determined. As an example, a user may provide input data requesting a report to be provided every three month starting on the date of the request. Thus, in this example, a first particular time period may be a first three month period starting on the date of the request and a second particular time period may be a three month period starting on the date following the end of the first three month period, and so on. Other examples are also possible.

In accordance with the present disclosure, the potential total extent of sales by the particular VRS over the particular time period may be programmatically determined by the at least one processor in accordance with one or more specific operations. As an initial matter, the at least one processor may determine, respectively for each technician of the particular VRS, a particular working duration over the particular time period defining the extent of time that the respective technician is available to work over that particular time period. In particular, the at least one processor may do so based on the input data indicative of the operating duration of the particular VRS and on the input data indicative of the respective working durations of the various vehicle repair technicians associated with the particular VRS. Then, based on the determined particular working durations and on the at least one labor rate of the particular VRS, the at least one processor may determine the potential extent of sales over the particular time period. In this regard, if at least one technician has a different associated labor rate compared to other technician's labor rates, then the processor may apply the respective labor rate for each respective technician as part of the operation taken to determine the potential extent of sales.

By way of example and without limitation, the following sample formulas illustrate the above-described steps taken by the at least one processor to determine the potential total extent of sales over the particular time period. Although these sample formulas are applied in the context of three technicians and in the context of a yearly time period, the illustrated steps may apply in the context of any number of technicians and in the context of any feasible time period.

Technician 1 available days per year =

[(*VRS* open days per week) × (number of weeks per year)] −

[(*VRS* number of nonworking days per year) +

(Technician 1 vacation days per year)]

Technician 2 available days per year =

[(*VRS* open days per week) × (number of weeks per year)] −

[(*VRS* number of nonworking days per year) +

(Technician 2 vacation days per year)]

-continued

Technician 3 available days per year = [(*VRS* open days per week) ×

(number of weeks per year)] −

[(*VRS* number of nonworking days per year) +

(Technician 3 vacation days per year)]

Potential total extent of sales per year = [(Technician 1

Hourly Labor Rate) ×

(Technician 1 available days per year) ×

(Technician 1 available hours per day)] +

[(Technician 2 Hourly Labor Rate) ×

(Technician 2 available days per year) ×

(Technician 2 available hours per day)] +

[(Technician 3 Hourly Labor Rate) ×

(Technician 3 available days per year) ×

(Technician 3 available hours per days)]

At block 606, method 600 involves, based on the plurality of ROs, determining, by the at least one processor, an actual total extent of sales by the particular VRS over the particular time period.

In accordance with an example implementation, each RO that is stored in the data storage device may specify a respective repair time. In one case, such a repair time may be a date/time of service identifier specifying a date/time on which a repair service was complete (e.g., date of service identifier 404). In another case, the repair time may be meta-data such as RO timing information (e.g., RO timing information 504), which may include a designator to indicate a time that pertains to a particular RO ID. As noted, that time can indicate, for example, when an original RO was written, completed, or submitted to VRD system 102. RO timing information could include other or different time information such as a day, month, or hour-of-a-day. In either case, the at least one processor may be configured to determine respective repair time associated with a given RO by referring to the meta-data associated with that given RO and/or by referring to information (e.g., text) provided in that given RO, among other options. Other cases are possible as well.

With this arrangement, the at least one processor may carry out one or more operations so as to determine the actual total extent of sales by the particular VRS over the particular time period. As an initial matter, the at least one processor may refer to the data storage device so as to identify one or more particular ROs that specify a respective repair time that falls within the above-mentioned particular time period. Then, for each such identified particular RO, the at least one processor may use the above-described techniques to determine a respective extent of sales specified in the particular RO. Finally, once these various respective extents of sales have been determined for the various particular ROs, at least one processor may use these various respective extents of sales as basis for determining the actual total extent of sales by the particular VRS over the particular time period. In practice, the actual total extent of sales may simply be a sum of the various respective extents of sales. However, other operations are possible as well.

By way of example and without limitation, the following sample formula illustrates the above-described step taken by the at least one processor to determine the actual total extent of sales over a particular time period.

Actual total extent of sales over a particular time period =

(sales of particular time period *RO*1) +

(sales of particular time period *RO*2) +

(sales of particular time period *RO*3) + …

By way of example, assuming that the particular time period is a particular two-day time period, the at least one processor may identify five particular ROs over that two-day time period. Then, for each identified particular RO, the at least one processor may determine a respective extent of sales specified in that particular RO. For instance, the at least one processor may determine that the first particular RO specifies an amount of four hundred dollars ($400), that the second particular RO specifies an amount of four hundred and fifty dollars ($450), that the third particular RO specifies an amount of two hundred dollars ($200), that the fourth particular RO specifies an amount of two hundred and fifty dollars ($250), and that the fifth particular RO specifies an amount of six hundred dollars ($600). Thus, based on these respective extents of sales, the at least one processor may determine that actual total extent of sales over the two-day time period to be an amount of one thousand and nine hundred dollars ($1900). Other examples are possible as well.

At block 608, method 600 involves, based on the potential total extent of sales and on the actual total extent of sales, determining, by the at least one processor, a sales efficiency of the particular VRS over the particular time period.

In accordance with the present disclosure, once the at least one processor determines the potential total extent of sales over the particular time period as well as the actual total extent of sales over the particular time period, the at least one processor may use such determinations as basis for determining a sales efficiency of the particular VRS over the particular time period. In practice, the sales efficiency may be any measure comparing the potential total extent of sales to the actual total extent of sales, thereby indicating true performance of the particular VRS relative to the possible performance of the particular VRS. As such, the sales efficiency may be determined in various ways.

In one case, the at least one processor may determine that the actual total extent of sales over the particular time period is a particular percentage of the potential total extent of sales over the particular time period. In this case, the at least one processor may thus set that particular percentage as the sales efficiency of the particular VRS over the particular time period.

In another case, the at least one processor may determine a particular ratio of (i) the actual total extent of sales over the particular time period to (ii) the potential total extent of sales over the particular time period. In this case, the at least one processor may thus set that particular ratio as the sales efficiency of the particular VRS over the particular time period.

In yet another case, the at least one processor may determine a particular difference between (i) the actual total extent of sales over the particular time period and (ii) the potential total extent of sales over the particular time period. In this case, the at least one processor may thus set that particular difference as the sales efficiency of the particular VRS over the particular time period. Various other cases are possible as well.

By way of example and without limitation, the following sample formula illustrates the above-described step taken by the at least one processor to determine the sales efficiency over the particular time period in the context of determining a particular percentage.

$$\text{Sales efficiency over a particular time period} = \left( \frac{\text{actual total extent of sales over the particular time period}}{\text{potential total extent of sales over the particular time period}} \right) \times 100$$

At block 610, method 600 involves, directing, by the at least one processor, a display device to display at least one visual indication representative of one or more of: the determined sales efficiency, the potential total extent of sales, and the actual total extent of sales.

In accordance with the present disclosure, the at least one processor may be configured to cause a display device to display one or more visual indications for one or more of the determined metrics discussed above. In particular, doing so may involve generating a report including these visual indications. As such, that report may provide valuable information based on which a repair shop can evaluate the repair shop's performance and/or make further business decisions, among other possibilities.

To illustrate, refer again to FIG. 1 showing that the VRD system 102 may output a labor efficiency report 124. In particular, this report 124 could be displayed as part of a GUI on a display of the VRD system. In another case, the VRD system 102 could transmit the report 124 to one or more of the VRTs 106-120 (and/or to other devices) such that a VRT could display this report 124. For instance, VRT 300 of FIG. 300 is shown to display a labor efficiency report 314 (e.g., could be the same as report 124) as part of the user interface 302. In yet another case, the VRD system 102 may store the report 124 in data storage 210 and/or cloud-based data storage so as to make the report 124 accessible for human review via a device (e.g., a VRT). Other cases are also possible.

Moreover, the displayed visual indication could take on one of various forms. In one example, the visual indication may simply take the form of number(s), letter(s), and/or character(s) representative of a determined metric, such as of a determined sales efficiency for instance. In another example, the visual indication may take the form of a chart providing a graphical representation of data (e.g., the determined sales efficiency) in which the data is represented by symbols. In yet another example, the visual indication may take the form of an infographic proving a visual representation of information, such as of the determined sales efficiency. Other examples and combinations of the above examples are possible as well.

Furthermore, as noted, the one or more visual indications may be for one or more of the determined metrics discussed above. In particular, the report may provide a visual indication representative of the determined sales efficiency of the particular VRS over the particular time period. Also, the report may additionally or alternatively provide a visual indication of the determined potential total extent of sales by the particular VRS over the particular time period. Further, the report may additionally or alternatively provide a visual indication of the determined actual total extent of sales by the particular VRS over the particular time period. As further discussed below, other visual indications are possible as well.

FIG. 8 next illustrates example visual indications that may be provided in a report, in accordance with the present disclosure. As shown, the visual indication 802 illustrates a graph representative of a range of values that each represents some extent of sales. Additionally, that range is shown to start at a low value (i.e., $180,000) and end at a high value (i.e., $656,000). Within that range, the visual indication 802 then illustrates a determined actual total extent of sales by a repair shop over a one year time period, which is shown to be a value of $311,298.

In contrast, the visual indication 804 illustrates a graph representative of a corresponding range of values that each represents some efficiency value (%). Additionally, that range is shown to start at a low value (i.e., 33%) and end at a high value (i.e., 120%). Within that range, the visual indication 804 then illustrates a determined sales efficiency of a repair shop over a one year time period, which is shown to be a value of 57%. Other illustrations are also possible.

B. Establishing Target Performance of a VRS

In a further aspect, the disclosed system may allow a user to set certain business goals and to then evaluate performance of a repair shop compared to those set goals. In this regard, the at least one processor may be configured to receive further input data (e.g., provided by a user) specifying one or more target values, such as a target sales efficiency and/or a target extent of sales, among other possibilities. Moreover, any of the above-described techniques for receiving input data may also apply in the context of receiving this further input data indicative of one or more target values.

More specifically, the at least one processor may receive information specifying a target sales efficiency of the particular VRS. In some cases, the received information may also specify a time period over which the target sales efficiency applies, which may be the above-discussed particular time period for instance. Also, as with other metrics discussed herein, the at least one processor may be configured to direct a display device to display a visual indication representative of the target sales efficiency, which may be included as part of a report for example. In practice, that visual indication could take on any feasible form, such any one of those described above.

Further, in some implementations, the at least one processor may make a comparison between the determined sales efficiency over the particular time period and the target sales efficiency over that same particular time period. And once such a comparison is made, the at least one processor may direct a display device to display a visual indication representative of the comparison. In practice, that visual indication could take on any feasible form, such any one of those described above. Nonetheless, the comparison may take one of various forms.

In one case, the at least one processor may simply direct the display device to display a visual indication of the determined sales efficiency over the particular time period alongside a visual indication of the target sales efficiency over the particular time period.

In another case, the at least one processor may determine that the determined sales efficiency over the particular time period is a particular percentage of the target sales efficiency over the particular time period. In this case, the at least one processor may thus direct the display device to display a visual indication of that particular percentage.

In yet another case, the at least one processor may determine a particular ratio of (i) the determined sales efficiency over the particular time period to (ii) the target sales efficiency over the particular time period. In this case, the at least one processor may thus direct the display device to display a visual indication of that particular ratio.

In yet another case, the at least one processor may determine a particular difference between (i) the determined sales efficiency over the particular time period and (ii) the target sales efficiency over the particular time period. In this case, the at least one processor may thus direct the display device to display a visual indication of that particular difference. Various other cases are possible as well.

Yet further, the at least one processor may use the received information as basis for determining a target extent of sales by the particular VRS over the particular time period. In particular, the at least one processor may determine the target extent of sales by the particular VRS over the particular time period based on (i) the potential total extent of sales by the particular VRS over the particular time period and on (ii) the target sales efficiency of the particular VRS over the particular time period. In practice, the target extent of sales may be a product of the potential total extent of sales and the target sales efficiency. However, other operations are also possible. Moreover, once such a target extent of sales is determined, the at least one processor may direct a display device to display a visual indication representative of the target extent of sales. In practice, that visual indication could take on any feasible form, such any one of those described above.

By way of example and without limitation, the following sample formula illustrates the above-described step taken by the at least one processor to determine the target extent of sales.

Target extent of sales over a particular time period=
(potential total extent of sales over the particular time period)×(target sales efficiency over the particular time period)

Yet further, in some implementations, the at least one processor may make a comparison between the determined target extent of sales over the particular time period and the actual total extent of sales over that same particular time period. And once such a comparison is made, the at least one processor may direct a display device to display a visual indication representative of the comparison. In practice, that visual indication could take on any feasible form, such any one of those described above. Nonetheless, the comparison may take one of various forms.

In one case, the at least one processor may simply direct the display device to display a visual indication of the determined target extent of sales over the particular time period alongside a visual indication of the actual total extent of sales over the particular time period.

In another case, the at least one processor may determine that the actual total extent of sales over the particular time period is a particular percentage of the determined target extent of sales over the particular time period. In this case, the at least one processor may thus direct the display device to display a visual indication of that particular percentage.

In yet another case, the at least one processor may determine a particular ratio of (i) the actual total extent of sales over the particular time period to (ii) the determined target extent of sales over the particular time period. In this case, the at least one processor may thus direct the display device to display a visual indication of that particular ratio.

In yet another case, the at least one processor may determine a particular difference between (i) the determined target extent of sales over the particular time period and (ii) the actual total extent of sales over the particular time period. In this case, the at least one processor may thus direct the display device to display a visual indication of that particular difference. Various other cases are possible as well.

Although the above techniques describe determination of the target extent of sales based on the received target sales efficiency, other techniques are also possible for determining the target extent of sales. For instance, the at least one processor may simply receive information (e.g., input data provided by a user) specifying the target extent of sales. Then, after receiving such information, the at least one processor may carry out any one of the operations described above, such as comparison of the target extent of sales to the actual total extent of sales, among others.

Referring again to FIG. 8, the example visual indications 802 and 804 each illustrate target performance for a repair shop. In particular, the visual indication 802 illustrates a business goal for the repair shop, which is shown to be a target extent of sales of $382,466. Also, the visual indication 802 illustrates a comparison between the target extent of sales and the actual total extent of sales, with that comparison simply being a display of those values within the above-mentioned range of values. Specifically, the visual indication 802 shows that the actual total extent of sales of $311,298 is below the target extent of sales of $382,466.

In contrast, the visual indication 804 illustrates a business goal for the repair shop, which is shown to be a target sales efficiency of 70%. Also, the visual indication 804 illustrates a comparison between the target sales efficiency and the determined sales efficiency, with that comparison simply being a display of those values within the above-mentioned range of values. Specifically, the visual indication 804 shows that the determined sales efficiency of 57% is below the target sales efficiency of 70%. Other illustrations are also possible.

C. Evaluating Performance of a VRS by Repair Category

In yet a further aspect, the disclosed system may include features that allow a user to evaluate how a repair shop is performing in each of one or more repair categories. In particular, the at least one processor may receive input data specifying a particular repair category and may determine performance of the particular VRS over the particular time period in that particular repair category. Generally, that performance may be defined in the context of an actual total extent of sales in the particular category over the particular time period and/or may be defined in the context of a sales efficiency in the particular category over the particular time period, among other possibilities.

In either case, various repair categories are possible without departing from the scope of the present disclosure. In particular, a repair category may be any one of the following: a particular LOC, a particular vehicle part, a particular DTC, a particular symptom, a particular vehicle attribute (e.g., year/make/model/engine (Y/M/M/E) attribute), a particular set of vehicle models built on a common vehicle platform, a particular set of vehicle models that use a common part produced by one or more part(s) manufacturer, particular text within an RO, or particular meta-data associated with an RO. Other repair categories are possible as well.

Moreover, the at least one processor may use various techniques to identify particular ROs that each specify a particular repair category. In one approach, the at least one processor may determine at least one RO cluster that is associated with the particular repair category. As a result, the at least one processor may determine that ROs within that cluster each specify the particular repair category. In another approach, the at least one processor may evaluate information found within an RO so to determine whether the information includes the particular repair category (e.g., text representative of the particular repair category) and/or whether the information specifies one or more terms that are related to the particular repair category (e.g., by referring to the taxonomy term database 216). If the at least one processor determines that the information includes the particular repair category and/or at least one related term, then the at least one processor may responsively determine that the RO at issue specifies the particular repair category. In practice, the at least one processor may thus apply this approach for each various ROs. Other approaches are also possible.

Once the at least one processor determines one or more particular ROs that each specify a particular repair category, the at least one processor may then have information based on which the at least one processor may determine performance of the particular VRS in that particular repair category over the particular time period. More specifically, as an initial matter, the at least one processor may use the above-described techniques to determine which of the identified ROs specify respective times that fall within the particular time period. Then, the at least one processor one processor may use the above-described techniques to determine, for each identified RO of that particular time period, a respective extent of sales specified in the identified RO. Specifically, this respective extent of sales may be the sales specified in the identified RO for that particular repair category or may alternatively in the total sales specified in the identified RO, among other possibilities.

Nonetheless, once the at least one processor determine the respective extents of sales, the at least one processor may use those respective extents of sales as basis for determining an actual total extent of sales in the particular repair category by the particular VRS over the particular time period. In practice, the actual total extent of sales in the particular repair category may be a sum of these respective extents of sales. However, other operations are also possible. Moreover, once the actual total extent of sales in the particular repair category is determined, the at least one processor may direct a display device to display a visual indication representative of the actual total extent of sales in the particular repair category. In practice, that visual indication could take on any feasible form, such any one of those described above.

D. Comparing Performance of a VRS to Performance of other VRSs

In yet a further aspect, the disclosed system may include features that allow a user to evaluate how a repair shop is performing relative to one or more other repair shops. In particular, the at least one processor may be configured to carry out the various operations described herein (e.g., method 600) for each of a plurality of different repair shops. Thus, the at least one processor may determine metrics related to performance of the particular VRS at issue as well as metrics related to performance of at least one different VRS. Generally, these metrics may be any one of those described above, such as a sales efficiency of the different VRS, an actual total extent of sales of the different VRS and/or a potential total extent of sales of the different VRS, among other possibilities.

Moreover, the at least one processor may compare performance of various combinations of VRSs. In one case, the at least one processor may compare performance of the particular VRS to performance of each of one or more different VRSs of the same chain store. In another case, the at least one processor may compare performance of the particular VRS to performance of each of one or more different VRSs of a different chain store. In yet another case, the at least one processor may compare performance of the particular VRS to performance of each of one or more different VRSs regardless of the chain store with which they are associated. In yet another case, the at least one processor may compare performance of one or more VRSs of a particular chain store to one or more different VRSs of a different chain store. Other cases are also possible.

In some cases, the at least one processor may receive further input data specifying one or more criteria for the comparison between VRSs. In one example, the criteria may be the above-mentioned particular time period. Specifically, the at least one processor may compare performance of the particular VRS over the particular time period to performance of at least one different VRS over that same particular time period. In another example, the criteria may be a particular repair category. In this example, the at least one processor may compare performance of the particular VRS in the particular repair category to performance of at least one different VRS in that same particular repair category. In yet other examples, criteria may include one or more of the following: VRSs using the same labor rate, VRSs having the same number of technicians, VRSs within the same location/area, and VRSs performing comparable types of service (e.g., tire shops, oil change shops, or transmission repair shops). Other examples and combinations of the examples are possible as well.

Furthermore, the at least one processor may carry out the comparison between the particular VRS and the at least one different VRS in various ways. And once the comparison is made, the at least one processor may direct a display device to display a visual indication representative of the comparison. In practice, that visual indication could take on any feasible form, such any one of those described above.

In one case, the at least one processor may simply direct the display device to display a visual indication of a metric associated with the different VRS, such as of a determined sales efficiency of the different VRS. In this manner, a user of the system may simply review performance of the different VRS.

In another case, the at least one processor may direct the display device to display a visual indication of a metric associated with the particular VRS alongside the same metric associated with the different VRS. For example, the visual indication may represent a sales efficiency of the particular VRS alongside a sales efficiency of the different VRS. And in another example, the visual indication may represent a sales efficiency of the particular VRS alongside an average sales efficiency of two or more different VRSs.

In yet another case, the at least one processor may determine that a metric associated with the particular VRS is a particular percentage of the determined target extent of the same metric associated with the different VRS. In this case, the at least one processor may thus direct the display device to display a visual indication of that particular percentage. For example, the at least one processor may determine that the actual total extent of sales by the particular VRS is a particular percentage of the actual total extent of sales by the different VRS, and the at least one processor may direct the display device to display a visual indication of that particular percentage so as to compare performance of the VRSs.

In yet another case, the at least one processor may determine a particular ratio of (i) a metric associated with the particular VRS to (ii) a metric associated with the different VRS. In this case, the at least one processor may thus direct the display device to display a visual indication of that particular ratio. For example, the at least one processor may determine a ratio of (i) the actual total extent of sales by the particular VRS to (ii) the actual total extent of sales by the different VRS, and the at least one processor may direct the display device to display a visual indication of that particular ratio so as to compare performance of the VRSs.

In yet another case, the at least one processor may determine a particular difference between (i) a metric associated with the particular VRS and (ii) a metric associated with the different VRS. In this case, the at least one processor may thus direct the display device to display a visual indication of that particular difference. For example, the at least one processor may determine a particular difference between (i) the actual total extent of sales by the particular VRS and (ii) the actual total extent of sales by the different VRS, and the at least one processor may direct the display device to display a visual indication of that particular difference so as to compare performance of the VRSs. Various other cases are possible as well.

Referring again to FIG. 8, the example visual indications 802 and 804 each illustrate a comparison between VRS. In particular, the visual indication 802 illustrates the average actual total extent of sales for various VRSs of the same size in a particular area. As shown, that average is illustrated as a range starting at $382,466 and ending at $448,000. Also, the visual indication 802 illustrates the actual total extent of sales by the repair shop (i.e., $311,298) and that this actual total extent of sales is below the above-discussed average sales range. Moreover, the visual indication 802 illustrates the target extent of sales by the repair shop (i.e., $382,466), which is shown to be at the lower end of the above-discussed average sales range.

In contrast, the visual indication 804 illustrates the average sales efficiency for various VRSs of the same size in a particular area. As shown, that average is illustrated as a range starting at an efficiency of 70% and ending at an efficiency of 82%. Also, the visual indication 804 illustrates the determined sales efficiency of the repair shop (i.e., 57%) and that this determined sales efficiency is below the above-discussed average efficiency range. Moreover, the visual indication 804 illustrates the target sales efficiency of the repair shop (i.e., 70%), which is shown to be at the lower end of the above-discussed average efficiency range. Other illustrations are also possible.

E. Comparing VRS Performance over Different Time Periods

In yet a further aspect, the disclosed system may include features that allow a user to evaluate how a repair shop is performing in one time period compared to another time period. In particular, the at least one processor may carry out the various operations of method 600 in the context of a first time period and may also carry out the various operations of method 600 in the context of a second time period. In practice, the first time period may be at least partially different from the second time period.

More specifically, the first time period may of the same duration as the second time period or may be of a different duration compared to duration of the second time period. For example, the first and second time period may each be a three-month time period. And in another example, the first time period may be a one-week time period and the second time period may be a two-week time period. Moreover, the first and second time periods may be non-overlapping, such as by being time periods in different years for example.

Alternatively, the first and second time period may at least partially overlap. For example, the first time period may be three-month time period from beginning of January to end of March. Whereas, the second time period may be a three-month time period from beginning of March to end of May. Yet further, the first time period may be a time period that falls within the second time period or vice versa. For example, the first time period may be a six-month time period within a particular year and the second time period may be a time period spanning that entire particular year. Other aspects and examples are possible as well.

In some cases, the at least one processor may receive further input data specifying one or more criteria for the comparison between time periods. In one example, the criteria may be comparison between VRSs. Specifically, the at least one processor may compare performance of the particular VRS over multiple time periods to performance of at least one different VRS over that same multiple time period. In another example, the criteria may be a particular repair category. In this example, the at least one processor may compare performance of the particular VRS in the particular repair category over a first time period to performance of the particular VRS in the particular repair category over a second time period. Other examples and combinations of the examples are possible as well.

Furthermore, the at least one processor may carry out the comparison between performance of the particular VRS over a first time period to performance of the particular VRS over a second time period. And once the comparison is made, the at least one processor may direct a display device to display a visual indication representative of the comparison. In practice, that visual indication could take on any feasible form, such any one of those described above.

In one case, the at least one processor may simply direct the display device to display a visual indication of a metric representative of performance of the particular VRS over the second time period, such as of a determined sales efficiency of the particular VRS over that second time period. In this manner, a user of the system may simply review performance of the particular VRS over that second time period, such as following a previous review of performance of the particular VRS over the first time period.

In another case, the at least one processor may direct the display device to display a visual indication of (i) a metric representative of performance of the particular VRS over the first time period alongside (ii) the same metric representative of performance of the particular VRS over the second time period. For example, the visual indication may represent a sales efficiency of the particular VRS over the first time period alongside a sales efficiency of the particular VRS over the second time period.

In yet another case, the at least one processor may determine that (i) a metric representative performance of the particular VRS over the first time period is a particular percentage of (ii) the same metric representative performance of the particular VRS over the second time period. In this case, the at least one processor may thus direct the display device to display a visual indication of that particular percentage. For example, the at least one processor may determine that (i) the actual total extent of sales by the particular VRS over the first time period is a particular percentage of (ii) the actual total extent of sales by the particular VRS over the second time period, and the at least one processor may direct the display device to display a visual indication of that particular percentage so as to compare the VRS's performance over the first and second time periods.

In yet another case, the at least one processor may determine a particular ratio of (i) a metric representative performance of the particular VRS over the first time period to (ii) the same metric representative performance of the particular VRS over the second time period. In this case, the at least one processor may thus direct the display device to display a visual indication of that particular ratio. For example, the at least one processor may determine a ratio of (i) the actual total extent of sales by the particular VRS over the first time period to (ii) the actual total extent of sales by the particular VRS over the second time period, and the at least one processor may direct the display device to display a visual indication of that particular ratio so as to compare the VRS's performance over the first and second time periods.

In yet another case, the at least one processor may determine a particular difference between (i) a metric representative performance of the particular VRS over the first time period and (ii) the same metric representative performance of the particular VRS over the second time period. In this case, the at least one processor may thus direct the display device to display a visual indication of that particular difference. For example, the at least one processor may determine a particular difference between (i) the actual total extent of sales by the particular VRS over the first time period and (ii) the actual total extent of sales by the particular VRS over the second time period, and the at least one processor may direct the display device to display a visual indication of that particular difference so as to compare the VRS's performance over the first and second time periods. Various other cases are possible as well.

IV. Evaluating Performance of a Vehicle Repair Technician

A. Example Operations for Determining Efficiency of a Vehicle Repair Technician

In accordance with various implementations, the disclosed system may include features that allow a user to evaluate performance of a particular vehicle repair technician associated with the particular VRS. In particular, the at least one processor may be configured to evaluate performance of the particular vehicle repair technician over a certain time period, such as over the above-mentioned particular time period. Moreover, the steps taken by the at least one processor for evaluating performance of the particular vehicle repair technician may be similar to those take for evaluating performance of the particular VRS. Thus, any of the aspects described above in the context of evaluating performance of the particular VRS may also apply in the context of evaluating performance of the particular vehicle repair technician.

In this regard, the at least one processor may use received input data as basis for determining a potential total extent of technician sales over the particular time period by the particular vehicle repair technician associated with the particular VRS. Also, the at least one processor may refer to the plurality of stored ROs and use those ROs as basis for determining an actual total extent of technician sales over the particular time period by the particular vehicle repair technician associated with the particular VRS. Then, based on those determined potential and actual total extents of technician sales, the at least one processor may determine a technician sales efficiency of the particular vehicle repair technician over the particular time period. Finally, the at least one processor may direct a display device to display at least one visual indication representation of the determined technician sales efficiency, the potential total extent of technician sales, and/or the actual total extent of technician sales, among other.

More specifically, the potential total extent of technician sales by the particular vehicle repair technician over the particular time period may be programmatically determined by the at least one processor in accordance with one or more specific operations. As an initial matter, the at least one processor may determine a particular working duration of the particular vehicle repair technician over the particular time period defining the extent of time that the particular vehicle repair technician is available to work over that particular time period. In particular, the at least one processor may do so based on the input data indicative of the operating duration of the particular VRS and on the input data indicative of the respective working duration of the particular vehicle repair technician. Then, based on the determined particular working duration and on the labor rate of the particular vehicle repair technician (e.g., could be the same as the labor rate of the particular VRS), the at least one processor may determine the potential total extent of technician sales by the particular vehicle repair technician over the particular time period.

By way of example and without limitation, the following sample formulas illustrate the above-described steps taken by the at least one processor to determine the potential total extent of technician sales over the particular time period. Although these sample formulas are applied in in the context of a yearly time period, the illustrated steps may apply in the context of any feasible time period.

Technician available days per year =

[(VRS open days per week) × (number of weeks per year)] −

[(VRS number of nonworking days per year) +

(Technician vacation days per year)]

Potential total extent of technician sales per year =

[(Technician hourly labor rate) × (Technician available days per year) × (Technician available hours per day)]

Further, as discussed above, each RO that is stored in the data storage device may specify information, such as a respective repair time for instance. In addition to specifying a respective repair time, however, each RO may also specify at least one respective vehicle repair technician. In practice, the respective vehicle repair technician may be one that provided one or more of the services specified in the RO, among other possibilities. Nonetheless, the at least one processor may be configured to determine at least one respective vehicle repair technician associated with a given RO by referring to meta-data associated with that given RO and/or by referring to information (e.g., text) provided in that given RO, among other options.

As an example, original RO 400 shown in FIG. 4 illustrates technician information 434 indicating a technician identifier number four (#4) associated with technician Josh A. and also a technician identifier number six (#6) associated with technician James C. Moreover, presentable RO 500 shown in FIG. 5 then illustrates such technician information stored as part of the meta-data 512. Other examples are also possible.

With this arrangement, the at least one processor may carry out one or more operations so as to determine the actual total extent of technician sales by the particular vehicle repair technician over the particular time period. As an initial matter, the at least one processor may refer to the data storage device so as to identify one or more particular ROs that each specify (i) a respective repair time that falls within the above-mentioned particular time period as well as (ii) the particular repair technician. Then, for each such identified particular RO, the at least one processor may use the above-described techniques to determine a respective extent of sales specified in the particular RO, with the respective extent of sales including sales associated with the particular vehicle repair technician. Finally, once these various respective extents of sales have been determined for the various particular ROs, at least one processor may use these various respective extents of sales as basis for determining the actual total extent of technician sales by the particular vehicle repair technician over the particular time period. In practice, the actual total extent of technician sales may simply be a sum of the various respective extents of sales. However, other operations are possible as well.

By way of example and without limitation, the following sample formula illustrates the above-described step taken by the at least one processor to determine the actual total extent of technician sales over the particular time period.

Actual total extent of technician sales over a particular time period=($RO1$ sales by technician over particular time period)+($RO2$ sales by technician over particular time period)+($RO3$ sales by technician over particular time period)+ . . .

For example, assuming that the particular time period is a particular two-day time period, the at least one processor may identify two particular ROs over that two-day time period that specify the particular vehicle repair technician.

Then, for each identified particular RO, the at least one processor may determine a respective extent of sales by the particular vehicle repair technician as specified in that particular RO. For instance, the at least one processor may determine that the first particular RO specifies an amount of two hundred dollars ($200) in sales associated with the particular vehicle repair technician and that the second particular RO specifies an amount of five hundred and fifty dollars ($550) in sales associated with the particular vehicle repair technician. Thus, based on these respective extents of sales, the at least one processor may determine that actual total extent of technician sales by the particular vehicle repair technician over the two-day time period to be an amount of seven hundred and fifty dollars ($750). Other examples are possible as well.

In accordance with the present disclosure, once the at least one processor determines the potential total extent of technician sales over the particular time period as well as the actual total extent of technician sales over the particular time period, the at least one processor may use such determinations as basis for determining a technicians sales efficiency of the particular vehicle repair technician over the particular time period. In practice, the technician sales efficiency may be any measure comparing the potential total extent of technician sales to the actual total extent of technician sales, thereby indicating true performance of the particular vehicle repair technician relative to the possible performance of the particular vehicle repair technician. As such, the technician sales efficiency may be determined in various ways.

In one case, the at least one processor may determine that the actual total extent of technician sales over the particular time period is a particular percentage of the potential total extent of technician sales over the particular time period. In this case, the at least one processor may thus set that particular percentage as the technician sales efficiency of the particular vehicle repair technician over the particular time period.

In another case, the at least one processor may determine a particular ratio of (i) the actual total extent of technician sales over the particular time period to (ii) the potential total extent of technician sales over the particular time period. In this case, the at least one processor may thus set that particular ratio as the technician sales efficiency of the particular vehicle repair technician over the particular time period.

In yet another case, the at least one processor may determine a particular difference between (i) the actual total extent of technician sales over the particular time period and (ii) the potential total extent of technician sales over the particular time period. In this case, the at least one processor may thus set that particular difference as the technician sales efficiency of the particular vehicle repair technician over the particular time period. Various other cases are possible as well.

By way of example and without limitation, the following sample formula illustrates the above-described step taken by the at least one processor to determine the technician sales efficiency over the particular time period in the context of determining a particular percentage.

$$\text{Technician sales efficiency over a particular time period} = \left(\frac{\text{actual total extent of technician sales over the particular time period}}{\text{potential total extent of technician sales over the particular time period}}\right) \times 100$$

Once the at least one processor determines one or more of the various technician performance measures described above, the at least one processor may direct a display device to display at least one visual indication representative the determined technician sales efficiency, the potential total extent of technician sales, and/or the actual total extent of technician sales. In practice, that visual indication could take on any feasible form, such any one of those described above. Further, as noted, doing so may involve generating a report including these visual indications. As such, that report may provide valuable information based on which a user can evaluate the technician's performance and/or make further business decisions, among other possibilities.

Figure 9:
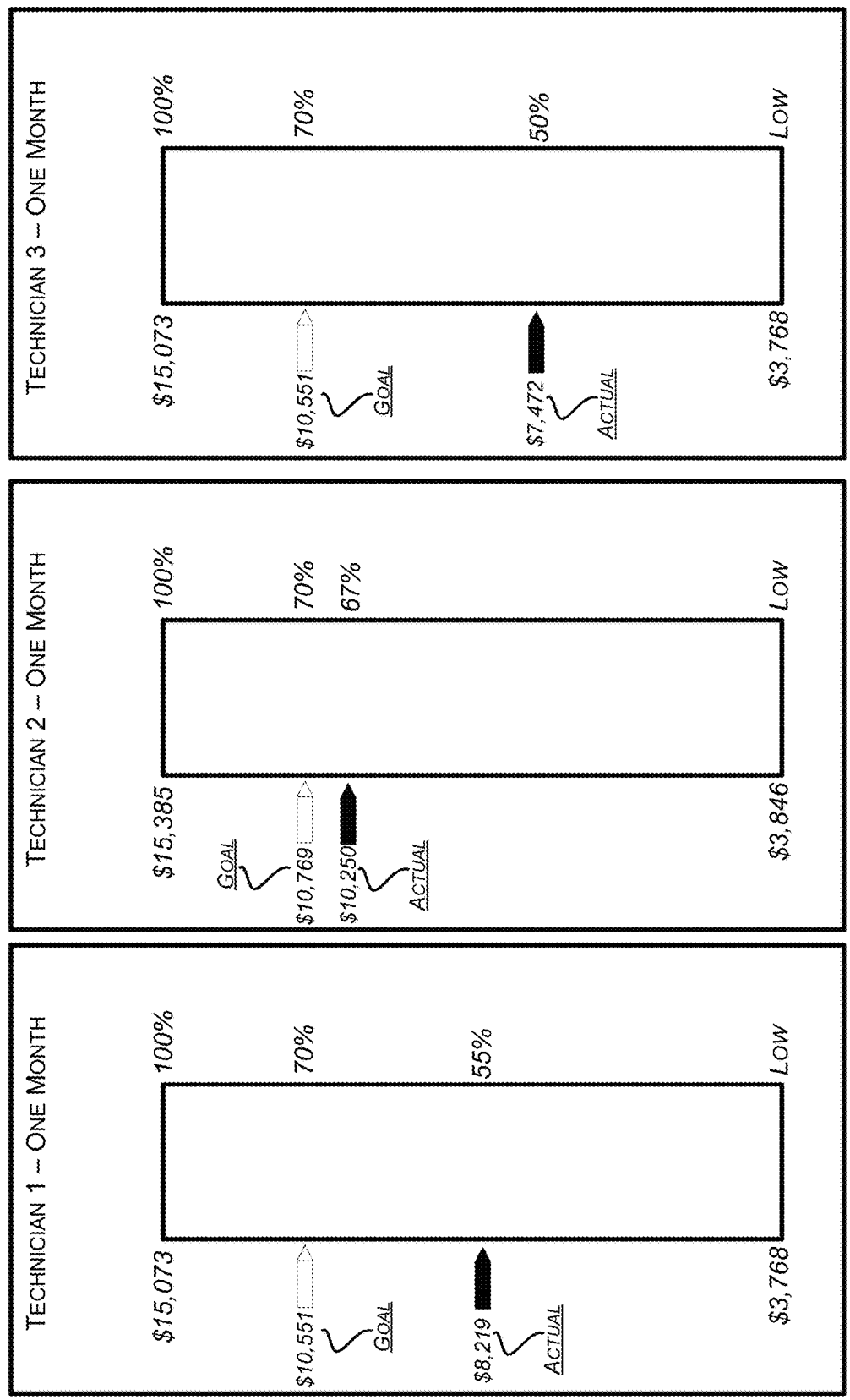
FIG. 9 shows visual indications each representative of performance of a vehicle repair technician.

FIG. 9 next illustrates example visual indications that may be provided in a report related to technician performance over a one month period, in accordance with the present disclosure. As shown, the visual indication 902 corresponds to performance of a first technician (i.e., "technician 1"), the visual indication 904 corresponds to performance of a second technician (i.e., "technician 2"), and the visual indication 906 corresponds to performance of a third technician (i.e., "technician 3").

With regards to the first technician, the visual indication 902 illustrates a graph having multiple ranges of values. In particular, one side of that graph shows a first range of values that each represents some extent of technician sales.

Moreover, that first range is shown to start at a low value (i.e., $3,768) and end at a high value (i.e., $15,073). Within that range, the visual indication 902 then illustrates a determined actual total extent of technician sales by the first technician over the one month time period, which is shown to be a value of $8,219. Additionally, the other side of the graph at issue shows a second range of values that each represents some technician sales efficiency, with values of the first range corresponding to values of the second range. Moreover, that second range is shown to start at a low value and end at a high value (i.e., 100%). Within that range, the visual indication 902 then illustrates a determined technician sales efficiency by the first technician over the one month time period, which is shown to be a value of 55%.

With regards to the second technician, the visual indication 904 also illustrates a graph having multiple ranges of values, such as those in visual indication 902. In particular, the first range in visual indication 904 is shown to start at a low value (i.e., $3,846) and end at a high value (i.e., $15,385). Within that range, the visual indication 904 then illustrates a determined actual total extent of technician sales by the second technician over the one month time period, which is shown to be a value of $10,250. Additionally, the second range in visual indication 904 is shown to start at a low value and end at a high value (i.e., 100%). Within that range, the visual indication 904 then illustrates a determined technician sales efficiency by the second technician over the one month time period, which is shown to be a value of 67%.

With regards to the third technician, the visual indication 906 also illustrates a graph having multiple ranges of values, such as those in visual indications 902 and 904. In particular, the first range in visual indication 906 is shown to start at a low value (i.e., $3,768) and end at a high value (i.e., $15,073). Within that range, the visual indication 906 then illustrates a determined actual total extent of technician sales by the third technician over the one month time period, which is shown to be a value of $7,472. Additionally, the second range in visual indication 906 is shown to start at a low value and end at a high value (i.e., 100%). Within that range, the visual indication 906 then illustrates a determined technician sales efficiency by the third technician over the one month time period, which is shown to be a value of 50%. Other illustrations are possible as well.

B. Establishing Target Performance of a Vehicle Repair Technician

In a further aspect, the disclosed system may allow a user to set certain technician goals and to then evaluate performance of a technician compared to those set goals. In this regard, the at least one processor may be configured to receive further input data (e.g., provided by a user) specifying one or more target values, such as a target technician sales efficiency and/or a target extent of technician sales, among other possibilities.

More specifically, the at least one processor may receive information specifying a target technician sales efficiency of the particular vehicle repair technician. In some cases, the received information may also specify a time period over which the target sales technician efficiency applies, which may be the above-discussed particular time period for instance. Also, as with other metrics discussed herein, the at least one processor may be configured to direct a display device to display a visual indication representative of the target technician sales efficiency, which may be included as part of a report for example. In practice, that visual indication could take on any feasible form, such any one of those described above.

Further, in some implementations, the at least one processor may make a comparison between the determined technician sales efficiency over the particular time period and the target technician sales efficiency over that same particular time period. And once such a comparison is made, the at least one processor may direct a display device to display a visual indication representative of the comparison. In practice, that visual indication could take on any feasible form, such any one of those described above. Nonetheless, the comparison may take one of various forms.

In one case, the at least one processor may simply direct the display device to display a visual indication of the determined technician sales efficiency over the particular time period alongside a visual indication of the target technician sales efficiency over the particular time period.

In another case, the at least one processor may determine that the determined technician sales efficiency over the particular time period is a particular percentage of the target technician sales efficiency over the particular time period. In this case, the at least one processor may thus direct the display device to display a visual indication of that particular percentage.

In yet another case, the at least one processor may determine a particular ratio of (i) the determined technician sales efficiency over the particular time period to (ii) the target technician sales efficiency over the particular time period. In this case, the at least one processor may thus direct the display device to display a visual indication of that particular ratio.

In yet another case, the at least one processor may determine a particular difference between (i) the determined technician sales efficiency over the particular time period and (ii) the target technician sales efficiency over the particular time period. In this case, the at least one processor may thus direct the display device to display a visual indication of that particular difference. Various other cases are possible as well.

Yet further, the at least one processor may use the received information as basis for determining a target extent of technician sales by the particular vehicle repair technician over the particular time period. In particular, the at least one processor may determine the target extent of technician sales by the particular vehicle repair technician over the particular time period based on (i) the potential total extent of technician sales by the particular vehicle repair technician over the particular time period and on (ii) the target technician sales efficiency of the particular vehicle repair technician over the particular time period. In practice, the target extent of technician sales may be a product of the potential total extent of technician sales and the target technician sales efficiency. However, other operations are also possible. Moreover, once such a target extent of technician sales is determined, the at least one processor may direct a display device to display a visual indication representative of the target extent of technician sales. In practice, that visual indication could take on any feasible form, such any one of those described above.

By way of example and without limitation, the following sample formula illustrates the above-described step taken by the at least one processor to determine the target extent of technician sales.

> Target extent of technician sales over a particular time period=(potential total extent of technician sales over the particular time period)×(target technician sales efficiency over the particular time period)

Yet further, in some implementations, the at least one processor may make a comparison between the determined target extent of technician sales over the particular time period and the actual total extent of technician sales over that same particular time period. And once such a comparison is made, the at least one processor may direct a display device to display a visual indication representative of the comparison. In practice, that visual indication could take on any feasible form, such any one of those described above. Nonetheless, the comparison may take one of various forms.

In one case, the at least one processor may simply direct the display device to display a visual indication of the determined target extent of technician sales over the particular time period alongside a visual indication of the actual total extent of technician sales over the particular time period.

In another case, the at least one processor may determine that the actual total extent of technician sales over the particular time period is a particular percentage of the determined target extent of technician sales over the particular time period. In this case, the at least one processor may thus direct the display device to display a visual indication of that particular percentage.

In yet another case, the at least one processor may determine a particular ratio of (i) the actual total extent of technician sales over the particular time period to (ii) the determined target extent of technician sales over the particular time period. In this case, the at least one processor may thus direct the display device to display a visual indication of that particular ratio.

In yet another case, the at least one processor may determine a particular difference between (i) the determined target extent of technician sales over the particular time period and (ii) the actual total extent of technician sales over the particular time period. In this case, the at least one processor may thus direct the display device to display a visual indication of that particular difference. Various other cases are possible as well.

Although the above techniques describe determination of the target extent of technician sales based on the received target technician sales efficiency, other techniques are also possible for determining the target extent of technician sales. For instance, the at least one processor may simply receive information (e.g., input data provided by a user) specifying the target extent of technician sales. Then, after receiving such information, the at least one processor may carry out any one of the operations described above, such as comparison of the target extent of technician sales to the actual total extent of technician sales, among others.

Referring again to FIG. 9, the example visual indications respectively illustrate target performance for various technicians. In particular, the visual indication 902 illustrates a goal for the first technician, which is shown to be a target extent of technician sales of $10,551 corresponding to a target technician sales efficiency of 70%. Additionally, the visual indication 904 illustrates a goal for the second technician, which is shown to be a target extent of technician sales of $10,769 corresponding to a target technician sales efficiency of 70%. Further, the visual indication 906 illustrates a goal for the second technician, which is shown to be a target extent of technician sales of $10,551 corresponding to a target technician sales efficiency of 70%. Other illustrations are possible as well.

C. Evaluating Performance of a Vehicle Repair Technician by Repair Category

In yet a further aspect, the disclosed system may include features that allow a user to evaluate how a technician is performing in each of one or more repair categories. In particular, the at least one processor may receive input data specifying a particular repair category and may determine performance of the particular vehicle repair technician over the particular time period in that particular repair category. Generally, that performance may be defined in the context of an actual total extent of technician sales in the particular repair category over the particular time period and/or may be defined in the context of a technician sales efficiency in the particular repair category over the particular time period, among other possibilities.

More specifically, the at least one processor may use the above-described techniques determine one or more particular ROs that each specify both particular repair category and also the particular vehicle repair technicians. In this regard, the at least one processor may specifically determine one or more particular ROs that specify that the particular vehicle repair technician was involved providing services related to that particular repair category. For example, assuming that the repair category is a DTC P0171, then the at least one processor may determine one or more particular ROS that specify that the particular vehicle repair technician was involved providing services in which DTC P0171 was encountered. Other examples are also possible.

Once the at least one processor identifies one or more particular ROs that each specify a particular repair category and the particular vehicle repair technician, the at least one processor may then have information based on which the at least one processor may determine performance of the particular vehicle repair technician in that particular repair category over the particular time period. More specifically, as an initial matter, the at least one processor may use the above-described techniques to determine which of the identified ROs specify respective times that fall within the particular time period. Then, the at least one processor one processor may use the above-described techniques to determine, for each identified RO of that particular time period, a respective extent of sales by the particular vehicle repair technician as specified in the identified RO. Specifically, this respective extent of sales may be the sales specified in the identified RO for that particular repair category or may alternatively be the total technician sales by the particular vehicle repair technician as specified in the identified RO, among other possibilities.

Nonetheless, once the at least one processor determine the respective extents of sales, the at least one processor may use those respective extents of sales as basis for determining an actual total extent of technician sales in the particular repair category by the particular vehicle repair over the particular time period. In practice, the actual total extent of technician sales in the particular repair category may be a sum of these respective extents of sales. However, other operations are also possible. Moreover, once the actual total extent of technician sales in the particular repair category is determined, the at least one processor may direct a display device to display a visual indication representative of the actual total extent of technician sales in the particular repair category. In practice, that visual indication could take on any feasible form, such any one of those described above.

D. Comparing Performance of Vehicle Repair Technicians

In yet a further aspect, the disclosed system may include features that allow a user to evaluate how a technician is performing relative to one or more other technicians. In particular, the at least one processor may be configured to carry out the various operations described herein for each of a plurality of different technicians. Thus, the at least one processor may determine metrics related to performance of the particular vehicle repair technician at issue as well as metrics related to performance of at least one different vehicle repair technician. Generally, these metrics may be any one of those described above, such as a technician sales efficiency of the different vehicle repair technician, an actual total extent of technician sales of the different vehicle repair technician and/or a potential total extent of technician sales of the different vehicle repair technician, among other possibilities.

In some cases, the at least one processor may receive further input data specifying one or more criteria for the comparison between technicians. In one example, the criteria may be the above-mentioned particular time period. Specifically, the at least one processor may compare performance of the particular vehicle repair technician over the particular time period to performance of at least one different vehicle repair technician over that same particular time period. In another example, the criteria may be a particular repair category. In this example, the at least one processor may compare performance of the particular vehicle repair technician in the particular repair category to performance of at least one different vehicle repair technician in that same particular repair category. Other examples and combinations of the examples are possible as well.

Furthermore, the at least one processor may carry out the comparison between the particular vehicle repair technician and the at least one different vehicle repair technician in various ways. And once the comparison is made, the at least one processor may direct a display device to display a visual indication representative of the comparison. In practice, that visual indication could take on any feasible form, such any one of those described above.

In one case, the at least one processor may simply direct the display device to display a visual indication of a metric associated with the different vehicle repair technician, such as of a determined sales efficiency of the different vehicle repair technician. In this manner, a user of the system may simply review performance of the different vehicle repair technician.

In another case, the at least one processor may direct the display device to display a visual indication of a metric associated with the particular vehicle repair technician alongside the same metric associated with the different vehicle repair technician. For example, the visual indication may represent a technician sales efficiency of the particular vehicle repair technician alongside a technician sales efficiency of the different vehicle repair technician. And in another example, the visual indication may represent a technician sales efficiency of the particular vehicle repair technician alongside an average technician sales efficiency of two or more different vehicle repair technicians.

In yet another case, the at least one processor may determine that a metric associated with the particular vehicle repair technician is a particular percentage of the same metric associated with the different vehicle repair technician. In this case, the at least one processor may thus direct the display device to display a visual indication of that particular percentage. For example, the at least one processor may determine that the actual total extent of technician sales by the particular vehicle repair technician is a particular percentage of the actual total extent of technician sales by the different vehicle repair technician, and the at least one processor may direct the display device to display a visual indication of that particular percentage so as to compare performance of the vehicle repair technicians.

In yet another case, the at least one processor may determine a particular ratio of (i) a metric associated with the particular vehicle repair technician to (ii) a metric associated with the different vehicle repair technician. In this case, the at least one processor may thus direct the display device to display a visual indication of that particular ratio. For example, the at least one processor may determine a ratio of (i) the actual total extent of technician sales by the particular vehicle repair technician to (ii) the actual total extent of technician sales by the different vehicle repair technician, and the at least one processor may direct the display device to display a visual indication of that particular ratio so as to compare performance of the vehicle repair technicians.

In yet another case, the at least one processor may determine a particular difference between (i) a metric associated with the particular vehicle repair technician and (ii) a metric associated with the different vehicle repair technician. In this case, the at least one processor may thus direct the display device to display a visual indication of that particular difference. For example, the at least one processor may determine a particular difference between (i) the actual total extent of technician sales by the particular vehicle repair technician and (ii) the actual total extent of technician sales by the different vehicle repair technician, and the at least one processor may direct the display device to display a visual indication of that particular difference so as to compare performance of the vehicle repair technicians. Various other cases are possible as well.

Referring again to FIG. 9, the example visual indications 902-906 collectively illustrate a comparison between vehicle repair technicians. In particular, as discussed above each visual indication respectively illustrates an actual extent of technician sales, a technician sales efficiency, a target extent of technician sales, and a target technician sales efficiency, among other information. Thus, a user reviewing a report that includes such visual indications may be able to evaluate performance of a certain one of the technician relative to performance of another one of the technicians. Other illustrations are also possible.

E. Comparing Technician Performance Over Different Time Periods

In yet a further aspect, the disclosed system may include features that allow a user to evaluate how a technician is performing in one time period compared to another time period. In particular, the at least one processor may carry out the various operations described herein in the context of a first time period and may also carry out the various operations described herein in the context of a second time period. As discussed above with regards to comparing VRS performance over different time periods, the first time period may be at least partially different from the second time period.

In some cases, the at least one processor may also receive further input data specifying one or more criteria for the comparison between time periods. In one example, the criteria may be comparison between vehicle repair technicians. Specifically, the at least one processor may compare performance of the particular vehicle repair technician over multiple time periods to performance of at least one different vehicle repair technician over those same multiple time periods. In another example, the criteria may be a particular repair category. In this example, the at least one processor may compare performance of the particular vehicle repair technician in the particular repair category over a first time period to performance of the particular vehicle repair technician in the particular repair category over a second time period. Other examples and combinations of the examples are possible as well.

Furthermore, the at least one processor may carry out a comparison between performance of the particular vehicle repair technician over a first time period to performance of the particular vehicle repair technician over a second time period. And once the comparison is made, the at least one processor may direct a display device to display a visual indication representative of the comparison. In practice, that visual indication could take on any feasible form, such any one of those described above.

In one case, the at least one processor may simply direct the display device to display a visual indication of a metric representative of performance of the particular vehicle repair technician over the second time period, such as of a determined technician sales efficiency of the particular vehicle repair technician over that second time period. In this manner, a user of the system may simply review performance of the particular vehicle repair technician over that second time period, such as following a previous review of performance of the particular vehicle repair technician over the first time period.

In another case, the at least one processor may direct the display device to display a visual indication of (i) a metric representative of performance of the particular vehicle repair technician over the first time period alongside (ii) the same metric representative of performance of the particular vehicle repair technician over the second time period. For example, the visual indication may represent a technician sales efficiency of the particular vehicle repair technician over the first time period alongside a technician sales efficiency of the particular vehicle repair technician over the second time period.

In yet another case, the at least one processor may determine that (i) a metric representative performance of the particular vehicle repair technician over the first time period is a particular percentage of (ii) the same metric representative performance of the particular vehicle repair technician over the second time period. In this case, the at least one processor may thus direct the display device to display a visual indication of that particular percentage. For example, the at least one processor may determine that (i) the actual total extent of technician sales by the particular vehicle repair technician over the first time period is a particular percentage of (ii) the actual total extent of technician sales by the particular vehicle repair technician over the second time period, and the at least one processor may direct the display device to display a visual indication of that particular percentage so as to compare the technician's performance over the first and second time periods.

In yet another case, the at least one processor may determine a particular ratio of (i) a metric representative performance of the particular vehicle repair technician over the first time period to (ii) the same metric representative performance of the particular vehicle repair technician over the second time period. In this case, the at least one processor may thus direct the display device to display a visual indication of that particular ratio. For example, the at least one processor may determine a ratio of (i) the actual total extent of technician sales by the particular vehicle repair technician over the first time period to (ii) the actual total extent of technician sales by the particular vehicle repair technician over the second time period, and the at least one processor may direct the display device to display a visual indication of that particular ratio so as to compare the technician's performance over the first and second time periods.

In yet another case, the at least one processor may determine a particular difference between (i) a metric representative performance of the particular vehicle repair technician over the first time period and (ii) the same metric representative performance of the particular vehicle repair technician over the second time period. In this case, the at least one processor may thus direct the display device to display a visual indication of that particular difference. For example, the at least one processor may determine a particular difference between (i) the actual total extent of technician sales by the particular vehicle repair technician over the first time period and (ii) the actual total extent of technician sales by the particular vehicle repair technician over the second time period, and the at least one processor may direct the display device to display a visual indication of that particular difference so as to compare the technician's performance over the first and second time periods. Various other cases are possible as well.

V. Evaluating Service Writer Efficiency

In accordance with an example implementation, the disclosed system may also include features that allow a user to consider the extent of work available to a technician when evaluating the technician's performance. In particular, a VRS may sometimes not have a sufficient amount of work for the technician to perform relative to the amount of time that the technician is actually available to work. As a result, the technician may end up have a lower technician sales efficiency due to such lack of available work. Thus, the disclosed system may determine service writer efficiency, which is a metric representative of the extent of work available to a technician relative to the potential extent of work that the technician can perform in the technician's available work time.

More specifically, in order to receive information related to available work in the VRS, the at least one processor may engage in communication with a scheduler module. The scheduler module may be an interface that manages a technician's time. Specifically, the scheduler module may include information specifying work respectively assigned to each technician of a repair shop, with that work being a repair service to be carried out by the respective technician, among other options. Also, for each such work project assigned to a technician, the scheduler module may include information specifying an estimated extent of time for completing the work project and possible also other information. In practice, the information specified in the scheduler module may be provided manually (e.g., by a user) and/or may be programmatically generated (e.g., the scheduler module may programmatically allocate work to various technicians based on various criteria). Moreover, the scheduler module may be incorporated as part of a vehicle repair data system 200, may be incorporated as part of a vehicle repair tool 300, and/or may be incorporated as part of a separate system, such as part of a management system of a VRS for instance.

Accordingly, the at least one processor may receive from the scheduler module data indicative of extent of work time scheduled for a particular vehicle repair technician over a particular time period. In particular, the at least one processor may query the scheduler module to request such information and may responsively receive such information. As an example, the at least one processor may query the scheduler module to request information related to the extent of work time scheduled for the particular vehicle repair technician over a particular month. Responsively, the at least one processor may then receive from the scheduler module information specifying that the particular repair technician has one hundred and twenty scheduled hours of work in the particular month. Other examples are also possible.

With this arrangement, the at least one processor may inherently receive input data indicative of an extent of work available to the particular vehicle repair technician over the particular time period. Specifically, the extent of work available may be defined as potential technician sales resulting from work performed during the extent of work time scheduled over the particular time period. In contrast, the above-described potential total extent of technician sales may define potential technician sales possible if the technician were to perform work during the entire time that the technician is actually available to perform work over the particular time period. Nonetheless, the at least one processor may determine the extent of work available as a product of (i) the extent of work time scheduled for the particular vehicle repair technician over the particular time period and (ii) the labor rate of the particular vehicle repair technician.

By way of example and without limitation, the following sample formula illustrates the above-described step taken by the at least one processor to determine the extent of work available.

Extent of technician work available over a particular time period=(extent of technician work time scheduled over the particular time period)× (technician labor rate)

For example, as noted above, the at least one processor may receive from the scheduler module information specifying that the particular repair technician has one hundred and twenty (120) scheduled hours of work in the particular month. Additionally, the at least one processor may determine that the particular vehicle repair technician has a labor rate of one hundred dollars ($100) per hour. Thus, the extent of work available to the particular vehicle repair technician over the particular month may be twelve thousand dollars' worth of work ($12,000). Other examples are also possible.

Given the above information, the at least one processor may determine a service writer efficiency associated with the particular vehicle repair technician over the particular time period and do so in various ways. In particular, the at least one processor may use (i) the potential total extent of technician sales by the particular vehicle repair technician over the particular time period and (ii) the extent of work available to the particular vehicle repair technician over the particular time period as basis for determining the service writer efficiency associated with the particular vehicle repair technician. Specifically, the service writer efficiency may be any measure representative of the extent of work available relative to the potential total extent of technician sales.

Although various such measures are possible without departing from the scope of the present disclosure, an example implementation may involve determining a particular percentage and setting that particular percentage as the service writer efficiency. More specifically, the at least one processor may determine that (i) the extent of work available to the particular vehicle repair technician over the particular time period is a particular percentage of (ii) the potential total extent of technician sales by the particular vehicle repair technician over the particular time period. Consequently, the at least one processor may set that particular percentage as the service writer efficiency associated with the particular vehicle repair technician over the particular time period.

By way of example and without limitation, the following sample formula illustrates the above-described step taken by the at least one processor to determine the service writer efficiency over the particular time period in the context of determining a particular percentage.

$$\text{Service writer efficiency over a particular time period} = \left( \frac{\text{extent of technician work available over the particular time period}}{\text{potential total extent of technician sales over the particular time period}} \right) \times 100$$

For example, as noted, the at least one processor may determine that the extent of work available to the particular vehicle repair technician over the particular month may be twelve thousand dollars' worth of work ($12,000). Also, assuming that the particular vehicle repair technician is available to work for one hundred and sixty (160) hours over the particular month and given the above-mentioned labor rate of one hundred dollars ($100) per hour, the at least one processor may determine that the potential total extent of technician sales over that particular month may be may be sixteen thousand dollars ($16,000). As a result, the at least one processor may determine the service writer efficiency associated with the particular repair technician over the particular month to be seventy five percent (75%). Other examples are also possible.

In another implementation, the at least one processor may determine the service writer efficiency using time related information rather than using sales related information as described above. In particular, given that labor rate is a metric used to determine the potential total extent of technician sales and is also a metric used to determine the extent of work available, the at least one processor may disregard the labor rate as part of the service writer efficiency determination. In doing, the at least one processor may thus determine the service writer efficiency based on (i) extent of work time scheduled for the particular vehicle repair technician over the particular time period and (ii) the extent of time that the particular repair technician is available to work over the particular time period.

For instance, the at least one processor may determine that (i) extent of work time scheduled for the particular vehicle repair technician over the particular time period is a particular percentage of (ii) the extent of time that the particular repair technician is available to work over the particular time period. Consequently, the at least one processor may set that particular percentage as the service writer efficiency associated with the particular vehicle repair technician over the particular time period.

By way of example and without limitation, the following is another sample formula that illustrates the above-described step taken by the at least one processor to determine the service writer efficiency over the particular time period in the context of determining a particular percentage.

Service writer efficiency over a particular time period =

$$\left(\frac{\text{extent of tech work available over the particular time period}}{\text{potential total extent of tech sales over the particular time period}}\right) \times 100 =$$

$$\left(\frac{(\text{extent of scheduled tech time over the particular time period}) \times (\text{tech labor rate})}{(\text{extent of available tech work time over the particular time period}) \times (\text{tech labor rate})}\right) \times$$

$$100 = \left(\frac{(\text{extent of scheduled tech time over the particular time period}) \times}{(\text{extent of available tech work time over the particular time period}) \times}\right) \times 100 =$$

$$\left(\frac{(\text{extent of scheduled tech time over the particular time period})}{(\text{extent of available tech work time over the particular time period})}\right) \times 100$$

In a further aspect, once the at least one processor determines the service writer efficiency, the at least one processor may use the service writer efficiency to determine various other metrics. For example, the at least one processor may make a comparison between the determined technicians sales efficiency and the determined service writer efficiency. In doing so, the at least one processor may determine that (i) the determined technicians sales efficiency is a particular percentage of (ii) the determined service writer efficiency. Consequently, the at least one processor may set that particular percentage as the comparison metric. Other examples are possible as well.

Given the various metrics related to the service writer efficiency, the at least one processor may direct a display device to display at least one visual indicator representative of one or more such metrics. For example, the at least one processor may direct a display device to display at least one visual indicator representative of the determined service writer efficiency. And in another example, the at least one processor may direct a display device to display at least one visual indicator representative of the above-mentioned comparison metric. In practice, these visual indications could take on any feasible form, such any one of those described above.

Figure 10:
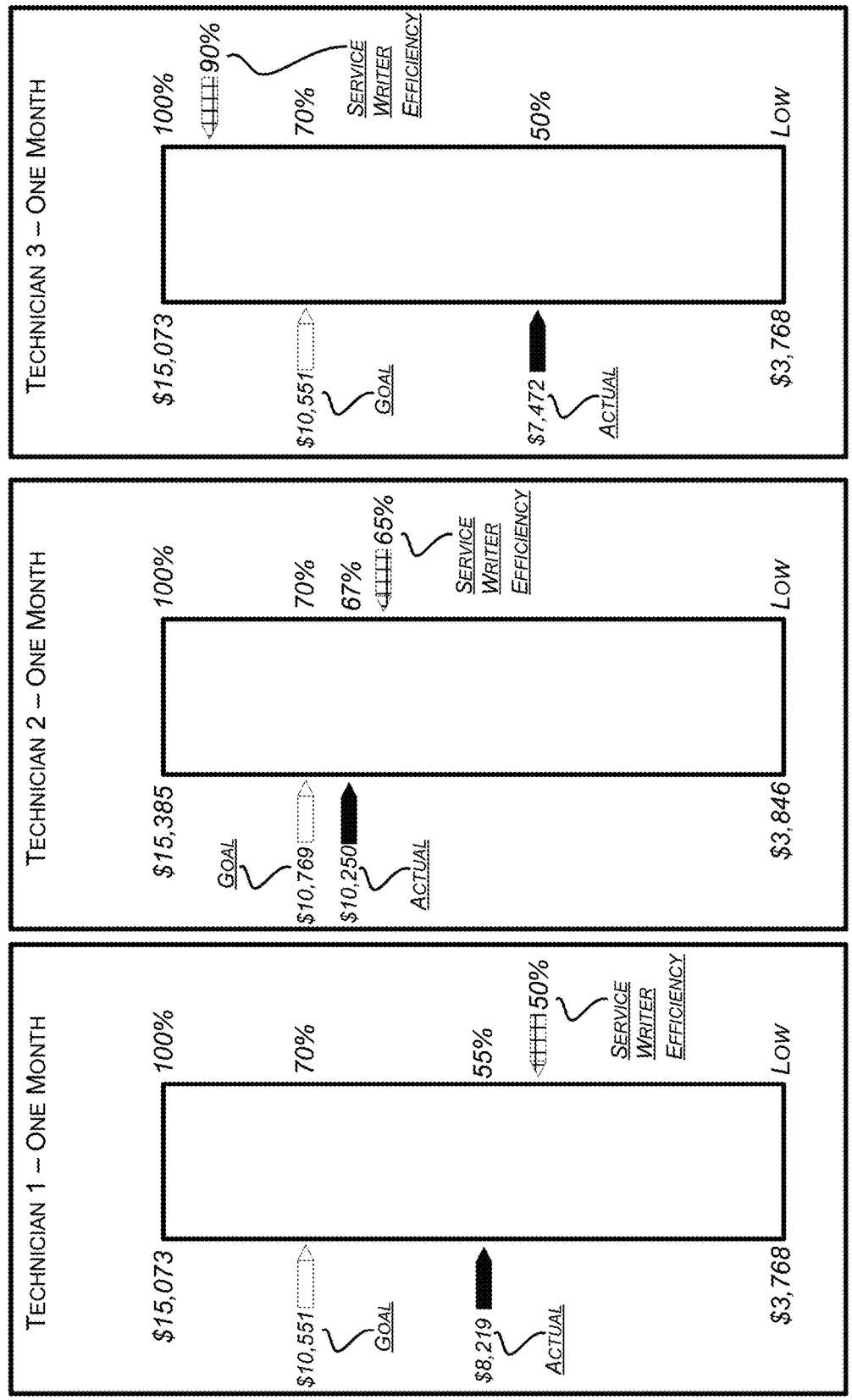
FIG. 10 shows visual indications representative of service writer efficiency.

FIG. 10 next illustrates the visual indicators of FIG. 9 together with visual indicators related to service writer efficiencies associated with various technicians.

As shown by visual indictor 1002, the first technician has an associated service writer efficiency of fifty percent (50%). So although the first technician's actual sales/efficiency (i.e., $8,219 and 55%) are lower compared to the first technician's sales/efficiency goal (i.e., $10,551 and 70%), the first technician over-achieved compared to the actual amount of work which was made available to the first technician during the one month period, which is represented by the service writer efficiency of 50%. In this manner, a user reviewing the visual indicator 1002 may conclude that the first technician performed well over the one month period and that the repair shop simply did not have enough work to fully saturate the first technician's available work time.

Further, as shown by visual indicator 1004, the second technician has an associated service writer efficiency of sixty five percent (65%). So although the second technician's actual sales/efficiency (i.e., $10,250 and 67%) are lower compared to the second technician's sales/efficiency goal (i.e., $10,769 and 70%), the second technician over-achieved compared to the actual amount of work which was made available to the second technician during the one month period, which is represented by the service writer efficiency of 65%. In this manner, as with the first technician, a user reviewing the visual indicator 1004 may conclude that the second technician performed well over the one month period and that the repair shop simply did not have enough work to fully saturate the second technician's available work time.

Yet further, as shown by visual indicator 1006, the third technician has an associated service writer efficiency of ninety percent (90%). In this situation, the third technician's actual sales/efficiency (i.e., $7,472 and 50%) are lower compared to the third technician's sales/efficiency goal (i.e., $10,551 and 70%). However, the third technician under-achieved because the third technician's actual sales/efficiency is low compared to actual amount of work which was made available to the second technician during the one month period, which is represented by the service writer efficiency of 90%. In this manner, a user reviewing the visual indicator 1006 may conclude that the third technician had almost a fully loaded schedule yet did not achieve enough actual sales given that amount of schedule work. As a result, the user (e.g., shop owner) may use such information for making further business decision, such as reallocating scheduled work among the various technicians, among other options.

In yet a further aspect, any of the determined efficiencies discussed herein may be stored in a data storage device. For example, FIG. 2 illustrates determined efficiencies being stored in data storage device 210. Other illustrations are also possible.

VI. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a computer-readable medium storing program instructions, that when executed by a processor of a machine cause a set of functions to be performed, the set of functions comprising the features or functions of the aspects and embodiments described herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Embodiments of the present disclosure may thus relate to one of the enumerated example embodiments (EEEs) listed below.

EEE 1 is a method comprising: receiving, by at least one processor, input data indicative of: an operating duration of a particular vehicle repair shop (VRS), a count of vehicle repair technicians associated with the particular VRS, a working duration respectively of each vehicle repair technician associated with the particular VRS, and at least one labor rate associated with the particular VRS, wherein the at least one processer is configured to refer to a data storage device containing a plurality of computer-readable vehicle repair orders (ROs) each specifying a respective extent of sales by the particular VRS; based on the input data, determining, by the at least one processor, a potential total extent of sales by the particular VRS over a particular time period; based on the plurality of ROs, determining, by the at least one processor, an actual total extent of sales by the particular VRS over the particular time period; based on the potential total extent of sales and on the actual total extent of sales, determining, by the at least one processor, a sales efficiency of the particular VRS over the particular time period; and directing, by the at least one processor, a display device to display at least one visual indication representative of one or more of: the determined sales efficiency, the potential total extent of sales, and the actual total extent of sales.

EEE 2 is the method of EEE 1, wherein receiving input data indicative of the operating duration of the particular VRS comprises receiving one or more of the following operational details: a number of operational days per week, a number of non-operational days per week, a number of operational days per year, a number of non-operational days per year, a number of operational hours per day, a number of non-operational hours per day, a number of operational hours per week, a number of non-operational hours per week, a number of operational hours per year, a number of non-operational hours per year, particular operational days of the week, particular operational hours respectively during one or more days of the week, and particular non-operational days of the year, the method of EEE 2, further comprising: based at least on one or more of the received operational details, the at least one processor determining the operating duration of the particular VRS over the particular time period; and directing, by the at least one processor, the display device to display at least one further visual indication representative of the operating duration of the particular VRS over the particular time period.

EEE 3 is the method of EEE 1 or 2, wherein receiving input data indicative of a working duration respectively of each vehicle repair technician associated with the particular VRS comprises receiving, respectively for each vehicle repair technician, one or more of the following working details: a number of working days per week, a number of non-working days per week, a number of working days per year, a number of non-working days per year, a number of working hours per day, a number of non-working hours per day, a number of working hours per week, a number of non-working hours per week, a number of working hours per year, a number of non-working hours per year, particular working days of the week, particular working hours respectively during one or more days of the week, and particular non-working days of the year, the method of EEE 3, further comprising: based at least on one or more of the received working details, the at least one processor determining at least one particular working duration over the particular time period of at least one particular vehicle repair technician associated with the particular VRS; and directing, by the at least one processor, the display device to display at least one further visual indication representative of the at least one particular working duration over the particular time period.

EEE 4 is the method of any one of EEE 1 to 3, wherein receiving input data indicative of at least one labor rate associated with the particular VRS comprises receiving, respectively for each vehicle repair technician associated with the particular VRS, input data indicative of a respective labor rate.

EEE 5 is the method of any one of EEE 1 to 4, further comprising: receiving, by the at least one processor, further input data indicative of the particular time period.

EEE 6 is the method of any one of EEE 1 to 5, wherein determining the potential total extent of sales by the particular VRS over the particular time period comprises: based on the received input data indicative of the operating duration of the particular VRS and on the received input data indicative of the respective working durations, determining, respectively for each vehicle repair technician associated with the particular VRS, a particular working duration over the particular time period; and based on the respectively determined particular working durations and on the input data indicative of the at least one labor rate associated with the particular VRS, determining the potential total extent of sales by the particular VRS over the particular time period.

EEE 7 is the method of any one of EEE 1 to 6, wherein the plurality of ROs each also specify a respective repair time, and wherein determining an actual total extent of sales by the particular VRS over the particular time period comprises: determining one or more particular ROs, from among the plurality of ROs, that specify a respective repair time that is within the particular time period; and based on respective extents of sales specified in the determined one or more particular ROs, determining the actual total extent of sales by the particular VRS over the particular time period.

EEE 8 is the method of any one of EEE 1 to 7, wherein determining the sales efficiency of the particular VRS over the particular time period comprises: determining that the actual total extent of sales is a particular percentage of the potential total extent of sales; and setting the particular percentage as the sales efficiency of the particular VRS over the particular time period.

EEE 9 is the method of any one of EEE 1 to 8, further comprising: receiving, by the at least one processor, information specifying a target sales efficiency of the particular VRS over the particular time period; and directing, by the at least one processor, the display device to display at least one further visual indication representative of the target sales efficiency.

EEE 10 is the method of any one of EEE 1 to 9, further comprising: receiving, by the at least one processor, information specifying a target sales efficiency of the particular VRS over the particular time period; making a comparison, by the at least one processor, between the determined sales efficiency and the target sales efficiency; and directing, by the at least one processor, the display device to display at least one further visual indication representative of the comparison.

EEE 11 is the method of any one of EEE 1 to 10, further comprising: receiving, by the at least one processor, information specifying a target sales efficiency of the particular VRS over the particular time period; based on the target sales efficiency and on the potential total extent of sales by the particular VRS over the particular time period, determining a target extent of sales by the particular VRS over the particular time period; and directing, by the at least one processor, the display device to display at least one further visual indication representative of the determined target extent of sales.

EEE 12 is the method of any one of EEE 1 to 11, further comprising: receiving, by the at least one processor, information specifying a target sales efficiency of the particular VRS over the particular time period; based on the target sales efficiency and on the potential total extent of sales by the particular VRS over the particular time period, determining a target extent of sales by the particular VRS over the particular time period; making a comparison between the actual total extent of sales and the determined target extent of sales; and directing, by the at least one processor, the display device to display at least one further visual indication representative of the comparison.

EEE 13 is the method of any one of EEE 1 to 12, wherein the plurality of ROs each specify one or more respective repair categories, the method of EEE 1 further comprising: determining, by the at least one processor, one or more particular ROs, from among the plurality of ROs, that specify a particular repair category; based on respective extents of sales specified in the determined one or more particular ROs, determining, by the at least one processor, an actual total extent of sales in the particular repair category by the particular VRS over the particular time period; and directing, by the at least one processor, the display device to display at least one further visual indication representative of the determined actual total extent of sales in the particular repair category by the particular VRS over the particular time period.

EEE 14 is the method of any one of EEE 1 to 13, further comprising: receiving, by at least one processor, different input data indicative of: an operating duration of a different VRS, a count of vehicle repair technicians associated with the different VRS, a working duration respectively of each vehicle repair technician associated with the different VRS, and at least one labor rate associated with the different VRS, wherein the at least one processer is further configured to refer to a data storage device containing a plurality of different ROs each specifying a respective extent of sales by the different VRS; based on the different input data, determining, by the at least one processor, a potential total extent of sales by the different VRS over the particular time period; based on the plurality of different ROs, determining, by the at least one processor, an actual total extent of sales by the different VRS over the particular time period; based on the potential total extent of sales by the different VRS and on the actual total extent of sales by the different VRS, determining, by the at least one processor, a sales efficiency of the different VRS over the particular time period; and directing, by the at least one processor, the display device to display at least one different visual indication representative of one or more of: the determined sales efficiency of the different VRS, the potential total extent of sales by the different VRS, and the actual total extent of sales by the different VRS.

EEE 15 is the method of any one of EEE 1 to 14, wherein the particular time period is a first time period, wherein the potential total extent of sales is a first potential total extent of sales, wherein the actual total extent of sales is a first actual total extent of sales, and wherein the determined sales efficiency is a determined first sales efficiency, the method of EEE 15, further comprising: based on the input data, determining, by the at least one processor, a second potential total extent of sales by the particular VRS over a second time period, wherein the second time period is at least partially different from the first time period; based on the plurality of ROs, determining, by the at least one processor, a second actual total extent of sales by the particular VRS over the second time period; based on the second potential total extent of sales and on the second actual total extent of sales, determining, by the at least one processor, a second sales efficiency of the particular VRS over the particular time period; and directing, by the at least one processor, a display device to display at least one visual indication representative of one or more of: the determined second sales efficiency, the second potential total extent of sales, and the second actual total extent of sales.

EEE 16 is the method of any one of EEE 1 to 15, further comprising: based on the input data, determining, by the at least one processor, a potential total extent of technician sales over the particular time period by a particular vehicle repair technician associated with the particular VRS; based on the plurality of ROs, determining, by the at least one processor, an actual total extent of technician sales over the particular time period by the particular vehicle repair technician associated with the particular VRS; based on the potential total extent of technician sales and on the actual total extent of technician sales, determining, by the at least one processor, a technician sales efficiency of the particular vehicle repair technician over the particular time period; and directing, by the at least one processor, the display device to display at least one further visual indication representative of one or more of: the determined technician sales efficiency, the potential total extent of technician sales, and the actual total extent of technician sales.

EEE 17 is the method of EEE 16, wherein determining the potential total extent of technician sales by the particular vehicle repair technician over the particular time period comprises: based on the received input data indicative of the operating duration of the particular VRS and on the received input data indicative of the respective working duration of the particular vehicle repair technician, determining a particular working duration of the particular vehicle repair technician over the particular time period; and based on the determined particular working duration and on the input data indicative of the at least one labor rate associated with the particular VRS, determining the potential total extent of technician sales by the particular vehicle repair technician over the particular time period.

EEE 18 is the method of any one of EEE 16 to 17, wherein the plurality of ROs each also specify a respective a repair time and a respective vehicle repair technician, and wherein determining the actual total extent of technician sales by the particular vehicle repair technician over the particular time period comprises: determining one or more particular ROs, from among the plurality of ROs, that each specify (i) a respective repair time that is within the particular time period and (ii) the particular vehicle repair technician; and based on respective extents of sales specified in the determined one or more particular ROs, determining the actual total extent of technician sales by the particular vehicle repair technician over the particular time period.

EEE 19 is the method of any one of EEE 16 to 18, wherein determining the technician sales efficiency of the particular vehicle repair technician over the particular time period comprises: determining that the actual total extent of technician sales is a particular percentage of the potential total extent of technician sales; and setting the particular percentage as the technician sales efficiency of the particular vehicle repair technician over the particular time period.

EEE 20 is the method of any one of EEE 16 to 19, further comprising: receiving, by the at least one processor, information specifying a target technician sales efficiency of the particular vehicle repair technician over the particular time period; and directing, by the at least one processor, the display device to display at least one further visual indication representative of the target technician sales efficiency.

EEE 21 is the method of any one of EEE 16 to 20, further comprising: receiving, by the at least one processor, information specifying a target technician sales efficiency of the particular vehicle repair technician over the particular time period; making a comparison between the determined technician sales efficiency and the target technician sales efficiency; and directing, by the at least one processor, the display device to display at least one further visual indication representative of the comparison.

EEE 22 is the method of any one of EEE 16 to 21, further comprising: receiving, by the at least one processor, information specifying a target technician sales efficiency of the particular vehicle repair technician over the particular time period; based on the target technician sales efficiency and on the potential total extent of technician sales by the particular vehicle repair technician over the particular time period, determining a target extent of technician sales by the particular vehicle repair technician over the particular time period; and directing, by the at least one processor, the display device to display at least one further visual indication representative of the determined target extent of technician sales.

EEE 23 is the method of any one of EEE 16 to 22, further comprising: receiving, by the at least one processor, information specifying a target technician sales efficiency of the particular vehicle repair technician over the particular time period; based on the target technician sales efficiency and on the potential total extent of technician sales by the particular vehicle repair technician over the particular time period, determining a target extent of technician sales by the particular vehicle repair technician over the particular time period; making a comparison between the actual total extent of technician sales and the determined a target extent of technician sales; and directing, by the at least one processor, the display device to display at least one further visual indication representative of the comparison.

EEE 24 is the method of any one of EEE 16 to 23, wherein the plurality of ROs each specify one or more respective repair categories and a respective vehicle repair technician, the method of EEE 24, further comprising: determining, by the at least one processor, one or more particular ROs, from among the plurality of ROs, that specify (i) a particular repair category and (ii) the particular vehicle repair technician; based on respective extents of sales specified in the determined one or more particular ROs, determining, by the at least one processor, an actual total extent of sales in the particular repair category by the particular vehicle repair technician over the particular time period; and directing, by the at least one processor, the display device to display at least one further visual indication representative of the determined actual total extent of sales in the particular repair category by the particular vehicle repair technician over the particular time period.

EEE 25 is the method of any one of EEE 16 to 24, further comprising: based on the input data, determining, by the at least one processor, a potential total extent of technician sales over the particular time period by a different vehicle repair technician associated with the particular VRS; based on the plurality of ROs, determining, by the at least one processor, an actual total extent of technician sales over the particular time period by the different vehicle repair technician associated with the particular VRS; based on the potential total extent of technician sales by the different vehicle repair technician and on the actual total extent of technician sales by the different vehicle repair technician, determining, by the at least one processor, a technician sales efficiency of the different vehicle repair technician over the particular time period; and directing, by the at least one processor, the display device to display at least one different visual indication representative of one or more of: the determined technician sales efficiency of the different vehicle repair technician, the potential total extent of technician sales by the different vehicle repair technician, and the actual total extent of technician sales by the different vehicle repair technician.

EEE 26 is the method of any one of EEE 16 to 25, further comprising: receiving, by the at least one processor, further input data indicative of an extent of work available to the particular vehicle repair technician over the particular time period; based on the extent of work available and on the potential total extent of technician sales, determining a service writer efficiency of the particular vehicle repair technician over the particular time period; and directing, by the at least one processor, the display device to display at least one further visual indication representative of the determined service writer efficiency.

EEE 27 is the method of EEE 25, wherein determining the service writer efficiency based on the extent of work available and on the potential total extent of technician sales comprises determining a measure of the extent of work available relative to the potential total extent of technician sales.

EEE 28 is the method of any one of EEE 26 to 27, further comprising: making a comparison between the determined technician sales efficiency and the determined service writer efficiency; and directing, by the at least one processor, the display device to display at least one further visual indication representative of the comparison.

EEE 29 is a computing system comprising: a data storage device having stored thereon a plurality of computer-readable vehicle repair orders (ROs) each specifying a respective extent of sales by a particular vehicle repair shop (VRS); and at least one processor configured to refer to the data storage device and programmed to: receive input data indicative of: an operating duration of the particular VRS, a count of vehicle repair technicians associated with the particular VRS, a working duration respectively of each vehicle repair technician associated with the particular VRS, and at least one labor rate associated with the particular VRS; based on the input data, determine a potential total extent of sales by the particular VRS over a particular time period; based on the plurality of ROs, determine actual total extent of sales by the particular VRS over the particular time period; based on the potential total extent of sales and on the actual total extent of sales, determine a sales efficiency of the particular VRS over the particular time period; and direct a display device to display at least one visual indication representative of one or more of: the determined sales efficiency, the potential total extent of sales, and the actual total extent of sales.

EEE 30 is the computing system of EEE 29, wherein the at least one processor being programmed to receive input data indicative of the operating duration of the particular VRS comprises the at least one processor being programmed to receive one or more of the following operational details: a number of operational days per week, a number of non-operational days per week, a number of operational days per year, a number of non-operational days per year, a number of operational hours per day, a number of non-operational hours per day, a number of operational hours per week, a number of non-operational hours per week, a number of operational hours per year, a number of non-operational hours per year, particular operational days of the week, particular operational hours respectively during one or more days of the week, and particular non-operational days of the year, and wherein the at least one processor is further programmed to: based at least on one or more of the received operational details, determine the operating duration of the particular VRS over the particular time period; and direct the display device to display at least one further visual indication representative of the operating duration of the particular VRS over the particular time period.

EEE 31 is the computing system of EEE 29 or 30, wherein the at least one processor being programmed to receive input data indicative of a working duration respectively of each vehicle repair technician associated with the particular VRS comprises the at least one processor being programmed to receive, respectively for each vehicle repair technician, one or more of the following working details: a number of working days per week, a number of non-working days per week, a number of working days per year, a number of non-working days per year, a number of working hours per day, a number of non-working hours per day, a number of working hours per week, a number of non-working hours per week, a number of working hours per year, a number of non-working hours per year, particular working days of the week, particular working hours respectively during one or more days of the week, and particular non-working days of the year, and wherein the at least one processor is further programmed to: based at least on one or more of the received working details, determine at least one particular working duration over the particular time period of at least one particular vehicle repair technician associated with the particular VRS; and direct the display device to display at least one further visual indication representative of the at least one particular working duration over the particular time period.

EEE 32 is the computing system of any one of EEE 29 to 31, wherein the at least one processor being programmed to receive input data indicative of at least one labor rate associated with the particular VRS comprises the at least one processor being programmed to receive, respectively for each vehicle repair technician associated with the particular VRS, input data indicative of a respective labor rate.

EEE 33 is the computing system of any one of EEE 29 to 32, wherein the at least one processor is further programmed to: receive further input data indicative of the particular time period.

EEE 34 is the computing system of any one of EEE 29 to 33, wherein the at least one processor being configure to determine the potential total extent of sales by the particular VRS over the particular time period comprises the at least one processor being configure to: based on the received input data indicative of the operating duration of the particular VRS and on the received input data indicative of the respective working durations, determine, respectively for each vehicle repair technician associated with the particular VRS, a particular working duration over the particular time period; and based on the respectively determined particular working durations and on the input data indicative of the at least one labor rate associated with the particular VRS, determine the potential total extent of sales by the particular VRS over the particular time period.

EEE 35 is the computing system of any one of EEE 29 to 34, wherein the plurality of ROs each also specify a respective repair time, and wherein the at least one processor being configure to determine an actual total extent of sales by the particular VRS over the particular time period comprises the at least one processor being configure to: determine one or more particular ROs, from among the plurality of ROs, that specify a respective repair time that is within the particular time period; and based on respective extents of sales specified in the determined one or more particular ROs, determine the actual total extent of sales by the particular VRS over the particular time period.

EEE 36 is the computing system of any one of EEE 29 to 35, wherein the at least one processor being configure to determine the sales efficiency of the particular VRS over the particular time period comprises the at least one processor being configure to: determine that the actual total extent of sales is a particular percentage of the potential total extent of sales; and set the particular percentage as the sales efficiency of the particular VRS over the particular time period.

EEE 37 is the computing system of any one of EEE 29 to 36, wherein the at least one processor is further configured to: receive information specifying a target sales efficiency of the particular VRS over the particular time period; and direct the display device to display at least one further visual indication representative of the target sales efficiency.

EEE 38 is the computing system of any one of EEE 29 to 37, wherein the at least one processor is further configured to: receive information specifying a target sales efficiency of the particular VRS over the particular time period; make a comparison between the determined sales efficiency and the target sales efficiency; and direct the display device to display at least one further visual indication representative of the comparison.

EEE 39 is the computing system of any one of EEE 29 to 38, wherein the at least one processor is further configured to: receive information specifying a target sales efficiency of the particular VRS over the particular time period; based on the target sales efficiency and on the potential total extent of sales by the particular VRS over the particular time period, determine a target extent of sales by the particular VRS over the particular time period; and direct the display device to display at least one further visual indication representative of the determined target extent of sales.

EEE 40 is the computing system of any one of EEE 29 to 39, wherein the at least one processor is further configured to: receive information specifying a target sales efficiency of the particular VRS over the particular time period; based on the target sales efficiency and on the potential total extent of sales by the particular VRS over the particular time period, determine a target extent of sales by the particular VRS over the particular time period; make a comparison between the actual total extent of sales and the determined target extent of sales; and direct the display device to display at least one further visual indication representative of the comparison.

EEE 41 is the computing system of any one of EEE 29 to 40, wherein the plurality of ROs each specify one or more respective repair categories, and wherein the at least one processor is further configured to: determine one or more particular ROs, from among the plurality of ROs, that specify a particular repair category; based on respective extents of sales specified in the determined one or more particular ROs, determine an actual total extent of sales in the particular repair category by the particular VRS over the particular time period; and direct the display device to display at least one further visual indication representative of the determined actual total extent of sales in the particular repair category by the particular VRS over the particular time period.

EEE 42 is the computing system of any one of EEE 29 to 40, wherein the at least one processor is further configured to: receive different input data indicative of: an operating duration of a different VRS, a count of vehicle repair technicians associated with the different VRS, a working duration respectively of each vehicle repair technician associated with the different VRS, and at least one labor rate associated with the different VRS, wherein the at least one processer is further configured to refer to a data storage device containing a plurality of different ROs each specifying a respective extent of sales by the different VRS; based on the different input data, determine a potential total extent of sales by the different VRS over the particular time period; based on the plurality of different ROs, determine an actual total extent of sales by the different VRS over the particular time period; based on the potential total extent of sales by the different VRS and on the actual total extent of sales by the different VRS, determine a sales efficiency of the different VRS over the particular time period; and direct the display device to display at least one different visual indication representative of one or more of: the determined sales efficiency of the different VRS, the potential total extent of sales by the different VRS, and the actual total extent of sales by the different VRS.

EEE 43 is the computing system of any one of EEE 29 to 55, wherein the particular time period is a first time period, wherein the potential total extent of sales is a first potential total extent of sales, wherein the actual total extent of sales is a first actual total extent of sales, wherein the determined sales efficiency is a determined first sales efficiency, and wherein the at least one processor is further configure to: based on the input data, determine a second potential total extent of sales by the particular VRS over a second time period, wherein the second time period is at least partially different from the first time period; based on the plurality of ROs, determine a second actual total extent of sales by the particular VRS over the second time period; based on the second potential total extent of sales and on the second actual total extent of sales, determine a second sales efficiency of the particular VRS over the particular time period; and direct a display device to display at least one visual indication representative of one or more of: the determined second sales efficiency, the second potential total extent of sales, and the second actual total extent of sales.

EEE 44 is the computing system of any one of EEE 29 to 43, wherein the at least one processor is further configured to: based on the input data, determine a potential total extent of technician sales over the particular time period by a particular vehicle repair technician associated with the particular VRS; based on the plurality of ROs, determine an actual total extent of technician sales over the particular time period by the particular vehicle repair technician associated with the particular VRS; based on the potential total extent of technician sales and on the actual total extent of technician sales, determine a technician sales efficiency of the particular vehicle repair technician over the particular time period; and direct the display device to display at least one further visual indication representative of one or more of: the determined technician sales efficiency, the potential total extent of technician sales, and the actual total extent of technician sales.

EEE 45 is the computing system of EEE 44, wherein the at least one processor being configured to determine the potential total extent of technician sales by the particular vehicle repair technician over the particular time period comprises the at least one processor being configured to: based on the received input data indicative of the operating duration of the particular VRS and on the received input data indicative of the respective working duration of the particular vehicle repair technician, determine a particular working duration of the particular vehicle repair technician over the particular time period; and based on the determined particular working duration and on the input data indicative of the at least one labor rate associated with the particular VRS, determine the potential total extent of technician sales by the particular vehicle repair technician over the particular time period.

EEE 46 is the computing system of any one of EEE 44 to 45, wherein the plurality of ROs each also specify a respective a repair time and a respective vehicle repair technician, and wherein the at least one processor being configured to determine the actual total extent of technician sales by the particular vehicle repair technician over the particular time period comprises the at least one processor being configured to: determine one or more particular ROs, from among the plurality of ROs, that each specify (i) a respective repair time that is within the particular time period and (ii) the particular vehicle repair technician; and based on respective extents of sales specified in the determined one or more particular ROs, determine the actual total extent of technician sales by the particular vehicle repair technician over the particular time period.

EEE 47 is the computing system of any one of EEE 44 to 46, wherein the at least one processor being configured to determine the technician sales efficiency of the particular vehicle repair technician over the particular time period comprises the at least one processor being configured to: determine that the actual total extent of technician sales is a particular percentage of the potential total extent of technician sales; and set the particular percentage as the technician sales efficiency of the particular vehicle repair technician over the particular time period.

EEE 48 is the computing system of any one of EEE 44 to 47, wherein the at least one processor is further configure to: receive information specifying a target technician sales efficiency of the particular vehicle repair technician over the particular time period; and direct the display device to display at least one further visual indication representative of the target technician sales efficiency.

EEE 49 is the computing system of any one of EEE 44 to 48, wherein the at least one processor is further configure to: receive information specifying a target technician sales efficiency of the particular vehicle repair technician over the particular time period; making a comparison between the determined technician sales efficiency and the target technician sales efficiency; and direct the display device to display at least one further visual indication representative of the comparison.

EEE 50 is the computing system of any one of EEE 44 to 49, wherein the at least one processor is further configure to: receive information specifying a target technician sales efficiency of the particular vehicle repair technician over the particular time period; based on the target technician sales efficiency and on the potential total extent of technician sales by the particular vehicle repair technician over the particular time period, determine a target extent of technician sales by the particular vehicle repair technician over the particular time period; and direct the display device to display at least one further visual indication representative of the determined target extent of technician sales.

EEE 51 is the computing system of any one of EEE 44 to 50, wherein the at least one processor is further configure to: receive information specifying a target technician sales efficiency of the particular vehicle repair technician over the particular time period; based on the target technician sales efficiency and on the potential total extent of technician sales by the particular vehicle repair technician over the particular time period, determine a target extent of technician sales by the particular vehicle repair technician over the particular time period; make a comparison between the actual total extent of technician sales and the determined a target extent of technician sales; and direct the display device to display at least one further visual indication representative of the comparison.

EEE 52 is the computing system of any one of EEE 44 to 51, wherein the plurality of ROs each specify one or more respective repair categories and a respective vehicle repair technician, and wherein the at least one processor is further configure to: determine one or more particular ROs, from among the plurality of ROs, that specify (i) a particular repair category and (ii) the particular vehicle repair technician; based on respective extents of sales specified in the determined one or more particular ROs, determine an actual total extent of sales in the particular repair category by the particular vehicle repair technician over the particular time period; and direct the display device to display at least one further visual indication representative of the determined actual total extent of sales in the particular repair category by the particular vehicle repair technician over the particular time period.

EEE 53 is the computing system of any one of EEE 44 to 52, wherein the at least one processor is further configure to: based on the input data, determine a potential total extent of technician sales over the particular time period by a different vehicle repair technician associated with the particular VRS; based on the plurality of ROs, determine an actual total extent of technician sales over the particular time period by the different vehicle repair technician associated with the particular VRS; based on the potential total extent of technician sales by the different vehicle repair technician and on the actual total extent of technician sales by the different vehicle repair technician, determine a technician sales efficiency of the different vehicle repair technician over the particular time period; and direct the display device to display at least one different visual indication representative of one or more of: the determined technician sales efficiency of the different vehicle repair technician, the potential total extent of technician sales by the different vehicle repair technician, and the actual total extent of technician sales by the different vehicle repair technician.

EEE 54 is the computing system of any one of EEE 44 to 53, wherein the at least one processor is further configure to: receive further input data indicative of an extent of work available to the particular vehicle repair technician over the particular time period; based on the extent of work available and on the potential total extent of technician sales, determine a service writer efficiency of the particular vehicle repair technician over the particular time period; and direct the display device to display at least one further visual indication representative of the determined service writer efficiency.

EEE 55 is the computing system of EEE 54, wherein the at least one processor being configured to determine the service writer efficiency based on the extent of work available and on the potential total extent of technician sales comprises the at least one processor being configure to determine a measure of the extent of work available relative to the potential total extent of technician sales.

EEE 56 is the computing system of any one of EEE 54 to 55, wherein the at least one processor is further configure to: make a comparison between the determined technician sales efficiency and the determined service writer efficiency; and directing the display device to display at least one further visual indication representative of the comparison.

EEE 57 is a computer readable medium having stored thereon instructions executable by at least one processor to cause a computing system to perform functions comprising: receiving input data indicative of: an operating duration of a particular vehicle repair shop (VRS), a count of vehicle repair technicians associated with the particular VRS, a working duration respectively of each vehicle repair technician associated with the particular VRS, and at least one labor rate associated with the particular VRS, wherein the at least one processer is configured to refer to a data storage device containing a plurality of computer-readable vehicle repair orders (ROs) each specifying a respective extent of sales by the particular VRS; based on the input data, determining a potential total extent of sales by the particular VRS over a particular time period; based on the plurality of ROs, determining an actual total extent of sales by the particular VRS over the particular time period; based on the potential total extent of sales and on the actual total extent of sales, determining a sales efficiency of the particular VRS over the particular time period; and directing a display device to display at least one visual indication representative of one or more of: the determined sales efficiency, the potential total extent of sales, and the actual total extent of sales.

EEE 58 is the computer readable medium of EEE 57, wherein receiving input data indicative of the operating duration of the particular VRS comprises receiving one or more of the following operational details: a number of operational days per week, a number of non-operational days per week, a number of operational days per year, a number of non-operational days per year, a number of operational hours per day, a number of non-operational hours per day, a number of operational hours per week, a number of non-operational hours per week, a number of operational hours per year, a number of non-operational hours per year, particular operational days of the week, particular operational hours respectively during one or more days of the week, and particular non-operational days of the year, the functions further comprising: based at least on one or more of the received operational details, determining the operating duration of the particular VRS over the particular time period; and directing the display device to display at least one further visual indication representative of the operating duration of the particular VRS over the particular time period.

EEE 59 is the computer readable medium of EEE 57 or 58, wherein receiving input data indicative of a working duration respectively of each vehicle repair technician associated with the particular VRS comprises receiving, respectively for each vehicle repair technician, one or more of the following working details: a number of working days per week, a number of non-working days per week, a number of working days per year, a number of non-working days per year, a number of working hours per day, a number of non-working hours per day, a number of working hours per week, a number of non-working hours per week, a number of working hours per year, a number of non-working hours per year, particular working days of the week, particular working hours respectively during one or more days of the week, and particular non-working days of the year, the functions further comprising: based at least on one or more of the received working details, determining at least one particular working duration over the particular time period of at least one particular vehicle repair technician associated with the particular VRS; and directing the display device to display at least one further visual indication representative of the at least one particular working duration over the particular time period.

EEE 60 is the computer readable medium of any one of EEE 57 to 59, wherein receiving input data indicative of at least one labor rate associated with the particular VRS comprises receiving, respectively for each vehicle repair technician associated with the particular VRS, input data indicative of a respective labor rate.

EEE 61 is the computer readable medium of any one of EEE 57 to 60, the functions further comprising: receiving further input data indicative of the particular time period.

EEE 62 is the computer readable medium of any one of EEE 57 to 61, wherein determining the potential total extent of sales by the particular VRS over the particular time period comprises: based on the received input data indicative of the operating duration of the particular VRS and on the received input data indicative of the respective working durations, determining, respectively for each vehicle repair technician associated with the particular VRS, a particular working duration over the particular time period; and based on the respectively determined particular working durations and on the input data indicative of the at least one labor rate associated with the particular VRS, determining the potential total extent of sales by the particular VRS over the particular time period.

EEE 63 is the computer readable medium of any one of EEE 57 to 62, wherein the plurality of ROs each also specify a respective repair time, and wherein determining an actual total extent of sales by the particular VRS over the particular time period comprises: determining one or more particular ROs, from among the plurality of ROs, that specify a respective repair time that is within the particular time period; and based on respective extents of sales specified in the determined one or more particular ROs, determining the actual total extent of sales by the particular VRS over the particular time period.

EEE 64 is the computer readable medium of any one of EEE 57 to 63, wherein determining the sales efficiency of the particular VRS over the particular time period comprises: determining that the actual total extent of sales is a particular percentage of the potential total extent of sales; and setting the particular percentage as the sales efficiency of the particular VRS over the particular time period.

EEE 65 is the computer readable medium of any one of EEE 57 to 64, the functions further comprising: receiving information specifying a target sales efficiency of the particular VRS over the particular time period; and directing the display device to display at least one further visual indication representative of the target sales efficiency.

EEE 66 is the computer readable medium of any one of EEE 57 to 65, the functions further comprising: receiving information specifying a target sales efficiency of the particular VRS over the particular time period; making a comparison between the determined sales efficiency and the target sales efficiency; and directing the display device to display at least one further visual indication representative of the comparison.

EEE 67 is the computer readable medium of any one of EEE 57 to 66, the functions further comprising: receiving information specifying a target sales efficiency of the particular VRS over the particular time period; based on the target sales efficiency and on the potential total extent of sales by the particular VRS over the particular time period, determining a target extent of sales by the particular VRS over the particular time period; and directing the display device to display at least one further visual indication representative of the determined target extent of sales.

EEE 68 is the computer readable medium of any one of EEE 57 to 67, the functions further comprising: receiving information specifying a target sales efficiency of the particular VRS over the particular time period; based on the target sales efficiency and on the potential total extent of sales by the particular VRS over the particular time period, determining a target extent of sales by the particular VRS over the particular time period; making a comparison between the actual total extent of sales and the determined target extent of sales; and directing the display device to display at least one further visual indication representative of the comparison.

EEE 69 is the computer readable medium of any one of EEE 57 to 68, wherein the plurality of ROs each specify one or more respective repair categories, the functions further comprising: determining one or more particular ROs, from among the plurality of ROs, that specify a particular repair category; based on respective extents of sales specified in the determined one or more particular ROs, determining an actual total extent of sales in the particular repair category by the particular VRS over the particular time period; and directing the display device to display at least one further visual indication representative of the determined actual total extent of sales in the particular repair category by the particular VRS over the particular time period.

EEE 70 is the computer readable medium of any one of EEE 57 to 69, the functions further comprising: receiving different input data indicative of: an operating duration of a different VRS, a count of vehicle repair technicians associated with the different VRS, a working duration respectively of each vehicle repair technician associated with the different VRS, and at least one labor rate associated with the different VRS, wherein the at least one processor is further configured to refer to a data storage device containing a plurality of different ROs each specifying a respective extent of sales by the different VRS; based on the different input data, determining a potential total extent of sales by the different VRS over the particular time period; based on the plurality of different ROs, determining an actual total extent of sales by the different VRS over the particular time period; based on the potential total extent of sales by the different VRS and on the actual total extent of sales by the different VRS, determining a sales efficiency of the different VRS over the particular time period; and directing the display device to display at least one different visual indication representative of one or more of: the determined sales efficiency of the different VRS, the potential total extent of sales by the different VRS, and the actual total extent of sales by the different VRS.

EEE 71 is the computer readable medium of any one of EEE 57 to 70, wherein the particular time period is a first time period, wherein the potential total extent of sales is a first potential total extent of sales, wherein the actual total extent of sales is a first actual total extent of sales, and wherein the determined sales efficiency is a determined first sales efficiency, the functions further comprising: based on the input data, determining a second potential total extent of sales by the particular VRS over a second time period, wherein the second time period is at least partially different from the first time period; based on the plurality of ROs, determining second actual total extent of sales by the particular VRS over the second time period; based on the second potential total extent of sales and on the second actual total extent of sales, determining a second sales efficiency of the particular VRS over the particular time period; and directing a display device to display at least one visual indication representative of one or more of: the determined second sales efficiency, the second potential total extent of sales, and the second actual total extent of sales.

EEE 72 is the computer readable medium of any one of EEE 57 to 71, the functions further comprising: based on the input data, determining a potential total extent of technician sales over the particular time period by a particular vehicle repair technician associated with the particular VRS; based on the plurality of ROs, determining an actual total extent of technician sales over the particular time period by the particular vehicle repair technician associated with the particular VRS; based on the potential total extent of technician sales and on the actual total extent of technician sales, determining a technician sales efficiency of the particular vehicle repair technician over the particular time period; and directing the display device to display at least one further visual indication representative of one or more of: the determined technician sales efficiency, the potential total extent of technician sales, and the actual total extent of technician sales.

EEE 73 is the computer readable medium of EEE 72, wherein determining the potential total extent of technician sales by the particular vehicle repair technician over the particular time period comprises: based on the received input data indicative of the operating duration of the particular VRS and on the received input data indicative of the respective working duration of the particular vehicle repair technician, determining a particular working duration of the particular vehicle repair technician over the particular time period; and based on the determined particular working duration and on the input data indicative of the at least one labor rate associated with the particular VRS, determining the potential total extent of technician sales by the particular vehicle repair technician over the particular time period.

EEE 74 is the computer readable medium of any one of EEE 72 to 73, wherein the plurality of ROs each also specify a respective a repair time and a respective vehicle repair technician, and wherein determining the actual total extent of technician sales by the particular vehicle repair technician over the particular time period comprises: determining one or more particular ROs, from among the plurality of ROs, that each specify (i) a respective repair time that is within the particular time period and (ii) the particular vehicle repair technician; and based on respective extents of sales specified in the determined one or more particular ROs, determining the actual total extent of technician sales by the particular vehicle repair technician over the particular time period.

EEE 75 is the computer readable medium of any one of EEE 72 to 74, wherein determining the technician sales efficiency of the particular vehicle repair technician over the particular time period comprises: determining that the actual total extent of technician sales is a particular percentage of the potential total extent of technician sales; and setting the particular percentage as the technician sales efficiency of the particular vehicle repair technician over the particular time period.

EEE 76 is the computer readable medium of any one of EEE 72 to 75, the functions further comprising: receiving information specifying a target technician sales efficiency of the particular vehicle repair technician over the particular time period; and directing the display device to display at least one further visual indication representative of the target technician sales efficiency.

EEE 77 is the computer readable medium of any one of EEE 72 to 76, the functions further comprising: receiving information specifying a target technician sales efficiency of the particular vehicle repair technician over the particular time period; making a comparison between the determined technician sales efficiency and the target technician sales efficiency; and directing the display device to display at least one further visual indication representative of the comparison.

EEE 78 is the computer readable medium of any one of EEE 72 to 77, the functions further comprising: receiving information specifying a target technician sales efficiency of the particular vehicle repair technician over the particular time period; based on the target technician sales efficiency and on the potential total extent of technician sales by the particular vehicle repair technician over the particular time period, determining a target extent of technician sales by the particular vehicle repair technician over the particular time period; and directing the display device to display at least one further visual indication representative of the determined target extent of technician sales.

EEE 79 is the computer readable medium of any one of EEE 72 to 78, the functions further comprising: receiving information specifying a target technician sales efficiency of the particular vehicle repair technician over the particular time period; based on the target technician sales efficiency and on the potential total extent of technician sales by the particular vehicle repair technician over the particular time period, determining a target extent of technician sales by the particular vehicle repair technician over the particular time period; making a comparison between the actual total extent of technician sales and the determined a target extent of technician sales; and directing the display device to display at least one further visual indication representative of the comparison.

EEE 80 is the computer readable medium of any one of EEE 72 to 79, wherein the plurality of ROs each specify one or more respective repair categories and a respective vehicle repair technician, the functions further comprising: determining one or more particular ROs, from among the plurality of ROs, that specify (i) a particular repair category and (ii) the particular vehicle repair technician; based on respective extents of sales specified in the determined one or more particular ROs, determining an actual total extent of sales in the particular repair category by the particular vehicle repair technician over the particular time period; and directing the display device to display at least one further visual indication representative of the determined actual total extent of sales in the particular repair category by the particular vehicle repair technician over the particular time period.

EEE 81 is the computer readable medium of any one of EEE 72 to 80, the functions further comprising: based on the input data, determining a potential total extent of technician sales over the particular time period by a different vehicle repair technician associated with the particular VRS; based on the plurality of ROs, determining an actual total extent of technician sales over the particular time period by the different vehicle repair technician associated with the particular VRS; based on the potential total extent of technician sales by the different vehicle repair technician and on the actual total extent of technician sales by the different vehicle repair technician, determining a technician sales efficiency of the different vehicle repair technician over the particular time period; and directing the display device to display at least one different visual indication representative of one or more of: the determined technician sales efficiency of the different vehicle repair technician, the potential total extent of technician sales by the different vehicle repair technician, and the actual total extent of technician sales by the different vehicle repair technician.

EEE 82 is the computer readable medium of any one of EEE 72 to 81, the functions further comprising: receiving further input data indicative of an extent of work available to the particular vehicle repair technician over the particular time period; based on the extent of work available and on the potential total extent of technician sales, determining a service writer efficiency of the particular vehicle repair technician over the particular time period; and directing the display device to display at least one further visual indication representative of the determined service writer efficiency.

EEE 83 is the computer readable medium of EEE 82, wherein determining the service writer efficiency based on the extent of work available and on the potential total extent of technician sales comprises determining a measure of the extent of work available relative to the potential total extent of technician sales.

EEE 84 is the computer readable medium of any one of EEE 82 to 83, the functions further comprising: making a comparison between the determined technician sales efficiency and the determined service writer efficiency; and directing the display device to display at least one further visual indication representative of the comparison.

We claim:

1. A method comprising:
   outputting, by one or more processors to a display, one or more input screens configured for inputting of input data, wherein the one or more input screens includes (i) a section for entering input data indicative of how many days per week a particular vehicle repair shop (VRS) is open, (ii) a section for entering input data indicative of a quantity of holidays per year the particular VRS is closed, (iii) a section for entering input data indicative of a count of vehicle repair technicians associated with the particular VRS, (iv) a section for entering input data indicative of a number of vacation days respectively allotted to each vehicle repair technician associated with the particular VRS, (v) a section for entering input data indicative of a working duration per day respectively of each vehicle repair technician associated with the particular VRS, and (vi) a section for entering input data indicative of at least one labor rate associated with the particular VRS;
   receiving, by the one or more processors via use of the one or more input screens, input data indicative of: how many days per week a particular VRS is open, a quantity of holidays per year the particular VRS is closed, a count of vehicle repair technicians associated with the particular VRS, a number of vacation days respectively allotted to each vehicle repair technician associated with the particular VRS, a working duration per day respectively of each vehicle repair technician associated with the particular VRS, and at least one labor rate associated with the particular VRS, wherein the one or more processors is configured to refer to a data storage device containing a plurality of computer-readable vehicle repair orders (ROs) each specifying a respective extent of sales by the particular VRS;
   based on both a number of weeks during a particular time period and the input data indicative of how many days per week a particular VRS is open, the quantity of holidays during the particular time period the particular VRS is closed, and the number of vacation days respectively allotted to each vehicle repair technician associated with the particular VRS during the particular time period, determining, for each vehicle repair technician associated with the particular VRS, a respective number of days each technician is available to work during the particular time period;
   based on both respective number of days each technician is available to work during the particular time period and the input data indicative of at least one labor rate associated with the particular VRS, determining, by the one or more processors, a potential total extent of technician sales over the particular time period by a particular vehicle repair technician associated with the particular VRS;
   based on the plurality of vehicle ROs, determining, by the one or more processors, an actual total extent of technician sales over the particular time period by the particular vehicle repair technician associated with the particular VRS;
   based on the potential total extent of technician sales and on the actual total extent of technician sales, determining, by the one or more processors, a technician sales efficiency of the particular vehicle repair technician over the particular time period; and
   directing, by the one or more processors, a display device to display at least one visual indication representative of one or more of: the determined technician sales efficiency, the potential total extent of technician sales, and the actual total extent of technician sales;
   receiving, by the one or more processors, further input data indicative of an extent of work available to the particular vehicle repair technician over the particular time period;
   based on the extent of work available and on the potential total extent of technician sales, determining a service writer efficiency of the particular vehicle repair technician over the particular time period;
   directing, by the one or more processors, the display device to display at least one further visual indication representative of the determined service writer efficiency of the particular vehicle repair technician; and
   reallocating scheduled work among technicians at the particular VRS based on the determined service writer efficiency of the particular vehicle repair technician to repair vehicles at the particular VRS.

2. The method of claim 1,
   wherein the one or more input screens further includes a section for entering input data indicative of an operating duration of the particular VRS,
   wherein the method further includes receiving, by the or more processors via use of the one or more input screens, input data indicative of an operating duration of a particular VRS, and
   wherein receiving input data indicative of the operating duration of the particular VRS comprises receiving one or more of the following operational details: a number of operational days per week, a number of non-operational days per week, a number of operational days per year, a number of non-operational days per year, a number of operational hours per day, a number of non-operational hours per day, a number of operational hours per week, a number of non-operational hours per week, a number of operational hours per year, a number of non-operational hours per year, particular operational days of the week, particular operational hours respectively during one or more days of the week, and particular non-operational days of the year, the method further comprising:

based at least on one or more of the received operational details, the one or more processors determining the operating duration of the particular VRS over the particular time period; and directing, by the one or more processors, the display device to display at least one further visual indication representative of the operating duration of the particular VRS over the particular time period.

3. The method of claim 1, wherein receiving input data indicative of a working duration respectively of each vehicle repair technician associated with the particular VRS comprises receiving, respectively for each vehicle repair technician, one or more of the following working details: a number of working days per week, a number of non-working days per week, a number of working days per year, a number of non-working days per year, a number of working hours per day, a number of non-working hours per day, a number of working hours per week, a number of non-working hours per week, a number of working hours per year, a number of non-working hours per year, particular working days of the week, particular working hours respectively during one or more days of the week, and particular non-working days of the year, the method further comprising:

based at least on one or more of the received working details, the one or more processors determining at least one particular working duration over the particular time period of at least one particular vehicle repair technician associated with the particular VRS; and directing, by the one or more processors, the display device to display at least one further visual indication representative of the at least one particular working duration over the particular time period.

4. The method of claim 1, wherein receiving input data indicative of at least one labor rate associated with the particular VRS comprises receiving, respectively for each vehicle repair technician associated with the particular VRS, input data indicative of a respective labor rate.

5. The method of claim 1, further comprising:
receiving, by the one or more processors, further input data indicative of the particular time period.

6. The method of claim 2, wherein determining the potential total extent of sales by the particular VRS over the particular time period comprises:

based on the received input data indicative of the operating duration of the particular VRS and on the received input data indicative of the respective working durations, determining, respectively for each vehicle repair technician associated with the particular VRS, a particular working duration over the particular time period; and based on the respectively determined particular working durations and on the input data indicative of the at least one labor rate associated with the particular VRS, determining the potential total extent of sales by the particular VRS over the particular time period.

7. The method of claim 1, wherein the plurality of vehicle ROs each also specify a respective repair time, and wherein determining an actual total extent of sales by the particular VRS over the particular time period comprises:

determining one or more particular ROs, from among the plurality of vehicle ROs, that specify a respective repair time that is within the particular time period; and based on respective extents of sales specified in the determined one or more particular ROs, determining the actual total extent of sales by the particular VRS over the particular time period.

8. The method of claim 1, wherein determining the sales efficiency of the particular VRS over the particular time period comprises:

determining that the actual total extent of sales is a particular percentage of the potential total extent of sales; and setting the particular percentage as the sales efficiency of the particular VRS over the particular time period.

9. The method of claim 1, further comprising:
receiving, by the one or more processors, information specifying a target sales efficiency of the particular VRS over the particular time period; and directing, by the one or more processors, the display device to display at least one further visual indication representative of the target sales efficiency.

10. The method of claim 1, further comprising:
receiving, by the one or more processors, information specifying a target sales efficiency of the particular VRS over the particular time period;

making a comparison, by the one or more processors, between the determined sales efficiency and the target sales efficiency; and directing, by the one or more processors, the display device to display at least one further visual indication representative of the comparison.

11. The method of claim 1, further comprising:
receiving, by the one or more processors, information specifying a target sales efficiency of the particular VRS over the particular time period;

based on the target sales efficiency and on the potential total extent of sales by the particular VRS over the particular time period, determining a target extent of sales by the particular VRS over the particular time period; and directing, by the one or more processors, the display device to display at least one further visual indication representative of the determined target extent of sales.

12. The method of claim 1, further comprising:
receiving, by the one or more processors, information specifying a target sales efficiency of the particular VRS over the particular time period;

based on the target sales efficiency and on the potential total extent of sales by the particular VRS over the particular time period, determining a target extent of sales by the particular VRS over the particular time period;

making a comparison between the actual total extent of sales and the determined target extent of sales; and directing, by the one or more processors, the display device to display at least one further visual indication representative of the comparison.

13. The method of claim 1, wherein the plurality of vehicle ROs each specify one or more respective repair categories, the method further comprising:

determining, by the one or more processors, one or more particular ROs, from among the plurality of vehicle ROs, that specify a particular repair category;

based on respective extents of sales specified in the determined one or more particular ROs, determining, by the one or more processors, an actual total extent of sales in the particular repair category by the particular VRS over the particular time period; and directing, by the one or more processors, the display device to display at least one further visual indication representative of the determined actual total extent of sales in the particular repair category by the particular VRS over the particular time period.

14. The method of claim 1, further comprising:

receiving, by one or more processors, different input data indicative of: an operating duration of a different VRS, a count of vehicle repair technicians associated with the different VRS, a working duration respectively of each vehicle repair technician associated with the different VRS, and at least one labor rate associated with the different VRS, wherein the one or more processors is further configured to refer to a data storage device containing a plurality of different ROs each specifying a respective extent of sales by the different VRS;

based on the different input data, determining, by the one or more processors, a potential total extent of sales by the different VRS over the particular time period;

based on the plurality of different ROs, determining, by the one or more processors, an actual total extent of sales by the different VRS over the particular time period;

based on the potential total extent of sales by the different VRS and on the actual total extent of sales by the different VRS, determining, by the one or more processors, a sales efficiency of the different VRS over the particular time period; and directing, by the one or more processors, the display device to display at least one different visual indication representative of one or more of: the determined sales efficiency of the different VRS, the potential total extent of sales by the different VRS, and the actual total extent of sales by the different VRS.

15. The method of claim 1, wherein the particular time period is a first time period, wherein the potential total extent of sales is a first potential total extent of sales, wherein the actual total extent of sales is a first actual total extent of sales, and wherein the determined sales efficiency is a determined first sales efficiency, the method further comprising:

based on the input data, determining, by the one or more processors, a second potential total extent of sales by the particular VRS over a second time period, wherein the second time period is at least partially different from the first time period;

based on the plurality of vehicle ROs, determining, by the one or more processors, a second actual total extent of sales by the particular VRS over the second time period;

based on the second potential total extent of sales and on the second actual total extent of sales, determining, by the one or more processors, a second sales efficiency of the particular VRS over the particular time period; and directing, by the one or more processors, a display device to display at least one visual indication representative of one or more of: the determined second sales efficiency, the second potential total extent of sales, and the second actual total extent of sales.

16. The method of claim 1, wherein the one or more input screens further includes a section for entering input data indicative of an operating duration of the particular VRS, wherein the method further includes receiving, by the or more processors via use of the one or more input screens, input data indicative of an operating duration of a particular VRS, and wherein determining the potential total extent of technician sales by the particular vehicle repair technician over the particular time period comprises:

based on the received input data indicative of the operating duration of the particular VRS and on the received input data indicative of the respective working duration per day of the particular vehicle repair technician, determining a particular working duration of the particular vehicle repair technician over the particular time period; and based on the determined particular working duration and on the input data indicative of the at least one labor rate associated with the particular VRS, determining the potential total extent of technician sales by the particular vehicle repair technician over the particular time period.

17. The method of claim 1, wherein the plurality of vehicle ROs each also specify a respective a repair time and a respective vehicle repair technician, and wherein determining the actual total extent of technician sales by the particular vehicle repair technician over the particular time period comprises:

determining one or more particular ROs, from among the plurality of vehicle ROs, that each specify (i) a respective repair time that is within the particular time period and (ii) the particular vehicle repair technician; and based on respective extents of sales specified in the determined one or more particular ROs, determining the actual total extent of technician sales by the particular vehicle repair technician over the particular time period.

18. The method of claim 1, wherein determining the technician sales efficiency of the particular vehicle repair technician over the particular time period comprises:

determining that the actual total extent of technician sales is a particular percentage of the potential total extent of technician sales; and setting the particular percentage as the technician sales efficiency of the particular vehicle repair technician over the particular time period.

19. The method of claim 1, further comprising:

receiving, by the one or more processors, information specifying a target technician sales efficiency of the particular vehicle repair technician over the particular time period; and directing, by the one or more processors, the display device to display at least one further visual indication representative of the target technician sales efficiency.

20. The method of claim 1, further comprising:

receiving, by the one or more processors, information specifying a target technician sales efficiency of the particular vehicle repair technician over the particular time period;

making a comparison between the determined technician sales efficiency and the target technician sales efficiency; and directing, by the one or more processors, the display device to display at least one further visual indication representative of the comparison.

21. The method of claim 1, further comprising:

receiving, by the one or more processors, information specifying a target technician sales efficiency of the particular vehicle repair technician over the particular time period;

based on the target technician sales efficiency and on the potential total extent of technician sales by the particular vehicle repair technician over the particular time period, determining a target extent of technician sales by the particular vehicle repair technician over the particular time period; and directing, by the one or more processors, the display device to display at least one further visual indication representative of the determined target extent of technician sales.

22. The method of claim 1, further comprising:
receiving, by the one or more processors, information specifying a target technician sales efficiency of the particular vehicle repair technician over the particular time period;
based on the target technician sales efficiency and on the potential total extent of technician sales by the particular vehicle repair technician over the particular time period, determining a target extent of technician sales by the particular vehicle repair technician over the particular time period;
making a comparison between the actual total extent of technician sales and the determined a target extent of technician sales; and
directing, by the one or more processors, the display device to display at least one further visual indication representative of the comparison.

23. The method of claim 1, wherein the plurality of vehicle ROs each specify one or more respective repair categories and a respective vehicle repair technician, the method further comprising:
determining, by the one or more processors, one or more particular ROs, from among the plurality of vehicle ROs, that specify (i) a particular repair category and (ii) the particular vehicle repair technician;
based on respective extents of sales specified in the determined one or more particular ROs, determining, by the one or more processors, an actual total extent of sales in the particular repair category by the particular vehicle repair technician over the particular time period; and
directing, by the one or more processors, the display device to display at least one further visual indication representative of the determined actual total extent of sales in the particular repair category by the particular vehicle repair technician over the particular time period.

24. The method of claim 1, further comprising:
based on the input data, determining, by the one or more processors, a potential total extent of technician sales over the particular time period by a different vehicle repair technician associated with the particular VRS;
based on the plurality of vehicle ROs, determining, by the one or more processors, an actual total extent of technician sales over the particular time period by the different vehicle repair technician associated with the particular VRS;
based on the potential total extent of technician sales by the different vehicle repair technician and on the actual total extent of technician sales by the different vehicle repair technician, determining, by the one or more processors, a technician sales efficiency of the different vehicle repair technician over the particular time period; and
directing, by the one or more processors, the display device to display at least one different visual indication representative of one or more of: the determined technician sales efficiency of the different vehicle repair technician, the potential total extent of technician sales by the different vehicle repair technician, and the actual total extent of technician sales by the different vehicle repair technician.

25. The method of claim 1, wherein determining the service writer efficiency based on the extent of work available and on the potential total extent of technician sales comprises determining a measure of the extent of work available relative to the potential total extent of technician sales.

26. The method of claim 1, further comprising:
making a comparison between the determined technician sales efficiency and the determined service writer efficiency; and
directing, by the one or more processors, the display device to display at least one further visual indication representative of the comparison.

27. The method of claim 1, wherein directing the display device to display at least one visual indication representative of one or more of: the determined sales efficiency, the potential total extent of sales, and the actual total extent of sales includes directing the display device to display at least one visual indication representative of one or more of: the determined sales efficiency with respect to a sales efficiency determined for at least one other vehicle repair shop, the potential total extent of sales with respect to a potential total extent of sales determined for at least one other vehicle repair shop, and the actual total extent of sales with respect to an actual total extent of sales determined for at least one other vehicle repair shop.

\* \* \* \* \*